United States Patent
Topa

(10) Patent No.: US 7,335,867 B2
(45) Date of Patent: Feb. 26, 2008

(54) METHOD OF WAVEFRONT SENSING BY MAPPING BOUNDARIES OF A LENSLET ARRAY ONTO A GRID OF PIXELS

(75) Inventor: Daniel M. Topa, Albuquerque, NM (US)

(73) Assignee: Wavefront Sciences, Inc., Albuquerque, NM (US)

( * ) Notice: Subject to any disclaimer, the term of this patent is extended or adjusted under 35 U.S.C. 154(b) by 0 days.

(21) Appl. No.: 11/408,115

(22) Filed: Apr. 21, 2006

(65) Prior Publication Data

US 2006/0261244 A1    Nov. 23, 2006

Related U.S. Application Data

(60) Division of application No. 11/228,193, filed on Sep. 19, 2005, now Pat. No. 7,122,774, which is a continuation of application No. 10/615,414, filed on Jul. 9, 2003, now Pat. No. 7,078,665.

(60) Provisional application No. 60/394,232, filed on Jul. 9, 2002.

(51) Int. Cl.
   *G01J 1/20*    (2006.01)
(52) U.S. Cl. .............................. 250/201.9; 250/208.1
(58) Field of Classification Search ............. 250/201.9, 250/208.1, 201.4, 201.5, 216; 356/121, 127, 356/106; 359/252–254, 619, 846–849
See application file for complete search history.

(56) References Cited

U.S. PATENT DOCUMENTS 4,737,621 A * 4/1988 Gonsiorowski et al. .. 250/201.9
6,130,419 A   10/2000 Neal

* cited by examiner

*Primary Examiner*—Que T Le
(74) *Attorney, Agent, or Firm*—Volentine & Whitt, PLLC

(57) ABSTRACT

A system and method of wavefront sensing with a Shack-Hartmann wavefront sensor precisely locates focal spots on a detector array, and determines the location of the lenslet array with respect to the detector array.

8 Claims, 34 Drawing Sheets

FIG. 2C $\psi_{00}(x,y) = 1$ $\psi_{10}(x,y) = x$ $\psi_{01}(x,y) = y$ incident wavefront irradiance distribution
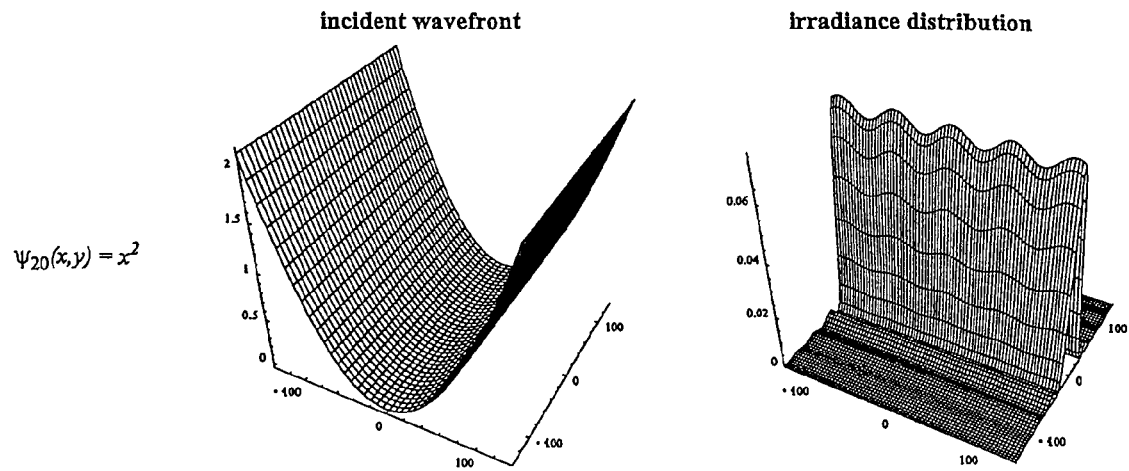
$\psi_{20}(x,y) = x^2$
FIG. 4A
FIG. 4D
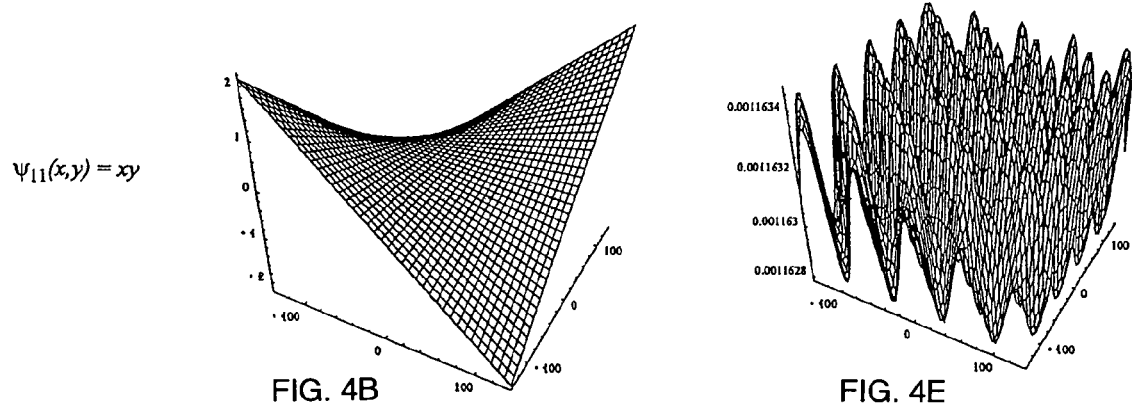
$\psi_{11}(x,y) = xy$
FIG. 4B
FIG. 4E
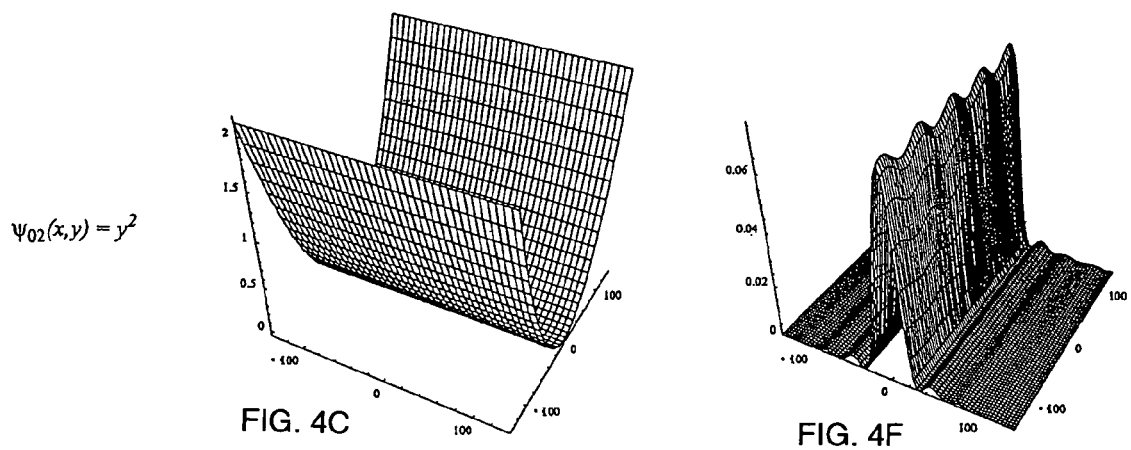
$\psi_{02}(x,y) = y^2$
FIG. 4C
FIG. 4F $c_{00} = 0$
$c_{11} = 0$
$c_{22} = 0$
$c_{33} = 0$
$c_{44} = 0$
$c_{10} = 0$
$c_{21} = 0$
$c_{32} = 0$
$c_{43} = 0$
$c_{20} = 0$
$c_{31} = 0$
$c_{42} = 1$
$c_{30} = 0$
$c_{41} = 0$
$c_{40} = 0$

FIG. 13B

METHOD OF WAVEFRONT SENSING BY MAPPING BOUNDARIES OF A LENSLET ARRAY ONTO A GRID OF PIXELS

CROSS-REFERENCES TO RELATED APPLICATIONS

This is a divisional of application Ser. No. 11/228,193, filed on 19 Sep. 2005 now U.S. Pat. No. 7,122,774, which is in turn a continuation of application Ser. No. 10/615,414, filed on 9 Jul. 2003 now U.S. Pat. No. 7,078,665, the entirety of which are incorporated herein by reference for all purposes as if fully set forth herein. This application claims priority under 35 U.S.C. § 119 to co-pending U.S. Provisional Patent Application No. 60/394,232, filed on 9 Jul. 2002 in the name of Daniel M. Topa, the entirety of which is also hereby incorporated by reference herein for all purposes as if fully set forth herein.

BACKGROUND AND SUMMARY OF THE INVENTION

1. Technical Field

This invention pertains to the field of wavefront sensing methods and devices, and more particularly, to a method and system for more precisely determining the location of a focal spot in a wavefront sensor, for more precisely determining the location of vertices or boundaries of lenslets in a lenslet array with respect to pixels of a wavefront sensor, for using this information to reconstruct an arbitrary wavefront with the wavefront sensor, and for more efficiently performing the calculations to perform the reconstruction.

2. Description

A light wavefront may be defined as the virtual surface delimited by all possible rays having an equal optical path length from a spatially coherent source. For example, the wavefront of light emanating from a point light source is a sphere (or a partial sphere where light from the point light source is limited to emission along a small range of angles). Meanwhile, the wavefront created by a collimating lens mounted at a location one focal length away from a point source is a plane. A wavefront may be planar, spherical, or have some arbitrary shape dictated by other elements of an optical system through which the light is transmitted or reflected.

A number of different wavefront sensors and associated methods are known. Among these are the Shack-Hartmann wavefront sensor, which will now be described in greater detail FIG. 1 shows a basic configuration of a Shack-Hartmann wavefront sensor 180. The Shack-Hartmann wavefront sensor 180 comprises a micro-optic lenslet array 182 that breaks an incoming beam into multiple focal spots 188 falling on an optical detector 184. Typically, the optical detector 184 comprises a pixel array, for example, a charge-coupled device (CCD) camera. The lenslets of the lenslet array 182 dissect an incoming wavefront and creates a pattern of focal spots on a charge-couple device (CCD) array. The lenslet array typically contains hundreds or thousands of lenslets, each on the size scale of a hundred microns. Most Shack-Hartmann sensors are assembled such that the CCD array is in the focal plane of the lenslet array.

A Shack-Hartmann wavefront sensor uses the fact that light travels in a straight line, to measure the wavefront of light. By sensing the positions of the focal spots 188, the propagation vector of the sampled light can be calculated for each lenslet of the lenslet array 182. The wavefront can be reconstructed from these vectors.

To better understand one or more aspects of this invention, it is worthwhile to discuss the operation of a Shack-Hartmann wavefront sensor in more detail.

In typical operation, a reference beam (e.g., a plane wave) is first imaged onto the array and the location of the focal spots is recorded. Then, the wavefront of interest is imaged onto the array, and a second set of focal spot locations is recorded. FIGS. 2A-F illustrate this process.

Usually, some optical system delivers a wavefront onto the lenslet array which samples the wavefront over the tiny regions of each lenslet. The lenslets should be much smaller than the wavefront variation, that is, the wave-front should be isoplanatic over the sampled region. When the CCD array is in the focal plane of the lenslet array, each lenslet will create a focal spot on the CCD array. The location of these focal spots is the critical measurement, for this reveals the average of the wavefront slopes across each region. That is, the shift in the focal spot is proportional to the average of the slopes of the wavefront over the region sampled by the lenslet. Software may compute the shift in each focal spot.

If the wavefront is not isoplanatic, the quality of the focal spot erodes rapidly and it becomes more difficult to determine the peak location.

However, where the isoplanatic condition is satisfied and where the focal spot shift is consistent with the small angle approximation of Fresnel, then the focal spot shift is exactly proportional to the average of the wavefront slope over the lenslet.

The incident wavefront is then reconstructed from the measurements of the average of the slopes for the hundreds or thousands of lenslets in the array.

It was stated above that the shift in the focal spot is proportional to the average of the slopes of the wavefront over the region sampled by the lenslet. This will now be shown as follows:

We begin by examining the types of wavefronts incident upon a lenslet and calculating their spatial irradiance distribution in the focal plane. We then resolve what this distribution tells us about the average value of the slopes of the sampled wavefront.

As noted above, most Shack-Hartmann sensors are assembled such that the CCD array is in the focal plane of the lenslet array. Therefore the appropriate complex amplitude distribution, $F_f(u, v)$, of the field in the focal plane is given by the Fraunhofer diffraction pattern:

$$F_f(u, v) = \frac{\exp\left(i\frac{k}{2f}(u^2+v^2)\right)}{i\lambda f} \int\int_{-\infty}^{\infty} F_l(x, y) \exp\left(-i\frac{2\pi}{\lambda f}(xu+yv)\right) P(x,y) dx dy \quad 1)$$

where the pupil function, P(x,y), describes the lens aperture. The function is 1 inside the lens aperture and 0 outside of the aperture. In the example that follows we will build the pupil function using the rectangle function, which is defined as:

$$\pi(x) = \begin{cases} 0 & \text{for } |x| > \frac{1}{2} \\ \frac{1}{2} & \text{for } |x| = \frac{1}{2} \\ 1 & \text{for } |x| < \frac{1}{2} \end{cases} \qquad (2)$$

The field $F_l(u, v)$ incident upon the lenslet is related to the wavefront $\psi(x, y)$ incident upon the lenslet through:

$$F_l(x,y) = \exp(-i\Psi(kx, ky)) \qquad (3)$$

where k is the wavenumber, $2\pi/\lambda$. The spatial irradiance distribution in the focal plane is related to the field amplitude by:

$$I(x,y) = F(x,y)F^*(x,y) \qquad (4)$$

The first step was to model the portion of the wavefront sampled by the lenslet. We begin with planar wavefronts and advance to wavefronts with more structure. Consider the first six simple cases in a Taylor series:

$\Psi_{00}(x,y) = 1$ $\Psi_{10}(x,y) = x$ $\Psi_{01}(x,y) = y$ $\Psi_{20}(x,y) = x^2$ $\Psi_{11}(x,y) = xy$ $\Psi_{02}(x,y) = y^2$

These six wavefronts were then analyzed using equation (2). Before presenting the results for the corresponding intensity distributions, a few functions must be defined. First is the sampling function:

$$\text{sinc}\, x = \frac{\sin x}{x} \qquad (5)$$

then the error function:

$$\text{erf}(x) = \frac{2}{\sqrt{\pi}} \int_0^x e^{-t^2}\, dt \qquad (6)$$

and the imaginary error function:

$$\text{erfi}(x) = -i\,\text{erf}(ix) \qquad (7)$$

and finally the exponential integral function:

$$ei(x) = -\int_{-z}^{\infty} \frac{e^{-t^2}}{t}\, dt \qquad (8)$$

The intensity distributions can now be written in terms of these general functions. The first is the well-known result:

$$I_{10}(x, y) = \left(\frac{d^2}{f\lambda}\right)^2 \text{sinc}^2\left(\frac{\pi d}{f\lambda} x\right) \text{sinc}^2\left(\frac{\pi d}{f\lambda} y\right) \qquad (9)$$

The next two results are also for planar wavefronts with tilt. They are:

$$I_{10}(x, y) = \left(\frac{d^2}{f\lambda}\right)^2 \text{sinc}^2\left(\frac{\pi d}{f\lambda}(x-f)\right) \text{sinc}^2\left(\frac{\pi d}{f\lambda} y\right) \qquad (10)$$

and $$I_{10}(x, y) = \left(\frac{d^2}{f\lambda}\right)^2 \text{sinc}^2\left(\frac{\pi d}{f\lambda} x\right) \text{sinc}^2\left(\frac{\pi d}{f\lambda}(y-f)\right) \qquad (11)$$

We expect the symmetry under interchange of x and y in equations (10) and (11) since space is isotropic and the lenslet has a discrete symmetry under rotations by integer multiples of 90°.

For the case of nonplanar wavefronts the results quickly become more complicated. To present these results, first define the intermediate variables:

$$\alpha = \frac{2\pi df + \lambda y}{2f\lambda} \text{ and } \beta = \frac{2\pi df - \lambda y}{2f\lambda} \qquad (12)$$

The intensity distribution can now be written as:

$$I_{20}(x, y) = -\frac{1}{\pi}\left(\frac{d}{f}\right)^2 (\text{erfi}(z\alpha) + \text{erfi}(z\beta)) \qquad (13)$$

$$(\text{erfi}(iz\alpha) + \text{erfi}(iz\beta))\text{sinc}^2\left(\frac{\pi d}{f\lambda} x\right)$$

For both $I_{20}(x,y)$ and $I_{02}(x,y)$ we see the symmetry in the solutions under interchange of x and y. The intermediate variables now become:

$$\alpha = \frac{2\pi df + \lambda x}{2f\lambda} \text{ and } \beta = \frac{2\pi df - \lambda x}{2f\lambda} \qquad (14)$$

and the irradiance distribution in the focal plane is:

$$I_{02}(x, y) = \qquad (15)$$

$$-\frac{1}{\pi}\left(\frac{d}{f}\right)^2 (\text{erfi}(z\alpha) + \text{erfi}(z\beta))(\text{erfi}(iz\alpha) + \text{erfi}(iz\beta))\text{sinc}^2\left(\frac{\pi d}{f\lambda} y\right)$$

Finally we consider the case where the input wavefront exhibits some torsion. First define the intermediate variables:

$$\alpha_1 = \frac{2\pi df + \lambda x}{2f\lambda} \qquad (16)$$

and $$\alpha_2 = \frac{2\pi df - \lambda x}{2f\lambda}$$

-continued $$\beta_1 = \frac{2\pi df + \lambda y}{2f\lambda} \quad (17)$$

and $$\beta_{21} = \frac{2\pi df - \lambda y}{2f\lambda}$$

Then the irradiance distribution can be written as:

$$I_{11}(x, y) = \left(\frac{\lambda}{4\pi^2}\right)^2 (ei(ia_1\beta_2) - ei(ia_1\beta_2) - ei(ia_2\beta_1) + ei(-ia_2\beta_2)) \times \quad (18)$$
$$(ei(-ia_1\beta_{12}) - ei(ia_1\beta_2) - ei(ia_2\beta_1) + ei(-ia_2\beta_2))$$

Clearly the solutions in equations (9)-(11) are even functions and they are separable. That is, the irradiance distributions for these three functions can be written $X(x)Y(y)$. The next three functions are not separable as the function arguments mix the variables x and y. However, a careful analysis of the constituent functions in equations (6)-(8) reveals that the combinations in equations (13), (15) and (18) are even functions also.

Now we address the issue of how the amplitude of these input wavefronts affects the focal spot position. Consider that the wavefront has an amplitude $\kappa$. The incident wavefronts become:

$$\Psi_{00}(x,y) = \kappa$$
$$\Psi_{10}(x,y) = \kappa x$$
$$\Psi_{01}(x,y) = \kappa y$$
$$\Psi_{20}(x,y) = \kappa x^2$$
$$\Psi_{11}(x,y) = \kappa xy$$
$$\Psi_{02}(x,y) = \kappa y^2$$

These new wavefronts were again propagated through the lenslet using equation (1). As one might expect, there was no change in $I_{00}(x,y)$. The irradiance distributions for the odd parity terms become:

$$I_{10}(x, y) = \left(\frac{f\lambda}{d}\right)^2 \mathrm{sinc}^2\left(\frac{\pi d}{f\lambda}(x - \chi f)\right) \mathrm{sinc}^2\left(\frac{\pi d}{f\lambda} y\right) \quad (19)$$

and $$I_{01}(x, y) = \left(\frac{f\lambda}{d}\right)^2 \mathrm{sinc}^2\left(\frac{\pi d}{f\lambda} x\right) \mathrm{sinc}^2\left(\frac{\pi d}{f\lambda}(y - \chi f)\right) \quad (20)$$

For the higher order cases, there is a slight rewrite. For example for $I_{20}(x)$, the intermediate variables become:

$$\alpha = \frac{2\pi d\chi f + \lambda y}{2f\lambda} \quad (21)$$

and $$\beta = \frac{2\pi d\chi f - \lambda y}{2f\lambda}$$

and the irradiance distribution in equation (13) is then multiplied by $\kappa^{-1/2}$. For the torsion case $\psi_{11}(x, y)$ the intermediate variables are:

$$\alpha_1 = \frac{2\pi d\chi f + \lambda x}{2f\lambda} \quad (22)$$

and $$\alpha_2 = \frac{2\pi d\chi f - \lambda x}{2f\lambda}$$

$$\beta_1 = \frac{2\pi d\chi f + \lambda y}{2f\lambda} \quad (23)$$

and $$\beta_2 = \frac{2\pi d\chi f - \lambda y}{2f\lambda}$$

the irradiance distribution in equation 18 is then multiplied by $\kappa^{-2}$.

However, the only peaks that shift position are $I_{10}(x,y)$ and $I_{01}(x,y)$. And both of these shifts are exactly in the focal plane. The question now becomes how does this compare to the average value of the wavefront slopes?

The average value of the wavefront slope is given by:

$$m_x = \frac{\int_{-d/2}^{d/2} \int_{-d/2}^{d/2} \partial_x \psi(x, y) dx dy}{d^2} \quad (24)$$

and similarly for $m_y$. The six input wavefronts and their average slopes m ($m_x$, $m_y$) are:

$$\psi_{00}(x,y) = \kappa \quad m^T = (0,0)$$
$$\psi_{10}(x,y) = \kappa x \quad m^T = (0,0)$$
$$\psi_{01}(x,y) = \kappa y \quad m^T = (\kappa,0)$$
$$\psi_{20}(x,y) = \kappa x^2 \quad m^T = (0,\kappa)$$
$$\psi_{11}(x,y) = \kappa xy \quad m^T = (0,0)$$
$$\psi_{02}(x,y) = \kappa y^2 \quad m^T = (0,0)$$

So for these six cases, which are the most physically relevant, the average of the wavefront slope exactly describes the shift of the peak in the focal plane accounting for the distance offset of the focal length. Because of this exact relationship, it is convenient for us to define the focal spot location as being the location of the peak intensity of the focal spot.

For the purposes of this discussion, we define "isoplanatic" as the condition where the wavefront is well approximated over an area the size of the lenslet, by a plane wave.

This analysis buttresses the lore of Shack-Hartmann wavefront sensing. The shift in the focal spot position is directly proportional to the average of the wavefront slope across the lenslet. In the small angle limit inherent in the Fresnel approximation, this is an exact result for the isoplanatic cases and also true for the higher terms examined, although focal spot location is ambiguous in these cases as well as for additional higher order terms. An important issue that has not been discussed is how combinations of these terms behave. This is an important issue that is quite relevant physically.

FIGS. 3A-F and 4A-F show some exemplary incident wavefronts and output irradiance distributions in the focal plane. The lenslet is a square of size d=280µ and has a focal length f=28 mm; the wavelength λ=325 nm.

FIGS. 3A-C show the functional form of some exemplary incident wavefronts which all have a generally planar structure. FIGS. 3D-F graphically shows the corresponding wavefronts incident upon the lenslet. Note that in these examples over 95% of the light is confined to an area the size of a lenslet. The x and y axes are in microns. The vertical scale in the first column is also in microns. The vertical axis on the second column represents intensity and is in arbitrary units.

FIGS. 4A-C show a series of increasingly more complicated incident wavefronts. Clearly the focal spots are degrading rapidly where the incident wavefront has a non-planar structure. Notice the concept of a peak is ambiguous here and a center of mass computation of focal spot location could be highly problematic. Also, only a small portion of the light falls within the lenslet area. The x and y axes are in microns. The vertical scale in the first column is also in microns. The vertical axis on the second column represents intensity and is in arbitrary units.

FIGS. 3A-F and 4A-F validate the well known rule of thumb: the wavefront sensor works best in the isoplanatic limit. In other words, the lenslet size should be much smaller than the variations one is attempting to measure. Of course practical wavefront sensor design includes many other considerations too and one cannot shrink the lenslet size arbitrarily. But the message is that in the isoplanatic limit we expect to find well-defined focal spots that the center of mass can handle with higher precision.

So, to recap, a Shack-Hartmann wavefront sensor is a powerful tool for optical analysis, however the precision of the wavefront data that it produces may be less than is desired at times, and the speed and ease by which an incident wavefront may be reconstructed are also sometimes less than desirable.

First, it is difficult to precisely locate the focal spots produced by the lenslet array. Although the center of mass may be computed as an approximation of the focal spot location, more precision is desired. The basic problem with center of mass algorithms lies with deciding which pixels to include in the calculation. All cameras have a background level of electronic noise. The center of mass algorithm is especially sensitive to noise away from the brightest pixel because of weighting of the calculation by distance. To exclude this effect, a threshold is usually applied that excludes all pixels below some absolute brightness level. This threshold may be further refined after this preliminary step according to how bright the light is under a lenslet. To see the effect of this threshold, a calculation can be done using the center of mass. The sinc-squared intensity pattern can be overlaid with a discrete section of CCD pixels. The continuous intensity pattern is broken into discrete pixelated values as counts. Then the center of mass algorithm can be applied to the pixelated values. Then a calculation can be done where the sinc-squared pattern is translated into small steps across the fixed CCD. This corresponds to the situation where tilt is added in small steps to the beam as it hits the lenslet. The center of mass location can be plotted against the known tilt added to the beam. When this process is done, it will be seen that the center of mass will follow a straight line up to the point where a new pixel starts to receive enough light to be counted (or another pixel got too little light.). At that point, there will be an abrupt jump in the line. The appearance will be a line with lots of little kinks in it. On the average, the input translation versus center of mass calculation will produce a line with a slope of one. So it is evident that if there are kinks in the line, the slopes of all the little straight sections of lines must be something different than the ideal slope of one. The kinks and the non-unity piecewise slopes indicates that center of mass calculations have a fundamental flaw that makes them unsuitable for being the basis of wavefront measurements if extremely high accuracies are desired.

Secondly, in general, a lenslet boundary will not line up neatly with a pixel boundary. Instead the boundary line will likely cross through pixels. For precise wavefront measurements, it is important to precisely determine the location of the vertices or boundaries of lenslets in a lenslet array with respect to pixels (e.g., CCD array) of a corresponding wavefront sensor. This knowledge is needed in order to assign locations of the boundaries of the lenslets to locations on the CCD.

Third, it is difficult to take a series of hundreds or thousands of measurements of the average of the slopes and reconstitute the incident wavefront. This process of taking the measurements and reconstituting the wavefront incident upon the lenslet array is called reconstruction and can be quite computationally intensive and time-consuming.

Accordingly, it would be desirable to provide a system and method of more accurately locating the focal spots in a wavefront sensor. It would also be desirable to provide a system and method for to precisely determine the location of the vertices or boundaries of lenslets in a lenslet array with respect to pixels (e.g., CCD array) of a corresponding wavefront sensor. Furthermore, it would be desirable to provide a system and method for reconstructing a wavefront from measurement data provided by a pixel array in a wavefront sensor. Even furthermore, it would be desirable to provide a system and method for efficiently computing polynomials for defining a wavefront detected by a wavefront sensor. And, it would be desirable to provide such a system and method which overcomes one or more disadvantages of the prior art.

The present invention comprises a system and method for sensing a wavefront.

In one aspect of the invention, a method of determining a location of a focal spot on a detector array improves upon a "pure" center of mass calculation. When a near plane wave illuminates a square lens, the focal spot has a sinc-squared shape. This knowledge can be exploited to generate a number of improvements to calculating the focal spot peak location.

Several techniques show improvement over pure center of mass methods for locating a focal spot. One technique uses the knowledge that the sinc-squared function has minimum in it before the side lobes appear. The focal spot location algorithm can be written so these minima are located, and then the pixels that are identified as being proper to include in the center of mass calculation will be those that lie within the minima. Another technique is that the shape of the sinc-square function can be fit to values that show up in each pixel. This can be done with least squares method or by "sliding" methods. Then the equation for the sinc-squared gives the location of the peak. Still another refinement is to use a different weighting than a linear weight from center in the calculation of center of mass. The effect is to reduce weight given to dimmer pixels. In particular, this weight can be matched to provide piecewise linear slopes of one, although this reduces the dynamic range of the sensor unless another method is found to eliminate the kinks.

In another aspect of the invention, a method of determining a location and size of a lenslet with respect to a detector array exploits a-priori knowledge of the spacing of the lenslets in a lenslet array. Such a-priori knowledge can be produced by direct measurement of the lenslet arrays by microphotography, by knowledge of the photolithography process, or by other means. In a particularly advantageous manufacturing process, the spacing between lenslet is extremely regular. Accordingly, when one compares algorithms that calculate focal spot locations, the better algorithm is the one that comes up with a the locations in the most regular grid. This can be done on a theoretical basis using the sinc-squared patterns as inputs, or on experimental data using a plane wave to illuminate the lenslet array. Further refinements can be obtained by adding tilt to the plane wave and doing least squares fit to determine spacings.

In a similar way, non-uniform grids can be defined if it is desired to manufacture lenslet arrays with non-uniform spacings.

In yet another aspect of the invention, a method of reconstructing a wavefront from a plurality of focal spots produced on a detector array, includes.

In still another aspect of the invention, a method of determining a set of polynomials defining a wavefront from a plurality of focal spots produced on a detector array, includes.

BRIEF DESCRIPTION OF THE DRAWINGS

Figure 2C:
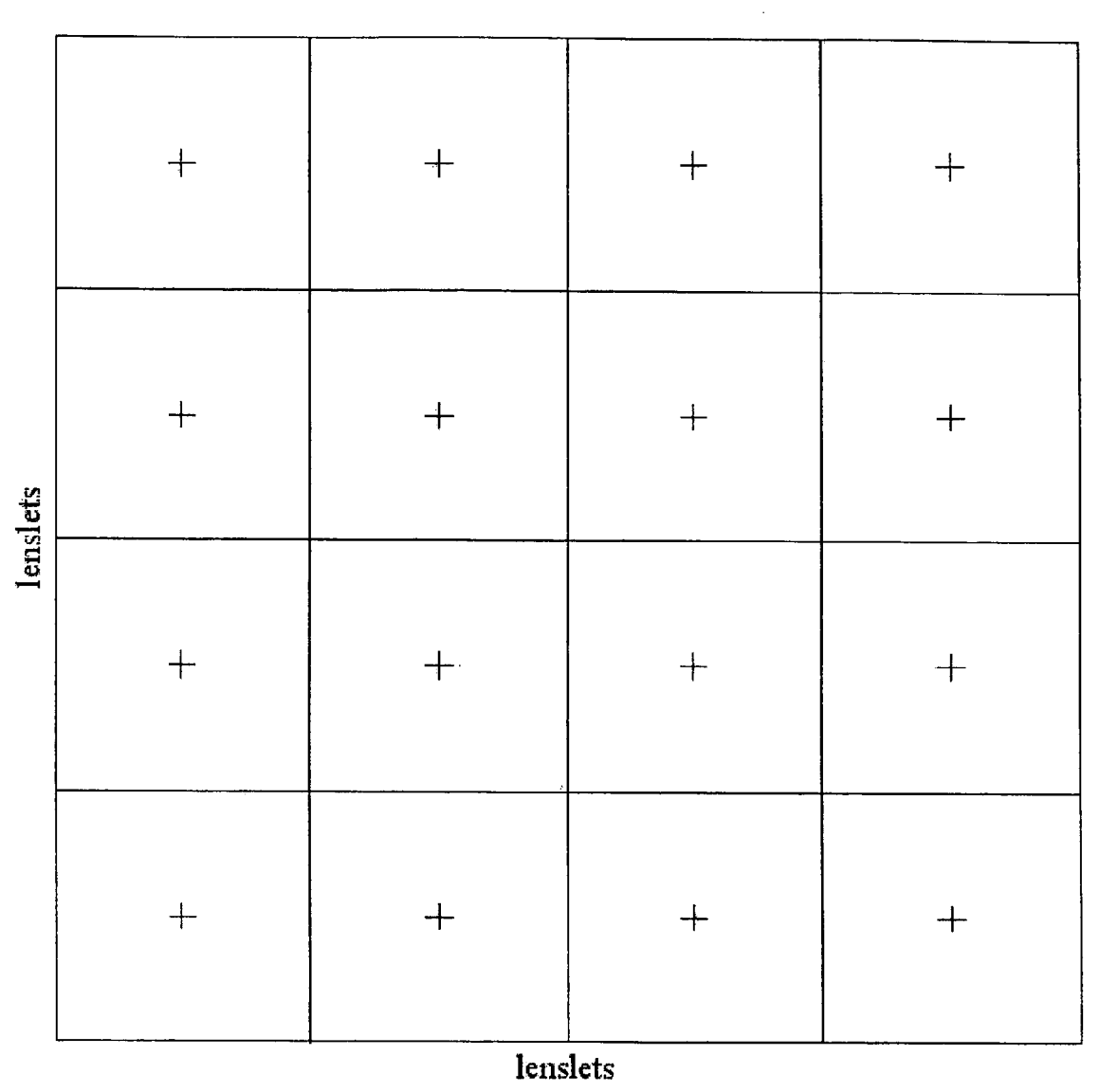

FIGS. 2A-F illustrate a reference beam and a wavefront of interest being imaged onto a detector array.

FIGS. 4A-F show some additional exemplary incident wavefronts and corresponding output irradiance distributions in the focal plane.

DETAILED DESCRIPTION

Figure 1:
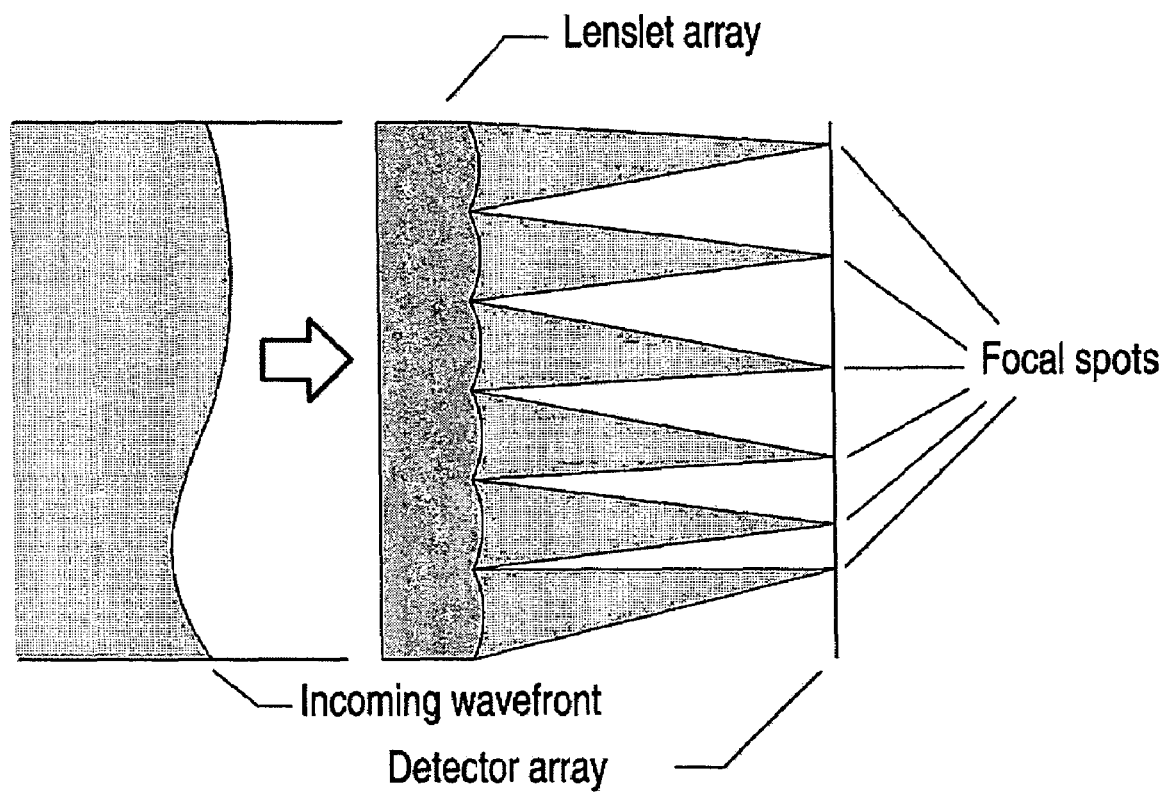
FIG. 1 shows a basic configuration of a Shack-Hartmann wavefront sensor.

Optimized Methods for Focal Spot Location Using Center of Mass Algorithms.

We want to know the location of the focal spot and we use the center of mass technique to approximate this location. The question is: how well does the center of mass approximate the focal spot location? To resolve this issue we begin with a special case, and then move to the situation encountered in the laboratory.

Consider the special case of a spatial irradiance function $g(x)$ being symmetric about the peak in some local region. In other words, the function has even parity about the peak x0 in some local region which is smaller than the integration domain for the center of mass. The requirement for even parity can be written as:

$$g(x-x_0)=g(x+x_0) \quad (25)$$

Since $g(x)$ is even, the antiderivative of this function is odd on this same interval. Defining the antiderivative as:

$$\int g(x)dx = G(x) \quad (26)$$

the parity condition becomes:

$$G(x-x_0)=-G(x+x_0). \quad (27)$$

Now we consider the center of mass computation. Defining the center of mass on some domain [a, b] as:

$$\bar{x} = \frac{\int_a^b xg(x)dx}{\int_a^b g(x)dx} \quad (28)$$

we now have the most general formula. But because of the parity of $g(x)$, we are motivated to consider a symmetric domain centered on the peak. This implies:

$$x_0-a=-(x_0-b). \quad (29)$$

If we consider ρ to be radius we can define:

$$\varrho = x_0-a \quad (30)$$

and the center of mass in equation 28 now becomes:

$$\bar{x} = \frac{2x_0 G(x)\Big|_{x_0-\varrho}^{x_0+\varrho} - \int_{x_0-\varrho}^{x_0+\varrho} G(x)dx}{G(x)\Big|_{x_0-\varrho}^{x_0+\varrho}}. \quad (31)$$

Since $G(x)$ is odd over this domain, the integral vanishes. And using equation 27 the center of mass can be reduced to:

$$\bar{x} = \frac{2x_0 G(x_0+\varrho)}{2G(x_0+\varrho)} = x_0. \quad (32)$$

So when $g(x)$ is symmetric about the peak and the domain is centered on the peak, the center of mass is exactly the focal spot location.

Due to the discreet nature of the CCD array, the pixel addresses are integers and this precludes one from selecting integration boundaries that are centered exactly about the peak. This leads to the consideration of how the center of mass shifts away from the peak. The approach here is to consider the problem as having two parts: a piece with exact symmetry and the piece which shifts the center of mass away from the focal spot location.

For the arbitrary domain [a, b], no longer centered about $x_0$, the center, c, of the domain is:

$$c = \frac{a+b}{2}. \quad (33)$$

This leads to the definition of an asymmetry parameter τ which measures how far the peak is from the domain center:

$$\tau = x_0-c. \quad (34)$$

The next step is to define the radius ρ of the symmetric piece:

$$\varrho = \text{Min}(x_0-a, b-x_0). \quad (35)$$

The center of mass can now be written in terms of the symmetric and asymmetric component as:

$$\bar{x} = \frac{\int_{x_0-\varrho}^{x_0+\varrho} xg(x)dx + \int_{x_0+\varrho}^{x_0+\varrho-2\tau} xg(x)dx}{\int_{x_0-\varrho}^{x_0+\varrho} g(x)dx + \int_{x_0+\varrho}^{x_0+\varrho-2\tau} g(x)dx}. \quad (36)$$

which reduces to:

$$\bar{x} = \frac{(x_0-\varrho)G(x_0+\varrho) + (x_0+\varrho-2\tau)G(x_0+\varrho-2\tau) - \int_{x_0+\varrho}^{x_0+\varrho-2\tau} G(x)dx}{G(x_0+\varrho) + (x_0+\varrho-2\tau)}, \quad (37)$$

As $\tau \to 0$ the integration boundaries become symmetric about the peak and the center of mass approaches the peak, i.e. $\bar{x} \to x_0$.

The error $\delta = \bar{x} - x_0$ in the center of mass result can be expressed in terms of the asymmetry parameter $\tau$ which is a key to a subsequent correction scheme. For the case of a sinc2x function, this error is given as:

$$\delta = \frac{\ln(\varrho) - \ln(\varrho-2\tau) + ci(2(\varrho-2\tau)) - ci(2\varrho)}{2\left(3Si(2\varrho) - Si(2(\varrho-2\tau)) + \frac{\sin(\varrho-2\tau)^2}{\varrho-2\tau} - 3\frac{\sin(\varrho)^2}{\varrho}\right)} \quad (38)$$

where ci(x) is the cosine integral function:

$$ci(x) = -\int_x^\infty \frac{\cos t}{t} dt, \quad (39)$$

and Si(x) is the sine integral function:

$$Si(x) = \int_0^x \frac{\sin t}{t} dt, \quad (40)$$

We now present three correction strategies to improve the center of mass computation and recover a more accurate focal spot location.

Integration Domain Boundary Method.

One method for implementing the center of mass to exploit the results of the analysis above locates the brightest pixel under a lenslet and then marches out in the ±x and ±y directions to find the four minima. These four pixels define the boundary of a rectangular integration domain. The smallest of the four minima is used as a threshold and this value is subtracted from all pixels in the integration domain.

Figure 5:
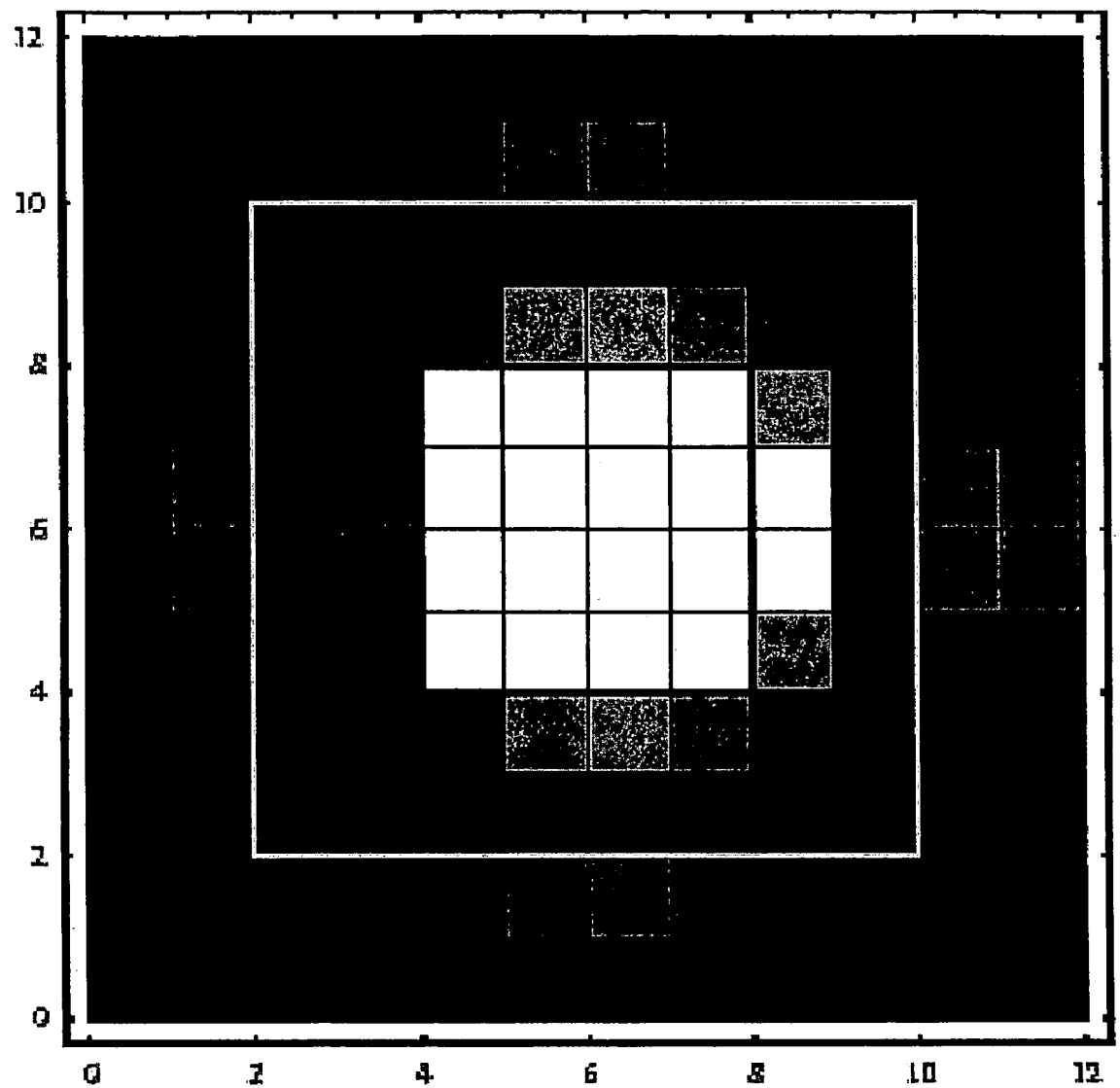
FIG. 5 shows simulated CCD data.
Figure 6A:
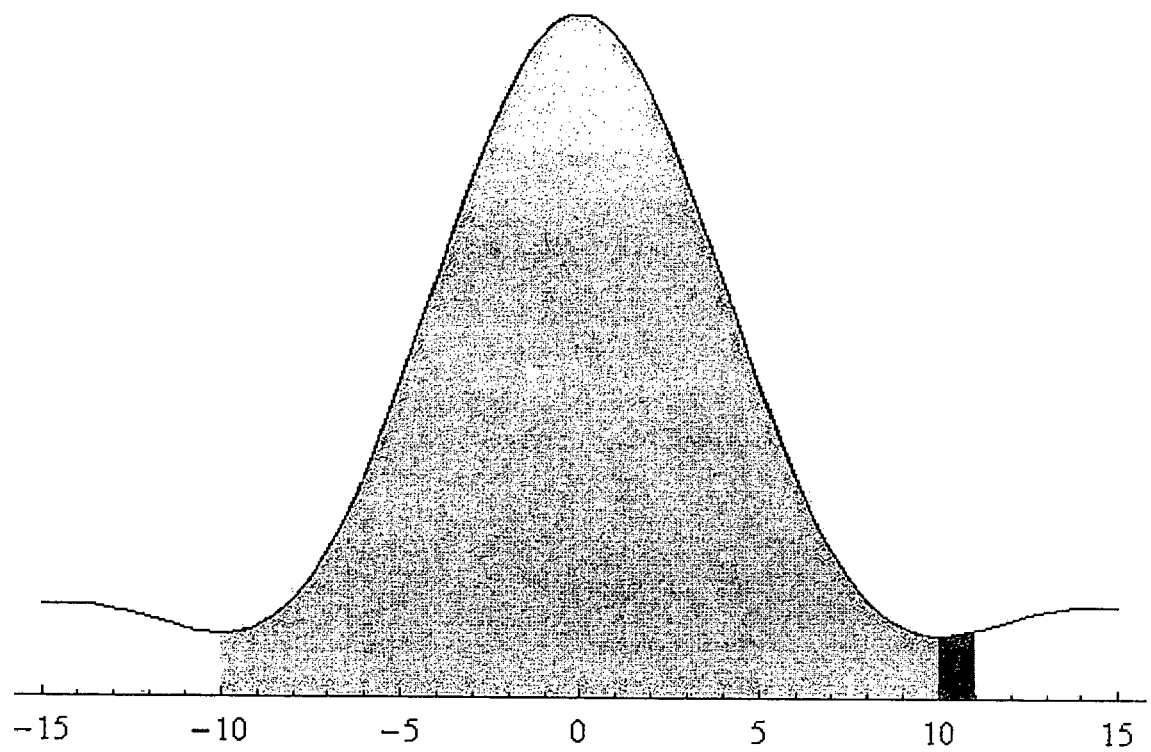
FIGS. 6A-B illustrate center of mass calculations.
Figure 6B:
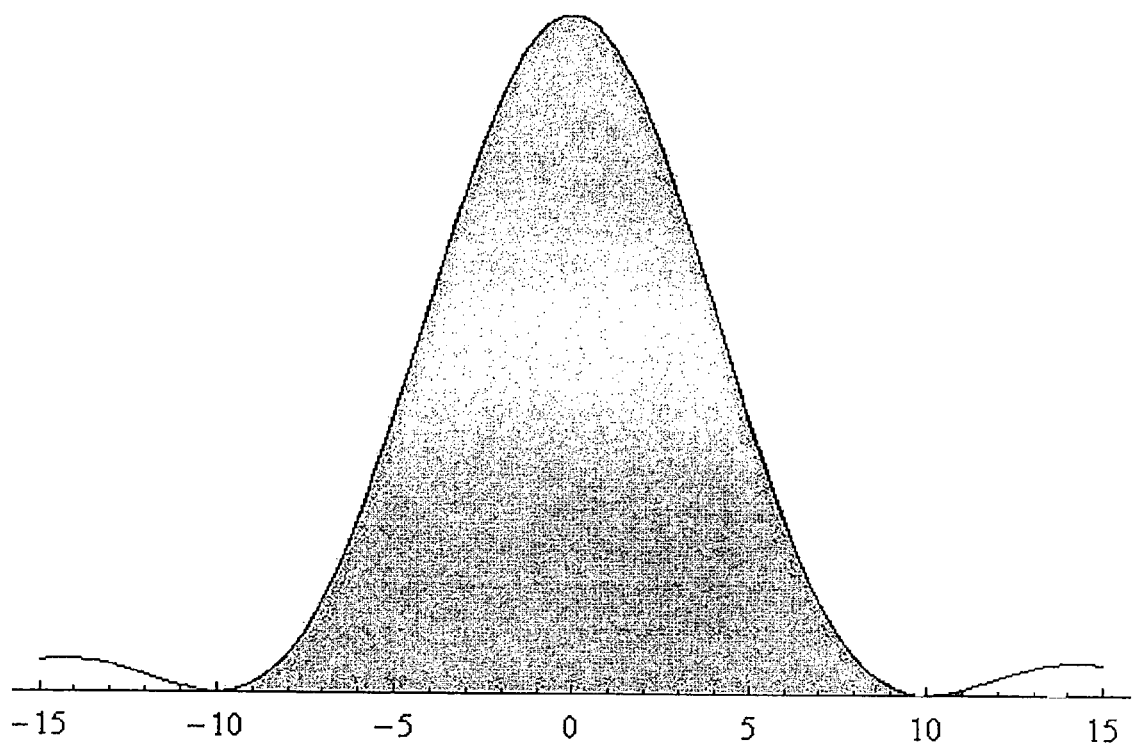

FIG. 5 shows simulated CCD data for illustrating how an irradiance distribution is represented discretely. Here the incident wavefront was isoplanatic and with a small tilt component. The rectangular box defined by the white lines represent the integration region. Here the error is pixels. $\delta^T = (0.013, 0.002)$ FIGS. 6A-B shows that the center of mass calculation does not match the focal spot location in the general case (FIG. 6A) due to an asymmetry. The center of mass can be thought of as having two components: a symmetric piece (light gray) and the asymmetric component (dark gray). FIG. 6B shows that removing the pedestal greatly reduces the shift caused by the center of mass computation by reducing the contribution of the asymmetric piece. The asymmetric piece is the contaminant that pulls the center of mass value away from the peak location. Successful center of mass strategies will minimize the effect of this piece.

FIGS. 6A-B illustrate the wisdom of the Integration Domain Boundary method. First of all, it endeavors to symmetrically bound the peak, which minimizes the error in the center of mass computation. This also utilizes more pixels than a thresholding method, which provides more information and improves the accuracy. Now the asymmetric contaminant is also minimized near the minimum. The total area in the darker region causes error in the computation. Near the minimum, this piece has the smallest height. And after removing the pedestal (the dark count from the camera), the piece is even smaller. The width of the piece is now less than the width of a pixel. So this simple scheme exploits the lessons from the analysis above all without having to provide a threshold a priori.

There is a drawback to this method in that as the distance between the asymmetric piece and the peak increases, the lever arm also increases. In other words, a unit area added to the center of mass is more harmful at larger distances. However it appears that in the cases of square lenslets with well-defined sinc2x sinc2y focal spots, the lever arm effect is more than compensated for by the height minimization at the minimum. This seems to suggest against using the second minimum as the lever arm doubles.

Some basic numerical studies were on simulated camera files created using the propagation equations defined above. These data did not include either noise or cross-talk from neighboring lenslets. The advantage of simulated data is that one has exact knowledge of the peak and can exactly quantify the error in the center of mass calculation. For comparison purposes, a classic center of mass with a threshold of 12% was used. The average error $\delta^T = (\delta_x, \delta_y)$ for each method was then computed for 4096 samples all where the peaks were within one pixel of the projection of the lenslet center. The standard deviation of the errors are:

$\sigma_\delta^T = \{0.015, 0.015\}$ pixels for the pure center of mass method, and $\sigma_\delta^T = \{0.010, 0.011\}$ pixels for the integration domain boundary method.

Modified Integration Domain Boundary Method.

The above Integration Domain Boundary method is an excellent starting point for improving the center of mass calculation. In the cases where the form of the irradiance distribution is known, an additional improvement is possible. Since the shape of the distribution is known, one can look at the difference between the center of mass and the asymmetry parameter and make a quick correction based on a two-dimensional version of equation (38). In the sample environment tested, the additional correction was able to remove 90% of the error, reducing the error by an order of magnitude.

Figure 7:
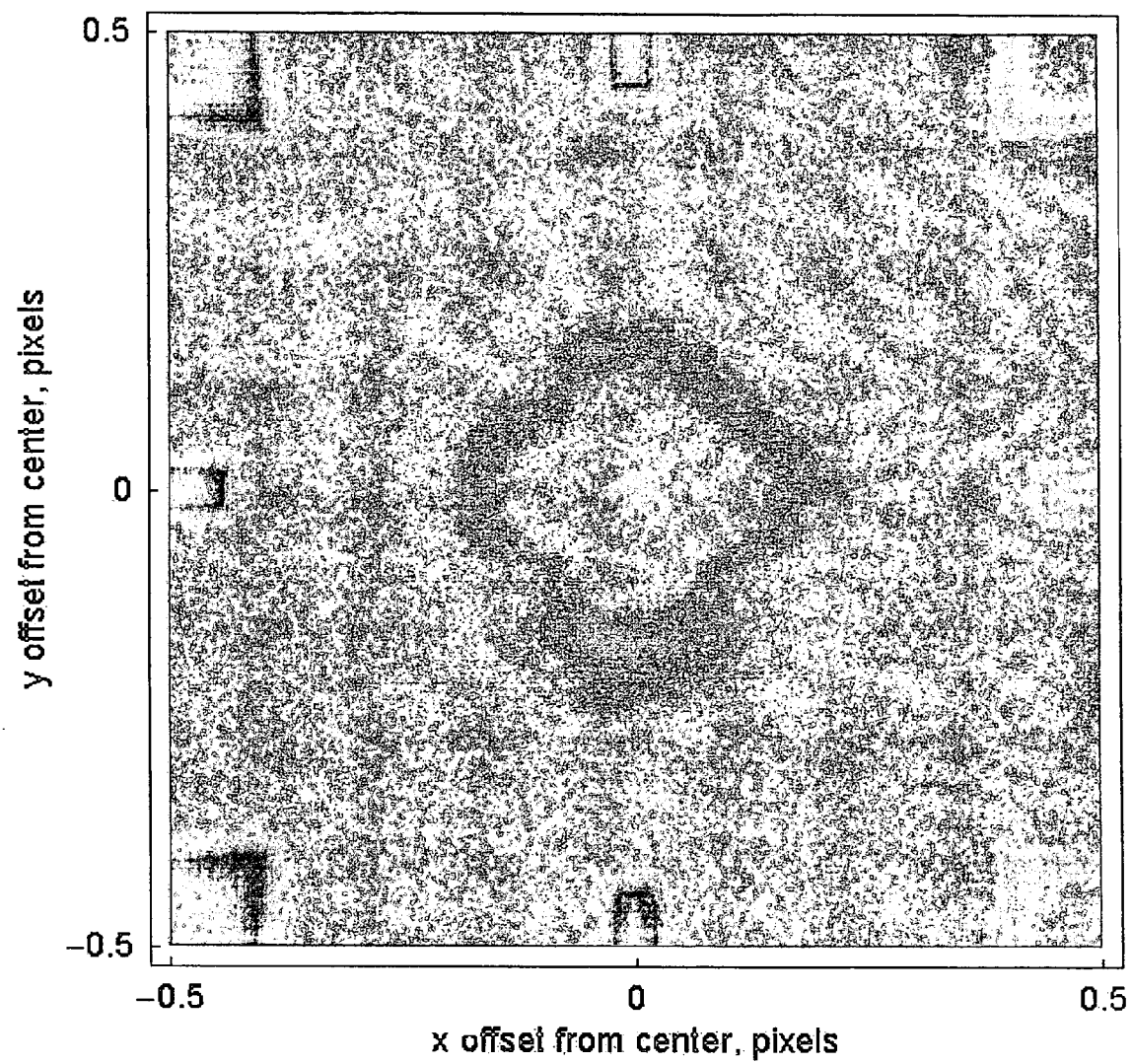
FIG. 7 plots error in the center of mass calculation.

FIG. 7 shows the error in the center of mass computation as a function of peak offset from the center of the pixel. The axes describe the distance the peak was offset from the center of the pixel. The color of the block reveals the magnitude of the error. As expected, there is no error when the peak is centered in the pixel. The maximum error in this example was 0.03 pixels. The effect of the discrete change in integration boundaries manifests distinctly as an abrupt change in the error.

Figure 8:
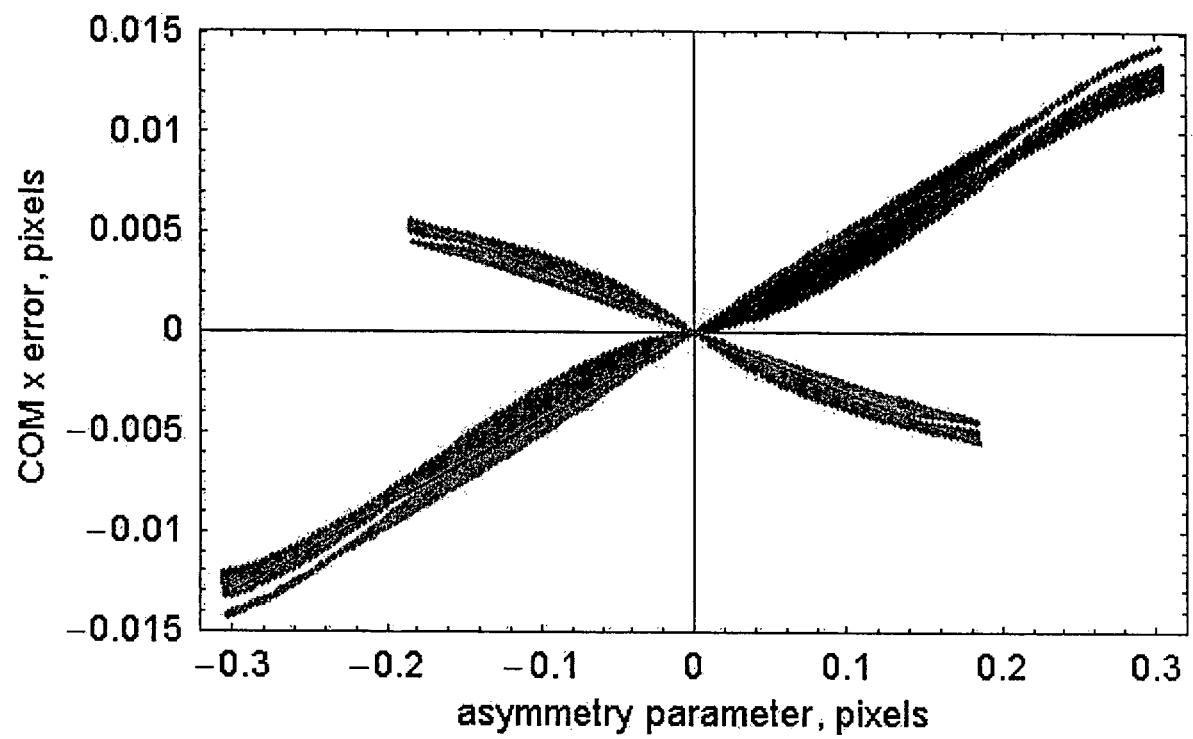
FIGS. 8-25 illustrate other aspects of the invention.

The error variations in FIG. 7 were studied in the x and y components. The next step was to plot the error components as a function of the asymmetry parameter. A surprisingly simple variation was observed and is shown in FIG. 8. FIG. 8 plots the center of mass error as a function of the asymmetry parameter. Here the graph shows the x component of the error plotted in FIG. 7. Note that the functional relation between error and the asymmetry parameter is linear with two distinct branches. The errors are essentially linear with respect to the asymmetry parameter τ with two distinct branches. This implies that a simple linear correction can be used to push the center of mass closer to the focal spot location. For these data the results of the linear fits were:

positive branch error=(0.043756±0.000004)τ+ (0.00000±0.00002)

negative branch error=(−0.0305515±0.000004)τ+ (0.00000±0.00002)

The beauty of this method is that the slopes for the positive and negative branches are functions of the wavefront sensor. As such, they only need be determined one time. The method is to compute a center of mass and an asymmetry parameter. Then determine which branch of the correction is appropriate, and apply a simple linear boost to nudge the center of mass closer to the peak location. The nudge is applied separately to the x and y components of the center of mass prediction.

FIG. 8 allows one to see graphically how precise this correction can be. The vertical spread in each cluster of points is approximately 0.002 pixels. The linear correction basically cuts this in half, leaving us with an error of approximately 0.001 pixels. Attempts to reduce the error further by handling the problem in two dimensions failed.

For example, if the asymmetry parameter was at the maximum of τ=0.3 pixels, the correction is:

(0.043756±0.000004)0.3+(0.00000±0.00002)=−0.01313±0.00002 pixels.

which is added to the computed center of mass. This will bring the computation to within 0.001 pixels of the true focal spot location.

Another strategy has been developed which is an iterative scheme. The gist of the method is that one computes the center of mass and develops an approximate focal spot location, $(x_0, y_0)$. This location should easily be within a pixel of the true focal spot location. A new integration domain is now defined, centered on the center of mass value, using all the data within the first minima. We know from equation 9 that the half-width is $\rho = f\lambda/d$. So the integration domain is $[x_0-\rho, x_0+\rho]$ and the integration range is $[y_0-\rho, y_0+\rho]$. Using these new boundaries, a new center of mass is computed, $(x_1, y_1)$, along with new boundaries. The process continues until the distance between peak locations on consecutive iterations is smaller than some arbitrary acceptance parameter.

The problem is that now the integration boundaries are no longer integer pixel values, but they lie within the pixels. So the heart of this scheme is to find a way to apportion the light within a pixel and maintain the speed advantage of the center of mass. While the exact computation of this apportionment can be messy, the exact solution can be approximated quite well with a polynomial.

Consider the cases of sinc²x in one dimension. The parameter φ describes where the minimum falls within the pixel. For example, if the minimum is in the middle of the pixel then φ=0.5; if the minimum is three quarters of the way across the pixel then φ=0.75. The function ω(φ) is weighting function varying from zero to one which describes how much of the light to include from the pixel. In this case the weighting function is given exactly as:

$$\omega(\varphi) = \frac{f\lambda \sin\left(\frac{\pi d}{f\lambda}\varphi\right) + \pi(f\lambda - d\varphi)\left(a - Si\left(2 - \frac{2d\varphi}{f\lambda}\right)\right)}{(f\lambda - d\varphi)\left(f\lambda\left(\frac{\sin\left(\frac{\pi d}{f\lambda}(\varphi-1)\right)}{d+f\lambda-d\varphi} + \frac{\sin\left(\frac{\pi d}{f\lambda}\varphi\right)}{d\varphi - f\lambda}\right) - \pi\left(Si\left(\frac{2\pi(d+f\lambda-d\varphi)}{f\lambda}\right) + Si\left(2 - \frac{2d\varphi}{f\lambda}\right)\right)\right)} \quad (41)$$

The constant a represents:

$a = Si(2\pi)$
≈1.4181515761326284502457801622997494291424533492950

Notice that this is for pixels on the right-hand side. One can exploit the even parity of the sinc²x function to get the values for the left-hand side.

Figure 9:
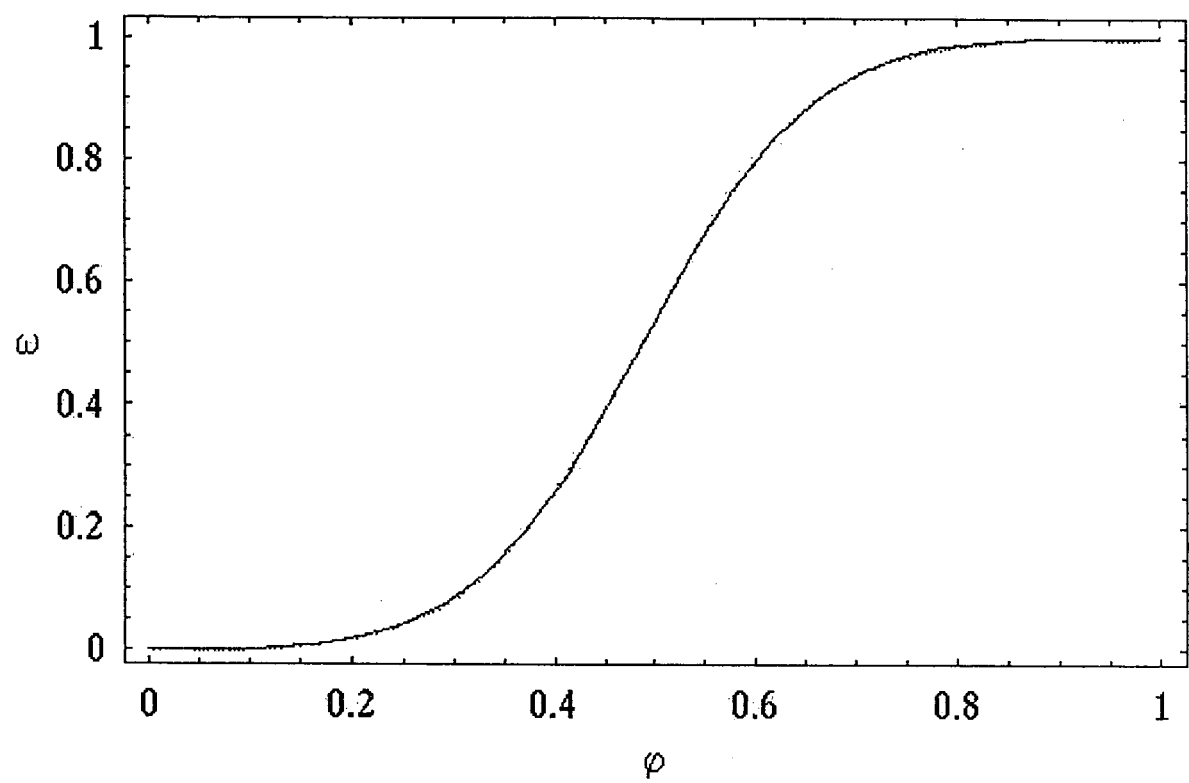
Figure 10:
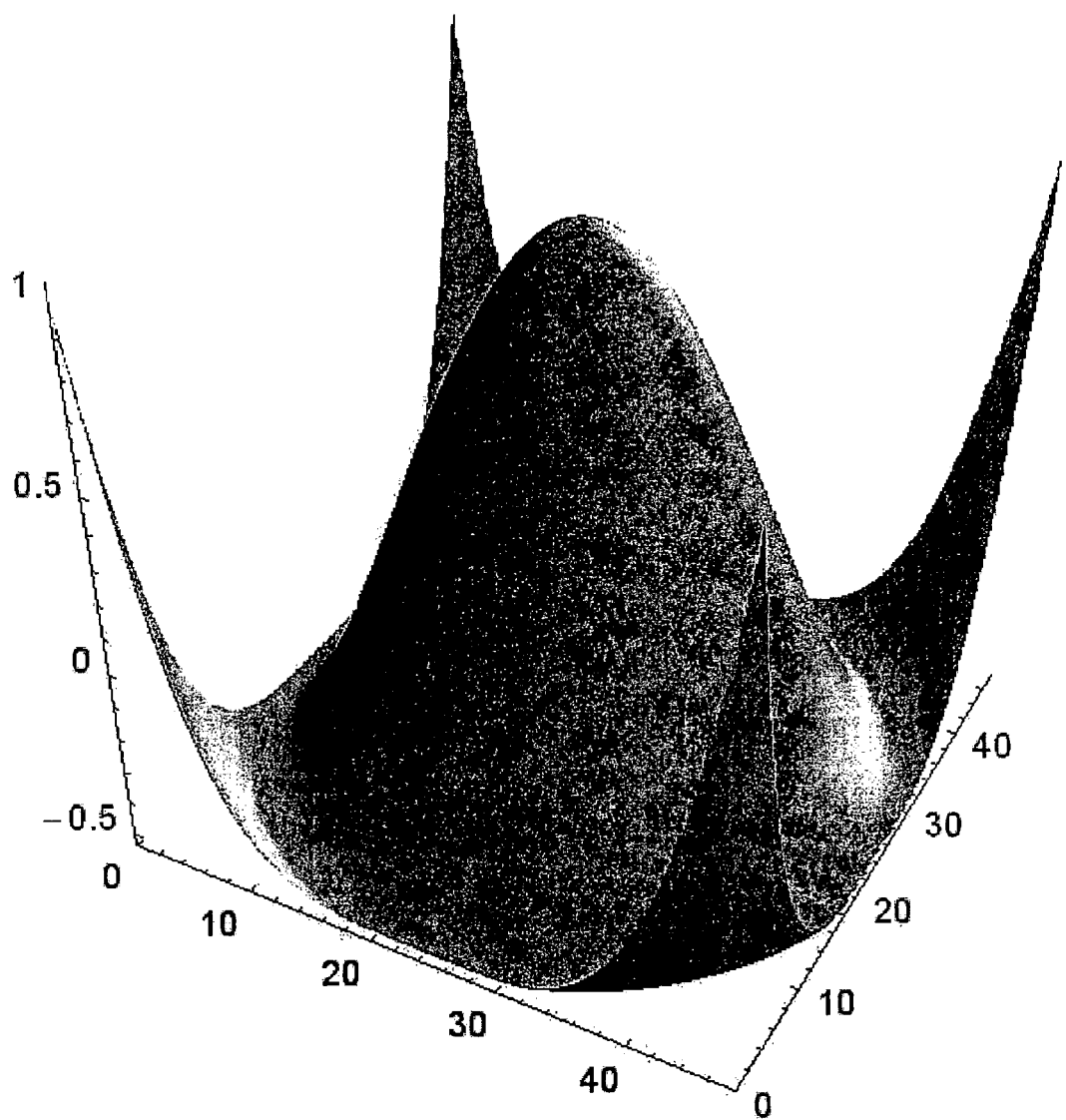
Figure 11:
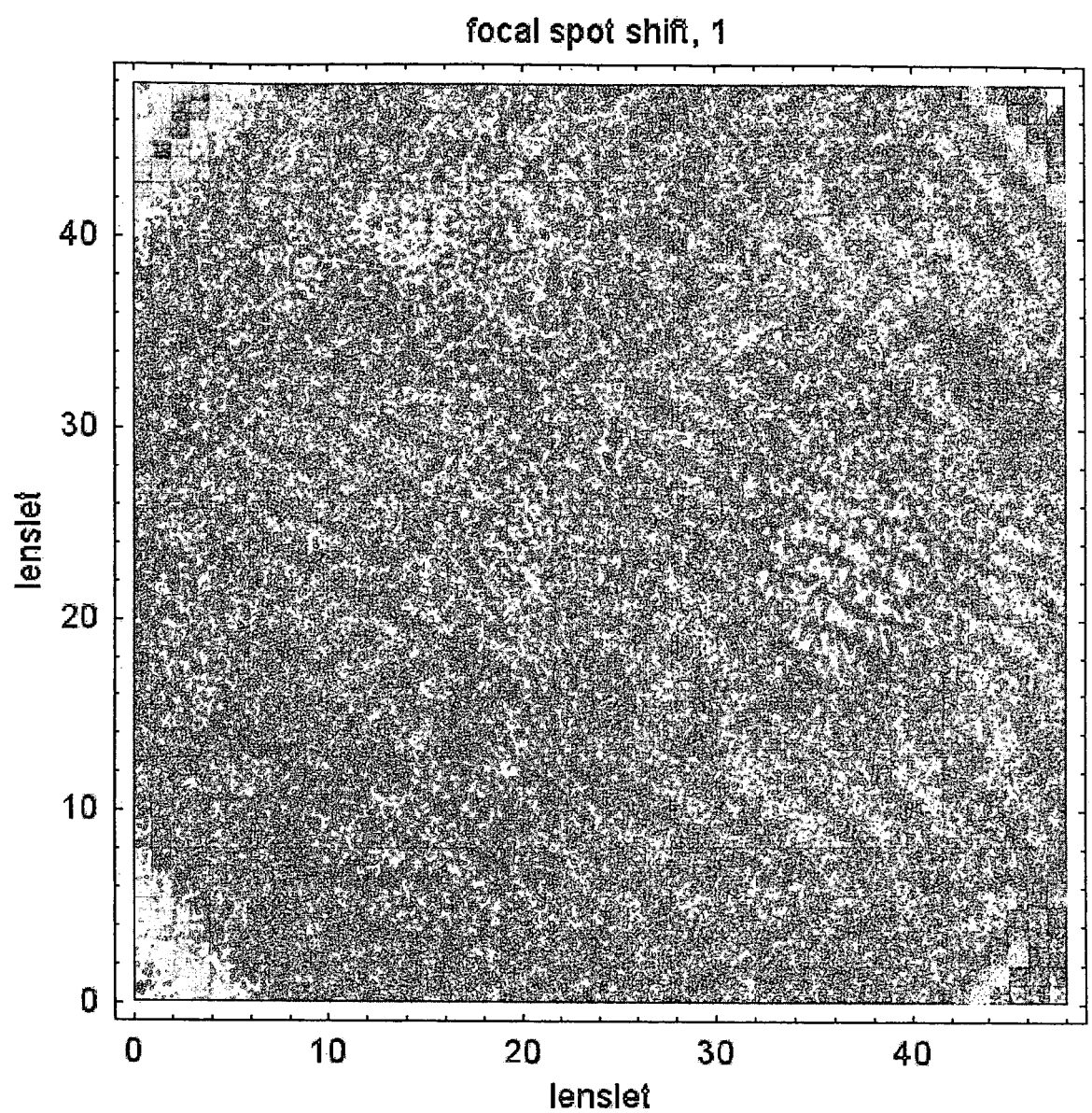
Figure 12:
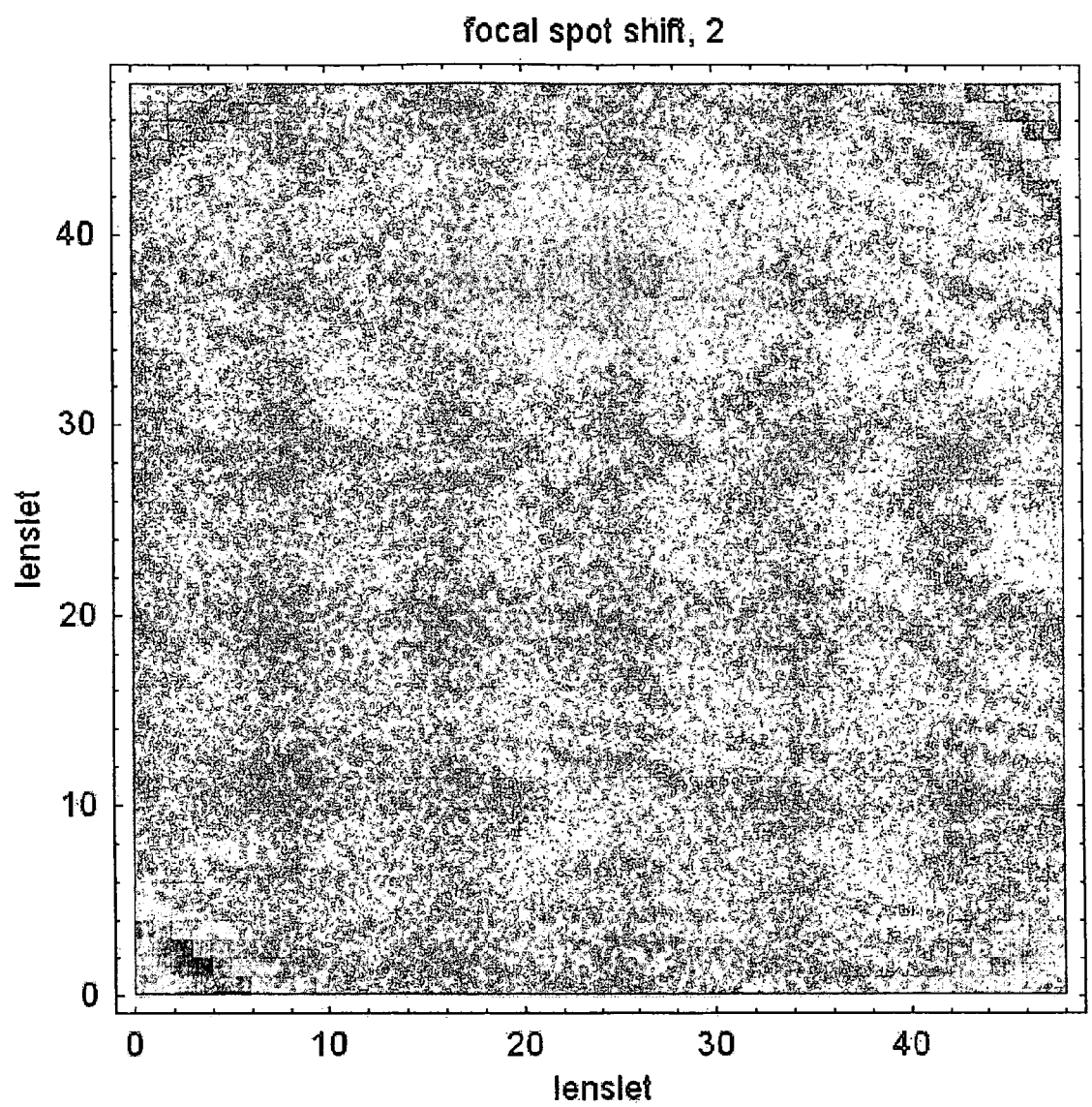

The problem is of course that a naïve implementation of Si(x) will slow down the algorithm tremendously. We can exploit the fact that over the domain interest, φϵ[0,], the function has a rather simple behavior. FIG. 9 shows the weighting function as a solid curve. The points are the results of polynomial least squares fit through order nine. The agreement is quite good.

We can write the approximate solution Ω(φ) as:

$$\Omega(\varphi) = c_0 + \sum_{t=1}^{N} c_n \varphi^n \quad (43)$$

wherein n represents the degree of fit. In FIG. 9, n=9. Notice that this formulation avoids the ambiguous quantity 0⁰. Of course a direct implementation of equation 43 would be ponderously slow and erode the speed advantage of the center mass technique. We show two different ways to encode these results in C++:

```
double c[10];                    //LSF fit coefficients
c[0] = 783.7320568947441;        //constant term
c[1] = -3448.7204133862506;      //linear term
c[2] = 6172.40085200703;         //coefficient for x^2
c[3] = -5739.328837072939;
c[4] = 2945.8812707469388;
c[5] = -833.7602125492338;
c[6] = 130.30391297857992;
c[7] = -9.792719111240226;
c[8] = 0.2907165577816425;       //coefficient for x^9
...
double omega(double * c, double phi, int n)   //weighting function
// c      LSF fit coefficients for equation 41
// phi    pixel fraction
// n      degree of polynomial least squares fit
// lsf    weighting factor to use (omega[phil])
{
    double lsf = 0                //LSF prediction
    for (int i = n; i > 0; i--)   //loop through orders
        lsf = phi * (lsf + c[i]); //build up answer
    lsf += c[0];                  //add in constant term
    return lsf;                   //return the answer
}
```

This is an elegant implementation that easily accommodates fits of arbitrary order through adjusting the parameter n. However, a somewhat faster method is

```
double f(double * c, double phi)          //rapid polynomial
{
    double lsf = c[0] + phi * (c[1] + phi * (c[2] + phi * (c[3]
            + phi * (c[4] + phi * (c[5] + phi * (c[6]
            + phi * (c[7] + phi * (c[8] + phi * (c[9])))))))));
    return lsf;
}
```

The first method took 16% longer to execute than the second method. A straightforward implementation of equation 43 took 13 times longer than the second method.

We have shown formally the well-known result that the shift in the focal spot location is proportional to the average wavefront slope across a lenslet. The result is exact in the isoplanatic and small angle limits. We then showed the relationship between the focal spot location and the center of mass computation. The accuracy of the assumption that the center of mass is the focal spot location depends directly upon how symmetrically the integration domain bounds the peak. When the domain is exactly symmetric, the center of mass exactly represents the peak. Of course with real data, the integration boundaries are not centered upon the peaks. We closed with three strategies to improve the accuracy of the center of mass computation and preserve the time advantage of the method.

Precision Measurements of a Lenslet Array.

As discussed above, a critical step in data processing involves fixing the focal spot location and a common method used for quickness is the center of mass. But naïve applications of this method have a precision of 0.01 pixels, which forms an inherent precision boundary for all computations.

While the error in the center of mass technique is highly systematic, its manifestation in an experimental measurement is typically, to first order stochastic. The challenge then becomes how to remove these stochastic errors. The first tool in such situation is the least squares fit which is a simple way to remove stochastic errors.

Here we describe how a least squares fit is used to precisely measure the size and location of a lens-let array. Here we assume a rectangular lenslet and slide the grid around to find the best location assuming the focal spot locations are under the center of each lenslet.

The least squares fit.

The first decision is which parameters to extract from the least squares fit. Although we could assume a square lenslet configuration, we used a rectangular configuration. Of course we expect to find a square, but by solving for the two widths (dx, dy) independently, we are able to check the quality of the result by seeing if the aspect ratio is unity. Also, this formulation allows for the more general case of rectangular lenslets. The other free parameter is the location of the lenslet origin, $O^T = (x_0, y_0)$.

The fitting strategy is elementary. Consider two rows of points, the points corresponding to the focal spot locations under each lenslet. We would want to find the height of a line which best bisects the two rows.

$$\chi^2 = \sum_c \left( h - \frac{1}{2}(y_{r,c} + y_{r+1,c}) \right)^2 \tag{44}$$

Here r is the row index and c is the column index and y is the abscissa of the focal spot location. The summation is across all columns and involves and arbitrary row r and the next row, r+1. Clearly, if all the points rested upon two horizontal lines, the merit function $\chi^2$ would be zero when h is the bisector.

This method is easily extended to the other dimension by finding the line which best bisects each column. To formulate the full problem in two dimensions, we need to define a few quantities. We already have the origin vector O, $$O = \begin{bmatrix} x_0 \\ y_0 \end{bmatrix}, \tag{45}$$

and the lenslet width vector d, $$d = \begin{bmatrix} dx \\ dy \end{bmatrix}. \tag{46}$$

We need to define a position vector i, which specifies the row and column the lenslet:

$$i = \begin{bmatrix} r \\ c \end{bmatrix} \tag{47}$$

Finally we note that the focal spot location for the lenslet in column c and row r of the $$f_i = \begin{bmatrix} x \\ y \end{bmatrix}, \tag{48}$$

so we are loading the x and y locations into a vector for efficient computation. We note that the k vector describes the number of rows and columns in the lenslet array that are projected onto the CCD array:

$$k = \begin{bmatrix} k_c \\ k_r \end{bmatrix}. \tag{49}$$

Finally we need a collection of basis vectors. In two dimensions, it is a spinor:

$$\sigma = \begin{Bmatrix} \begin{bmatrix} 1 \\ 0 \end{bmatrix} \\ \begin{bmatrix} 0 \\ 1 \end{bmatrix} \end{Bmatrix}. \tag{50}$$

This structure points to the neighboring object. Although this is a two-dimensional problem, this methodology can be trivially extended to an arbitrary number of dimensions and it reduces the complexity of computer code.

If we use μ as a spacetime index to sum over the dimensions, the full merit function is $$x^2 = \sum_{\mu=1}^{2} \sum_{p=(1,1)}^{k-\sigma_\mu} \left(O_\mu + i_\mu d_\mu - \frac{1}{2}(f_p + f_{p-\sigma_\mu})\right)^2. \quad (51)$$

The problem is solved in the canonical fashion. All first derivatives of the fitting parameters are forced to zero simultaneously by solving a set of linear equations. That is, the four simultaneous requirements that:

$$\partial_o \chi^2 = 0, \quad (52)$$

and $$\partial_d \chi^2 = 0, \quad (53)$$

generate a series of matrix questions. The solution to these equations follows.

First, we define some intermediate variables. There are two summation variables, n and α. They are given by:

$$n_\mu = \sum_{1,1}^{k-\sigma_\mu} 1, \quad (54)$$

and $$\alpha_\mu^j = \sum_{1,1}^{k-\sigma_\mu} i^j. \quad (55)$$

If every lenslet registers a focal spot, then these quantities are (CRC Standard Mathematical Tables, p 54):

$$n = \begin{bmatrix} k_r(k_c - 1) \\ k_c(k_r - 1) \end{bmatrix}, \quad (56)$$

$$\alpha^1 = \begin{bmatrix} k_r \frac{k_c(k_c+1)}{2} \\ k_c \frac{k_r(k_r+1)}{2} \end{bmatrix}, \text{ and} \quad (57)$$

$$\alpha^2 = \begin{bmatrix} k_r \frac{k_c(k_c+1)(2k_c+1)}{6} \\ k_c \frac{k_r(k_r+1)(2k_r+1)}{6} \end{bmatrix}. \quad (58)$$

Finally, we define a determinant, $\Delta$:

$$\Delta_\mu = n_\mu \alpha_\mu^2 - (\alpha_\mu^1)^2 \quad (59)$$

We can now begin writing out the solutions. The lenslet origin is:

$$O_\mu = \frac{\alpha_\mu^2 \sum_{p=1,1}^{k-\sigma_\mu}(f_{p\mu} - f_{(p-\sigma_\mu)\mu}) - \alpha_\mu^1 \sum_{p=1,1}^{k-\sigma_\mu}(f_{p\mu} - f_{(p-\sigma_\mu)\mu})i_\mu}{2\Delta_\mu}. \quad (60)$$

The lenslet size is:

$$d_\mu = \frac{n_\mu \sum_{p=1,1}^{k-\sigma_\mu}(f_{p\mu} - f_{(p-\sigma_\mu)\mu})i_\mu - \alpha_\mu^1 \sum_{p=1,1}^{k-\sigma_\mu}(f_{p\mu} - f_{(p-\sigma_\mu)\mu})}{2\Delta_\mu}. \quad (61)$$

We now turn our attention to the computation of statistical uncertainties. The first quantity to compute is the sample standard deviation (Bevington, p 19):

$$s^2 = \frac{\sum_{\mu=1}^{2} \sum_{p=(1,1)}^{k-\sigma_\mu}\left(O_\mu + i_\mu d_\mu - \frac{1}{2}(f_p + f_{p-\sigma_\mu})\right)^2}{n_\mu - 2}. \quad (62)$$

This allows us to compute the uncertainties in the size of the lenslets and the position of the array. The uncertainty in the lenslet origin is:

$$\sigma_{O_\mu}^2 = s^2 \left(\frac{\alpha_\mu^2 - (\alpha_\mu^1)^2}{\Delta_\mu}\right)^2 \quad (63)$$

and the uncertainty in the lenslet width is:

$$\sigma_{d_\mu}^2 = s^2 \left(\frac{(n_\mu - 1)\alpha_\mu^1}{\Delta_\mu}\right)^2. \quad (64)$$

A sample lenslet and camera were chosen to illustrate this method. This sensor uses a 60×60 array of square lenslets. Each lenslet is 280μ across with a spherical profile and a focal length of 28 mm. The array is etched into fused silica and the lenslets have a 100% fill factor. The camera used had 14μ pixels in a 1024×1024 grid. The output was digitized to 12 bits. The lenslet array was placed approximately 36 mm (1.3 focal lengths) from the CCD array.

By design, the lenslet array is much larger that the CCD array, so a subset of the lenslets are used. Here we used a 50×50 subset of the lenslets. An optical fiber was set 750 mm from a collimating lens and a shear plate was used to check collimation. A differential micrometer was used to translate the fiber in a plane perpendicular to the direction of propagation. This method introduced up to 400 μRad of tip and tilt in 50 μRad increments. The data were analyzed for each position and a subset of the results are shown in table 1 below. A differential micrometer was used to introduce tip and tilt in 50,Rad increments. The computations in equations 60-64 were then performed on the new data set. For these 2500 lenslets, the array was found to be:

size=20.0005±0.0008×20.0025±0.0008 pixels, and location of the origin of the array was found at the pixel address of:

location=(16.92±0.02, 15.58±0.02) pixels.

The aspect ratio of the lenslet is then:

$$\text{aspect} = \frac{20.0025 \pm 0.0008}{20.0005 \pm 0.0008} = 1.00010 \pm 0.00006 \quad (65)$$

implying that the lenslets are very close to being square.

Figure 2A:
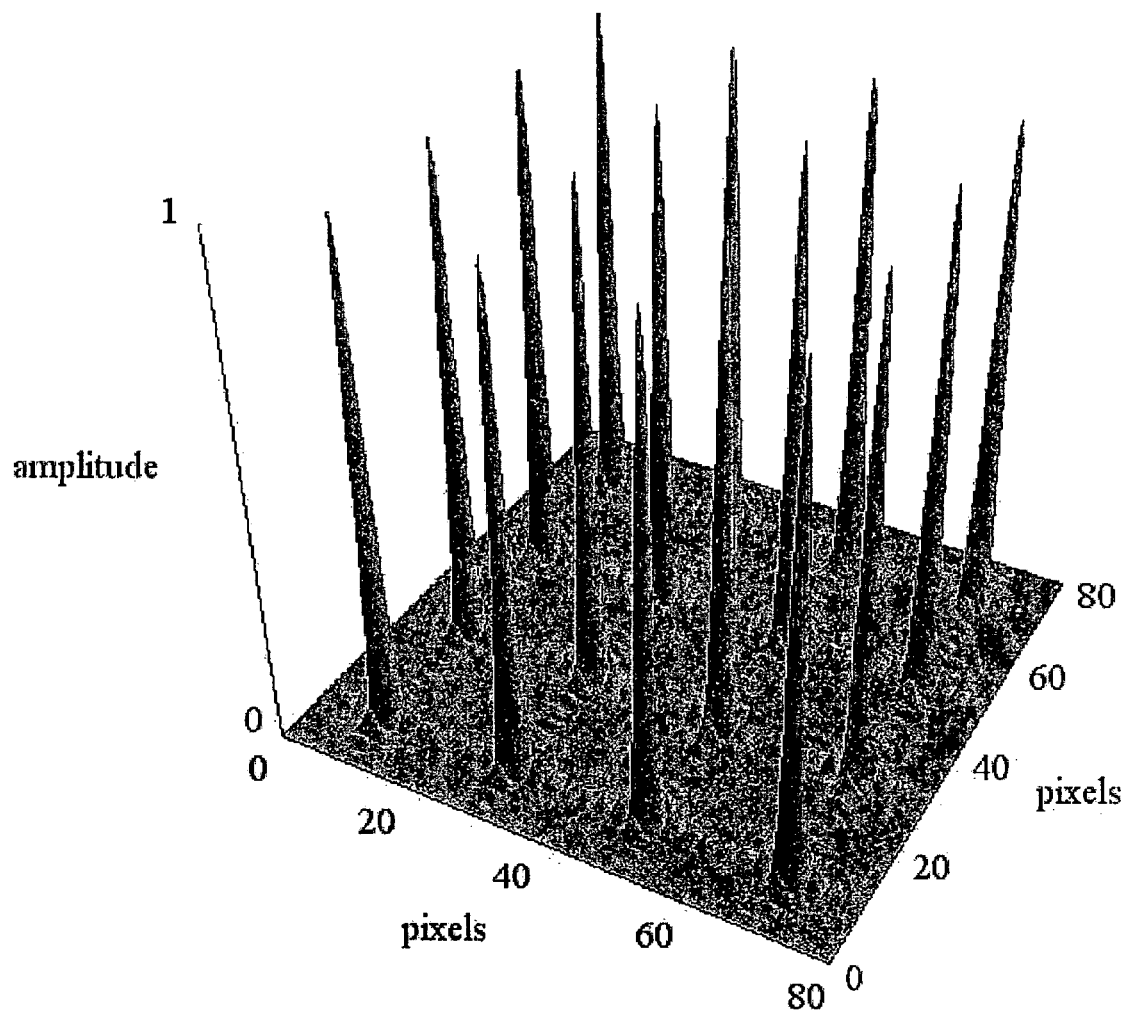
Figure 2B:
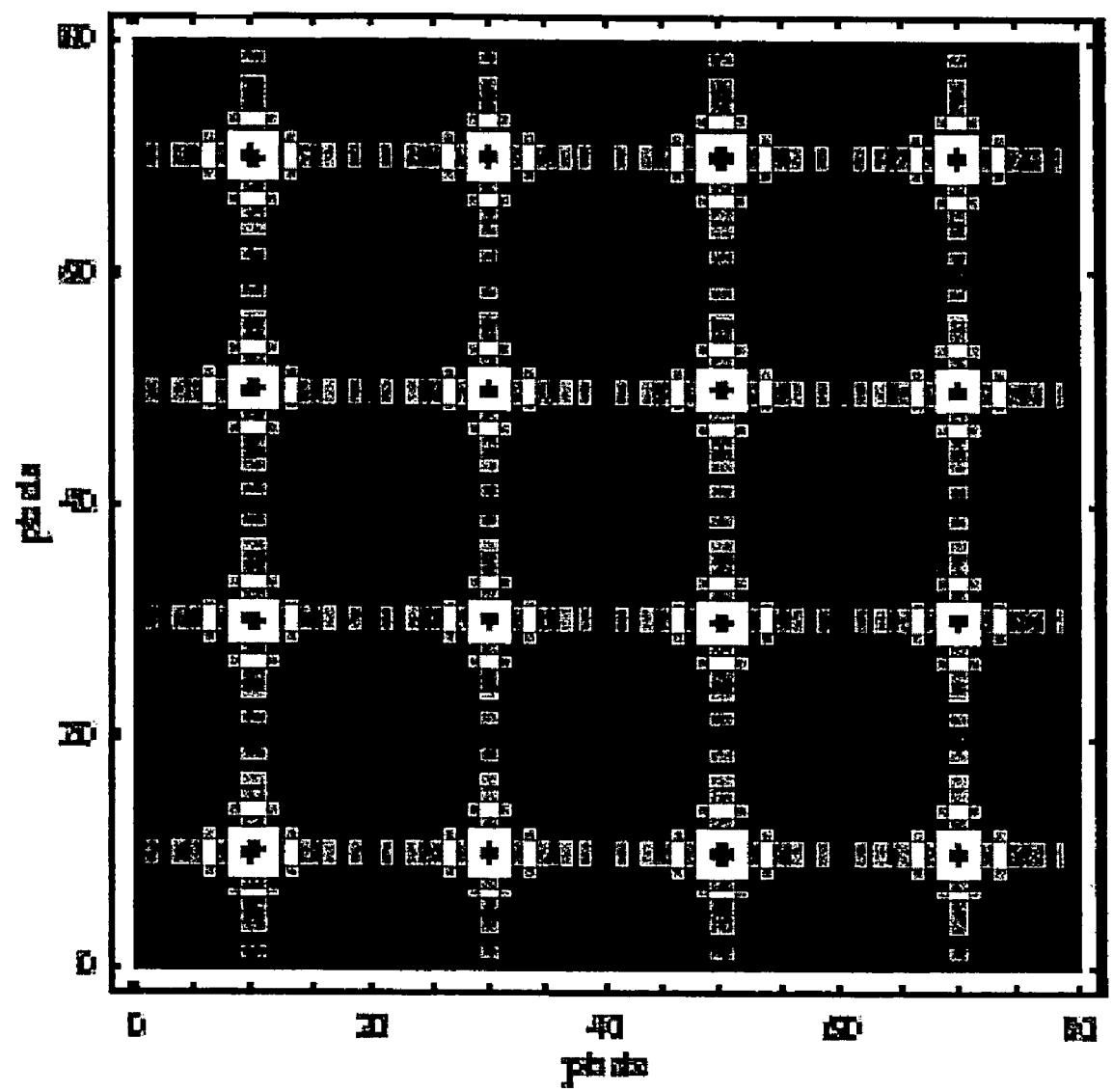
Figure 2D:
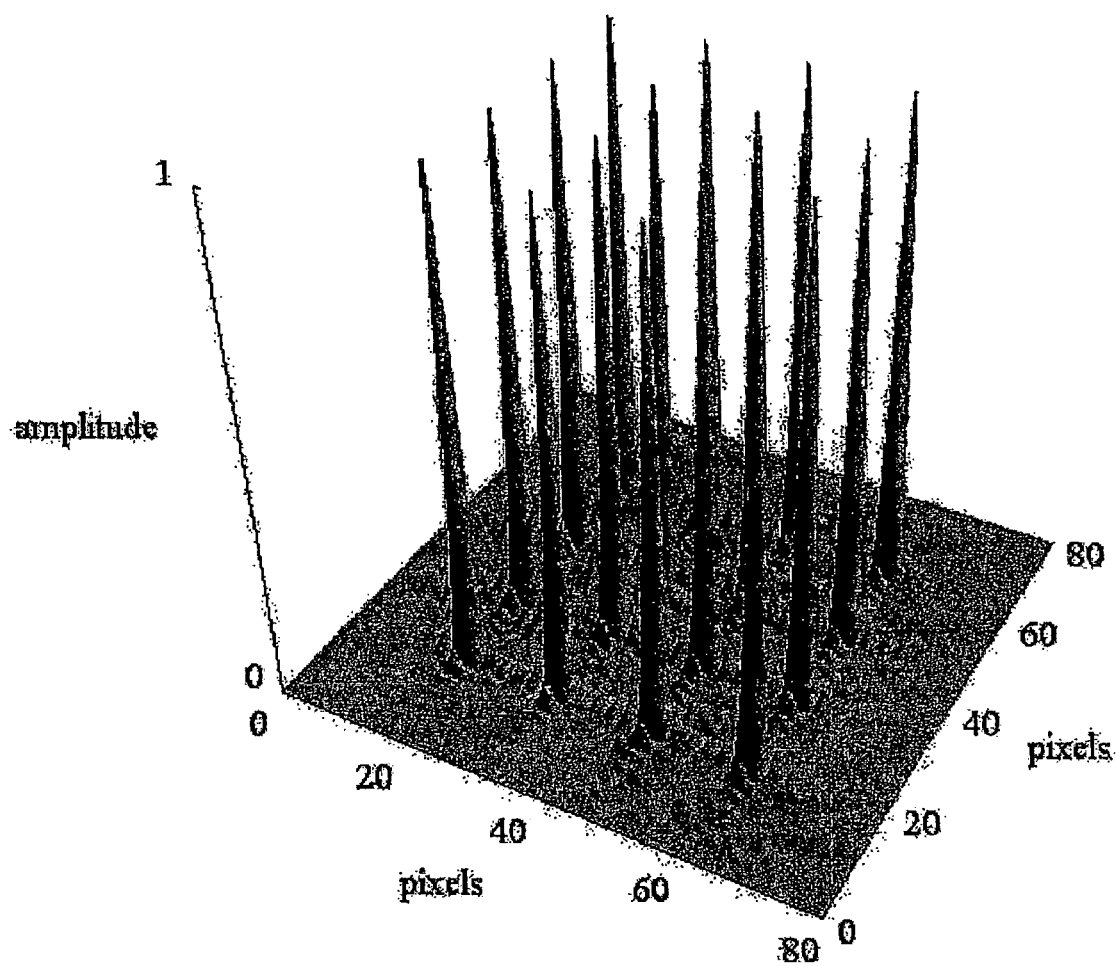
Figure 2E:
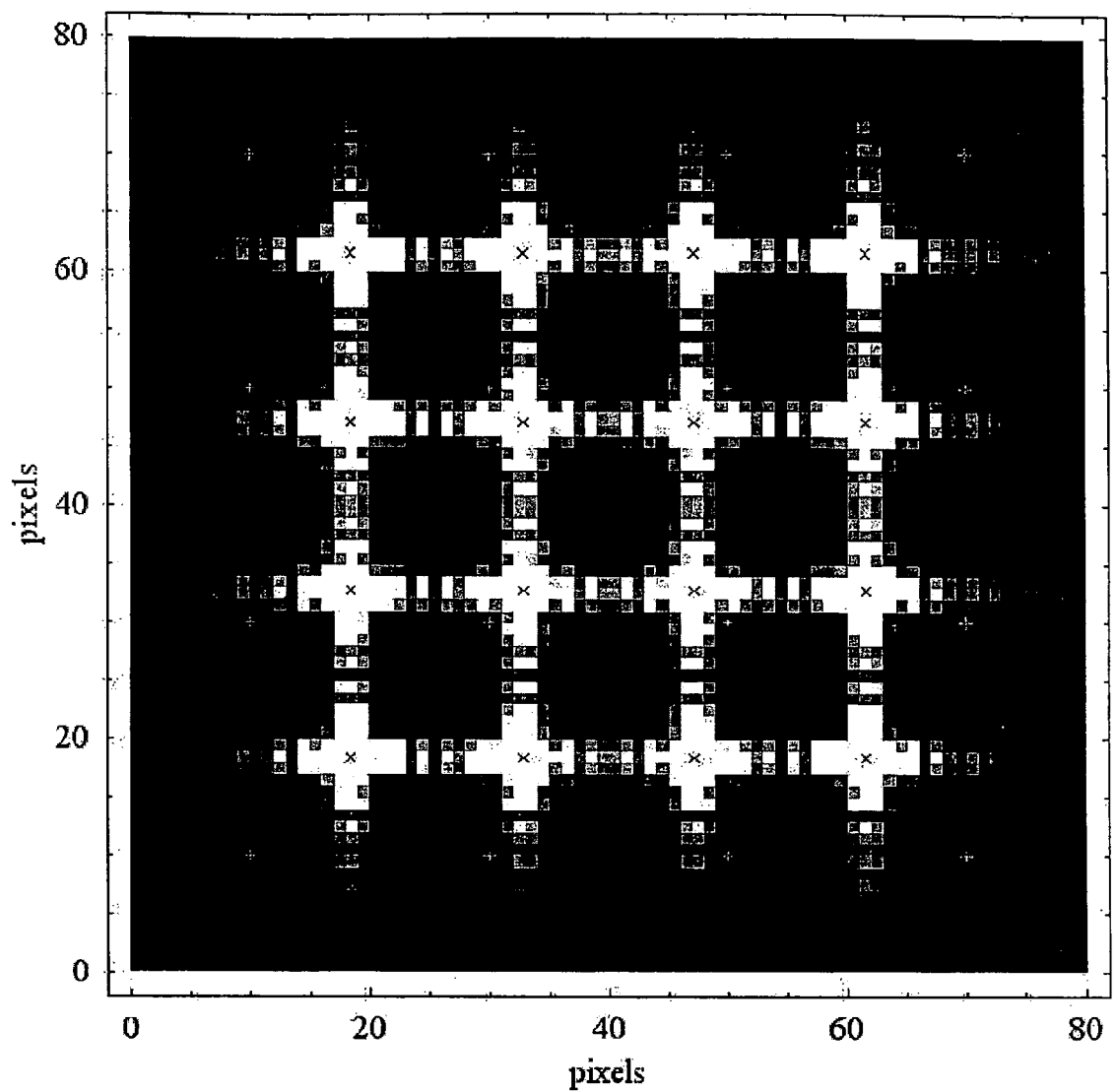
Figure 2F:
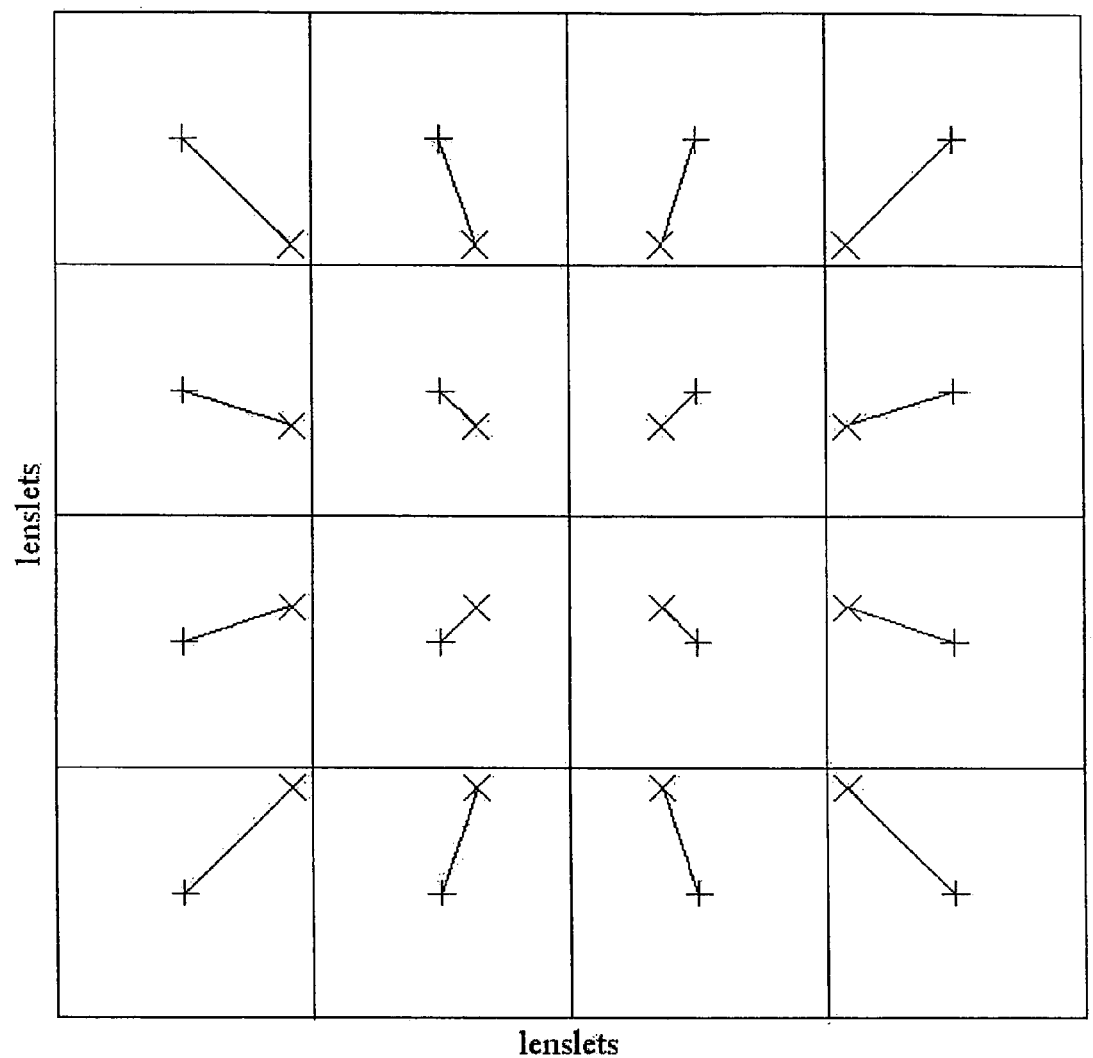
Figure 3A:
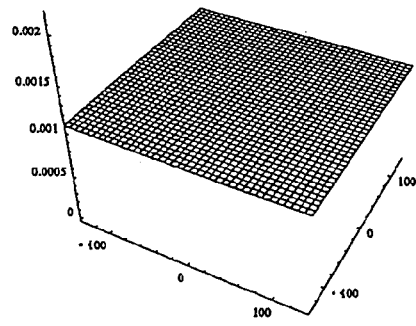
FIGS. 3A-F show some exemplary incident wavefronts and corresponding output irradiance distributions in the focal plane.
Figure 3D:
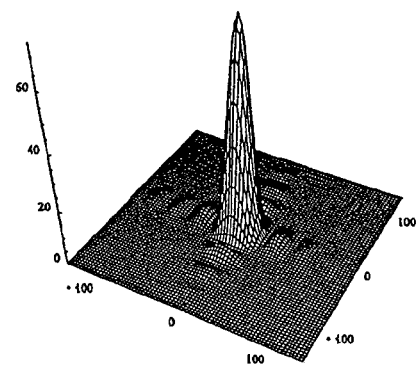
Figure 3B:
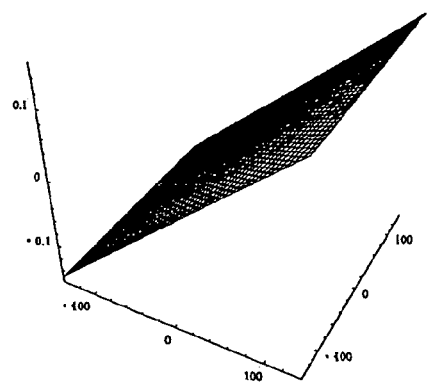
Figure 3E:
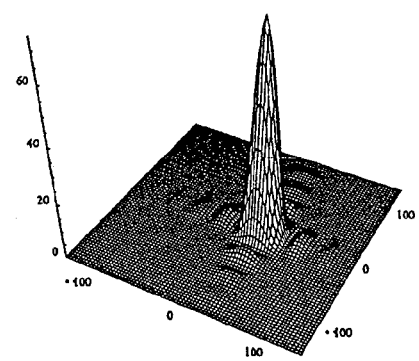
Figure 3C:
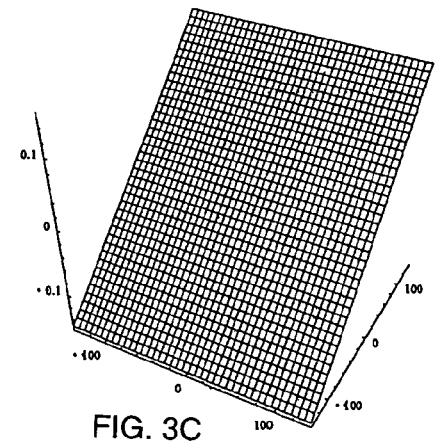
Figure 3F:
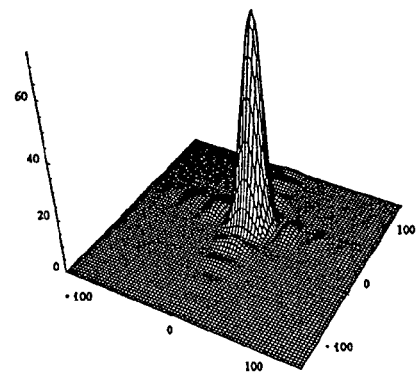

Of course this measurement does not simply measure the regularity of the lenslet array, it also measures the regularity of the CCD array. But the basic technique demonstrates clearly that an instruments with an inherent low precision limit can be an effective tool to make precise measurements.

depicted in FIGS. 2B, 2D and 2F, is to introduce the wavefront of interest and determine the focal spot shifts. The critical information at this stage of the analysis is the focal spot shifts for every lenslet.

As discussed above, one uses the results of myriad averaged slope measurements to reconstruct the wavefront incident upon the lenslet array. It is common to hear people describe reconstruction as an integration process. This is malapropos and ironic. The irony is that Nature has already

TABLE 1

| File | origin | size | Aspect |
|---|---|---|---|
| x0y0 | 16.92 ± 0.02, 15.58 ± 0.02 | 20.0005 ± 0.0008 × 20.0025 ± 0.0008 | 1.00010 ± 0.00006 |
| x0y50 | 16.79 ± 0.02, 15.58 ± 0.02 | 20.0006 ± 0.0008 × 20.0026 ± 0.0008 | 1.00010 ± 0.00006 |
| x0y100 | 16.67 ± 0.02, 15.58 ± 0.02 | 20.0005 ± 0.0008 × 20.0027 ± 0.0008 | 1.00011 ± 0.00006 |
| x0y150 | 16.55 ± 0.02, 15.58 ± 0.02 | 20.0005 ± 0.0008 × 20.0026 ± 0.0008 | 1.00011 ± 0.00006 |
| x0y200 | 16.41 ± 0.02, 15.58 ± 0.02 | 20.0007 ± 0.0008 × 20.0026 ± 0.0008 | 1.00010 ± 0.00006 |
| x0y250 | 16.29 ± 0.02, 15.58 ± 0.02 | 20.0006 ± 0.0008 × 20.0027 ± 0.0008 | 1.00010 ± 0.00006 |
| x0y300 | 16.16 ± 0.02, 15.58 ± 0.02 | 20.0006 ± 0.0008 × 20.0027 ± 0.0008 | 1.00010 ± 0.00006 |
| x50y0 | 16.92 ± 0.02, 15.70 ± 0.02 | 20.0007 ± 0.0008 × 20.0030 ± 0.0008 | 1.00011 ± 0.00006 |
| x50y50 | 16.80 ± 0.02, 15.70 ± 0.02 | 20.0005 ± 0.0008 × 20.0029 ± 0.0008 | 1.00012 ± 0.00006 |
| x50y100 | 16.67 ± 0.02, 15.70 ± 0.02 | 20.0005 ± 0.0008 × 20.0029 ± 0.0008 | 1.00012 ± 0.00006 |
| x50y150 | 16.55 ± 0.02, 15.70 ± 0.02 | 20.0006 ± 0.0008 × 20.0029 ± 0.0008 | 1.00011 ± 0.00006 |
| x50y200 | 16.41 ± 0.02, 15.70 ± 0.02 | 20.0008 ± 0.0008 × 20.0030 ± 0.0008 | 1.00011 ± 0.00006 |
| x50y250 | 16.29 ± 0.02, 15.70 ± 0.02 | 20.0007 ± 0.0008 × 20.0029 ± 0.0008 | 1.00011 ± 0.00006 |
| x50y300 | 16.17 ± 0.02, 15.70 ± 0.02 | 20.0006 ± 0.0008 × 20.0028 ± 0.0008 | 1.00011 ± 0.00006 |
| x100y0 | 16.92 ± 0.02, 15.82 ± 0.02 | 20.0007 ± 0.0008 × 20.0032 ± 0.0008 | 1.00012 ± 0.00006 |
| x100y50 | 16.80 ± 0.02, 15.82 ± 0.02 | 20.0005 ± 0.0008 × 20.0030 ± 0.0008 | 1.00013 ± 0.00006 |
| x100y100 | 16.67 ± 0.02, 15.82 ± 0.02 | 20.0006 ± 0.0008 × 20.0032 ± 0.0008 | 1.00013 ± 0.00006 |
| x100y150 | 16.55 ± 0.02, 15.82 ± 0.02 | 20.0006 ± 0.0008 × 20.0030 ± 0.0008 | 1.00012 ± 0.00006 |
| x100y200 | 16.42 ± 0.02, 15.82 ± 0.02 | 20.0006 ± 0.0008 × 20.0030 ± 0.0008 | 1.00012 ± 0.00006 |
| x100y250 | 16.29 ± 0.02, 15.82 ± 0.02 | 20.0008 ± 0.0008 × 20.0032 ± 0.0008 | 1.00012 ± 0.00006 |
| x100y300 | 16.16 ± 0.02, 15.82 ± 0.02 | 20.0007 ± 0.0008 × 20.0033 ± 0.0008 | 1.00013 ± 0.00006 |
| x150y0 | 16.92 ± 0.02, 15.95 ± 0.02 | 20.0006 ± 0.0009 × 20.0028 ± 0.0009 | 1.00011 ± 0.00006 |
| x150y50 | 16.79 ± 0.02, 15.96 ± 0.02 | 20.0006 ± 0.0009 × 20.0029 ± 0.0009 | 1.00012 ± 0.00006 |
| x150y100 | 16.67 ± 0.02, 15.95 ± 0.02 | 20.0006 ± 0.0008 × 20.0031 ± 0.0008 | 1.00012 ± 0.00006 |
| x150y150 | 16.55 ± 0.02, 15.96 ± 0.02 | 20.0006 ± 0.0008 × 20.0028 ± 0.0008 | 1.00011 ± 0.00006 |
| x150y200 | 16.42 ± 0.02, 15.96 ± 0.02 | 20.0006 ± 0.0008 × 20.0027 ± 0.0008 | 1.00011 ± 0.00006 |
| x150y250 | 16.29 ± 0.02, 15.96 ± 0.02 | 20.0007 ± 0.0008 × 20.0028 ± 0.0008 | 1.00010 ± 0.00006 |
| x150y300 | 16.18 ± 0.02, 15.95 ± 0.02 | 20.0004 ± 0.0008 × 20.0028 ± 0.0008 | 1.00012 ± 0.00006 |
| x200y0 | 16.92 ± 0.02, 16.10 ± 0.02 | 20.0007 ± 0.0009 × 20.0022 ± 0.0009 | 1.00007 ± 0.00006 |
| x200y50 | 16.80 ± 0.02, 16.10 ± 0.02 | 20.0006 ± 0.0008 × 20.0022 ± 0.0008 | 1.00008 ± 0.00006 |
| x200y100 | 16.68 ± 0.02, 16.10 ± 0.02 | 20.0005 ± 0.0008 × 20.0022 ± 0.0008 | 1.00009 ± 0.00006 |
| x200y150 | 16.56 ± 0.02, 16.10 ± 0.02 | 20.0005 ± 0.0008 × 20.0022 ± 0.0008 | 1.00008 ± 0.00006 |
| x200y200 | 16.42 ± 0.02, 16.10 ± 0.02 | 20.0007 ± 0.0008 × 20.0022 ± 0.0008 | 1.00007 ± 0.00006 |
| x200y250 | 16.29 ± 0.02, 16.10 ± 0.02 | 20.0007 ± 0.0008 × 20.0022 ± 0.0008 | 1.00007 ± 0.00006 |
| x200y300 | 16.18 ± 0.02, 16.10 ± 0.02 | 20.0005 ± 0.0008 × 20.0020 ± 0.0008 | 1.00007 ± 0.00006 |
| x250y0 | 16.93 ± 0.02, 16.23 ± 0.02 | 20.0007 ± 0.0008 × 20.0018 ± 0.0008 | 1.00006 ± 0.00006 |
| x250y50 | 16.80 ± 0.02, 16.23 ± 0.02 | 20.0006 ± 0.0008 × 20.0017 ± 0.0008 | 1.00005 ± 0.00006 |
| x250y100 | 16.67 ± 0.02, 16.22 ± 0.02 | 20.0007 ± 0.0008 × 20.0019 ± 0.0008 | 1.00006 ± 0.00005 |
| x250y150 | 16.54 ± 0.02, 16.22 ± 0.02 | 20.0007 ± 0.0008 × 20.0020 ± 0.0008 | 1.00006 ± 0.00005 |
| x250y200 | 16.41 ± 0.02, 16.23 ± 0.02 | 20.0008 ± 0.0008 × 20.0019 ± 0.0008 | 1.00005 ± 0.00005 |
| x250y250 | 16.30 ± 0.02, 16.23 ± 0.02 | 20.0006 ± 0.0008 × 20.0018 ± 0.0008 | 1.00006 ± 0.00005 |
| x250y300 | 16.17 ± 0.02, 16.24 ± 0.02 | 20.0006 ± 0.0008 × 20.0018 ± 0.0008 | 1.00006 ± 0.00005 |
| x300y0 | 16.93 ± 0.02, 16.35 ± 0.02 | 20.0007 ± 0.0008 × 20.0021 ± 0.0008 | 1.00007 ± 0.00006 |
| x300y50 | 16.80 ± 0.02, 16.35 ± 0.02 | 20.0006 ± 0.0008 × 20.0021 ± 0.0008 | 1.00008 ± 0.00006 |
| x300y100 | 16.69 ± 0.02, 16.35 ± 0.02 | 20.0004 ± 0.0008 × 20.0020 ± 0.0008 | 1.00008 ± 0.00006 |
| x300y150 | 16.56 ± 0.02, 16.35 ± 0.02 | 20.0005 ± 0.0008 × 20.0020 ± 0.0008 | 1.00007 ± 0.00006 |
| x300y200 | 16.42 ± 0.02, 16.35 ± 0.02 | 20.0005 ± 0.0008 × 20.0020 ± 0.0008 | 1.00007 ± 0.00005 |
| x300y250 | 16.30 ± 0.02, 16.35 ± 0.02 | 20.0007 ± 0.0008 × 20.0021 ± 0.0008 | 1.00007 ± 0.00005 |
| x300y300 | 16.17 ± 0.02, 16.35 ± 0.02 | 20.0007 ± 0.0008 × 20.0022 ± 0.0008 | 1.00008 ± 0.00005 |

Wavefront Reconstruction for the Shack-Hartmann Wavefront Sensor.

FIGS. 2A-F show a Shack-Hartmann sensor tracking a series of focal spots. This idealization shows the process of measuring a spherical wave on a sensor with just 16 lenslets. The first step, as represented by the FIGS. 2A, 2C and 2E, is to measure a plane wave and measure a series of focal spot locations which are used as a reference. The next step, as done the integration for us; as shown below the measured quantity is already an integrated form of the incident wavefront.

As shown above given a wavefront $\psi(x1, x2)$ incident upon a lenslet, in the isoplanatic and small angle limits, the sensor measures the average of the wavefront slopes $\partial_\mu \psi$ over each lenslet. So for an integration domain of $x_1 \in [a, b]$, $x_2 \in [c, d]$, the average of the $\mu$ derivative of $\psi(x1, x2)$ is given by:

$$\overline{\partial_\mu \psi} = \frac{\int_c^d \int_a^b \partial_\mu \psi dx_1 dx_2}{(d-c)(b-a)} \qquad (66)$$

where the operator $\Box \mu$ denotes differentiation along a line parallel to the $\mu$ axis. Defining the antiderivative of $\psi(x^1, x^2)$ as:

$$\psi_\mu(x_1, x_2) = \int \psi(x_1, x_2) dx_\mu, \qquad (67)$$

the average of the slope is written as:

$$\overline{\partial_\mu \psi} = A^{-1}(\psi_v(a,c) - \psi_v(a,d) - \psi_v(b,c) + \psi_v(b,d)) \qquad (68)$$

where the domain area has be recast as $A=(d-c)(b-a)$ and $v$ represents the orthogonal direction. The message of equation 68 is quite clear: the measurement of the focal spot shift tells us about differences in the antiderivatives evaluated at the lenslet vertices.

At this juncture, the reconstruction will typically follow one of two paths: either modal or zonal reconstruction. An example of the two different types of outputs is shown in FIGS. 10-13B.

Zonal methods output a value $\psi$ at each zone. In the Shack-Hartmann case, the wavefront values are computed at the vertices. In the Southwell case, the wavefront value is computed for the center of the lenslet. The modal reconstructor outputs the amplitudes of some arbitrary set of functions used to describe the wavefront. A practical set of functions are the Taylor monomials. With these amplitudes, it is trivial to compute any other rational function set. Of course, one can not easily convert the Taylor amplitudes into amplitudes for a irrational function set, such as one containing Gaussians.

Consider a fit to order d using a sensor with an $\xi \times \eta$ lenslet array. The output from the zonal reconstruction will be $(\xi+1)^2(\eta+1)^2$ wavefront values for each of the vertices, reducing the wavefront to a discrete data set. The modal reconstructor will yield $(d+1)(d+2)/2$ amplitudes, and the wavefront is now in a continuous representation. As an example, consider a $6^{th}$ order fit with a 50×50 lenslet array. The zonal fit will yield 2601 numbers; the modal fit will produce 28 numbers. So the information content of the zonal reconstruction is typically richer. One may expect to pay a computation burden for this extra information, but this is not necessarily the case as we shall see.

Figure 13A:
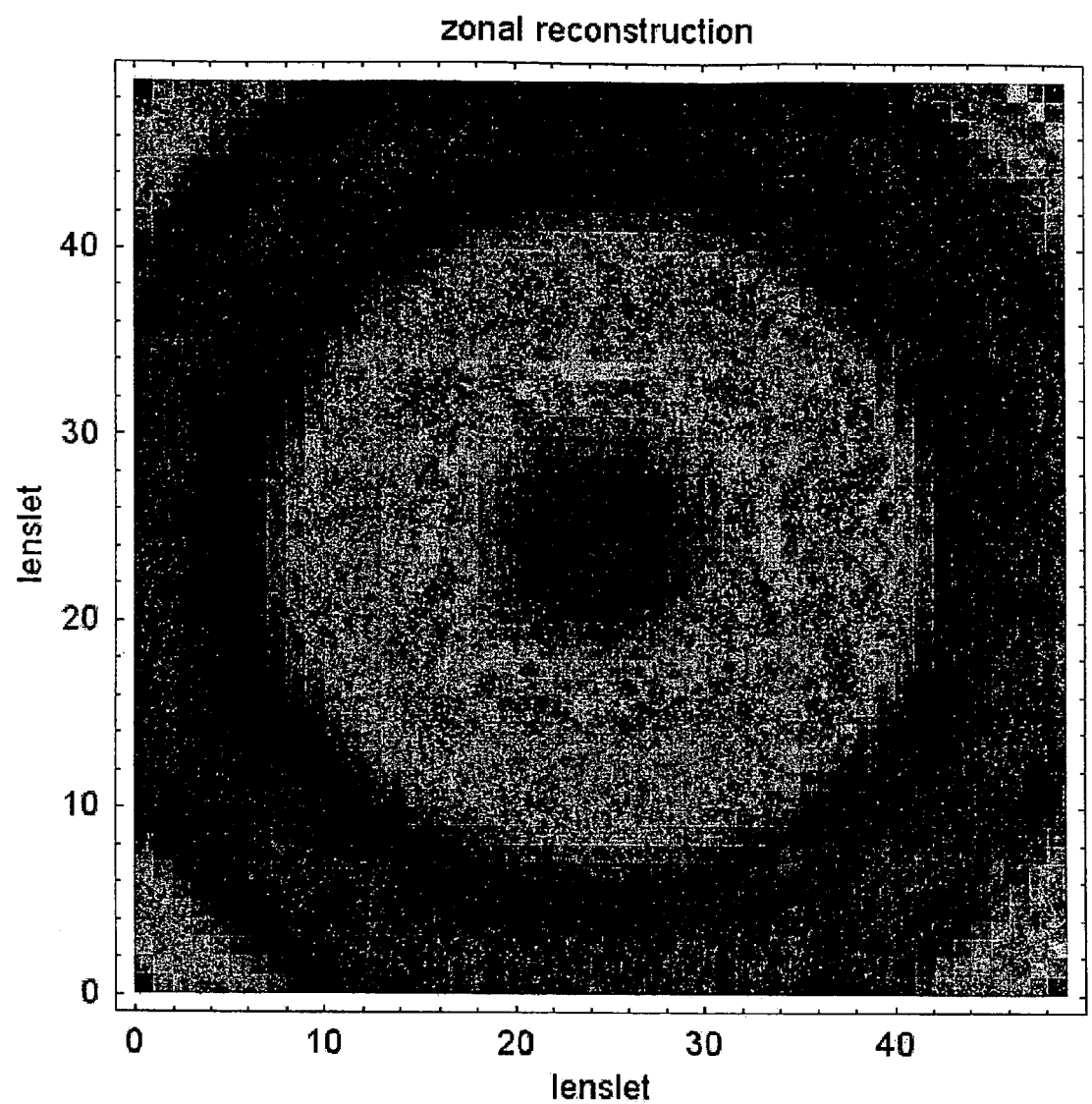

FIGS. 10-13B show the reconstruction process schematically. In this example, an eigenstate wavefront of the Zernike polynomials, $Z_{42}$, has been imaged onto a 48×48 lenslet array. The focal spot shifts are computed and passed to either the zonal or the modal reconstructor. A sample output from each reconstructor is shown. The zonal reconstructor provides a value for the wavefront at every lenslet vertex (FIG. 13A); the modal reconstructor provides an amplitude for every function in the basis set (FIG. 13B).

A wavefront is imaged onto the lenslet array creating a pattern of focal spots on the CCD array. The software then computes how far the focal spots have moved from the reference positions and creates a series of offset measurements, $\delta$. The focal spot shift is related to the lenslet focal length f and the average wavefront slope m by:

$$\delta = f \frac{m}{\sqrt{1-m^2}} \qquad (69)$$

when the CCD is in the focal plane of the lenslet array. In practice, the radical in the denominator is so close to unity that it is ignored leading to:

$$\delta = fm. \qquad (70)$$

The solution to the full form is:

$$m = \sqrt{\frac{\delta^2}{f^2 - \delta^2}}, \qquad (71)$$

and the approximation is:

$$m = \frac{\delta}{f}. \qquad (72)$$

The measurement of the focal spot shift $\delta$ then is a measurement of the average slope over the lenslet. In the isoplanatic limit the average slope can be thought of as a tilt. The effect then of a measurement is to reduce the wavefront into a series of planar patches of the size of each lenslet, with a tilt in each direction corresponding to the focal spot shift in that direction.

To delve deeper into the details of the calculation, we need to introduce some notation. There are a series of N offset measurements where $N = \xi \eta$ is the number of lenslets. Eventually, the linear algebra of zonal reconstruction is going to force the lenslets to be ordered in a linear fashion. In the interest of expediency, we will use the same ordering for both the zonal and the modal cases.

The ordering of the lenslets is completely arbitrary: it can be row major, column major or even random. The position vector p describes the linear ordering of the addresses. A sample p vector is:

$$p = ((1,1), (2,1), (3,1) \ldots) \qquad (73)$$

where the address pairs (u, v) denotes rows and columns. On an $\xi \times \eta$ array, the address (u, v) would be at position $u(\xi-1)+v$ in the p vector. The reverse look-up procedure is a bit more involved. It is simple to compute, but in practice, it is convenient to construct a lookup able q which is really an $\xi \times \eta$ matrix. A sample q matrix is shown below.

$$q = \begin{bmatrix} 1 & 2 & \ldots & \ldots \eta \\ \eta+1 & \eta+2 & \ldots & 2\eta \\ \ldots & \ldots & \ldots & \ldots \\ (\xi-1)\eta+1 & (\xi-1)\eta+2 & \ldots & \xi\eta \end{bmatrix} \qquad (74)$$

Equation 68 has already paved the road for modal reconstruction. Before beginning with the details of reconstruction, it is helpful to define the box operator a for an arbitrary function over the domain $x_1 \in [a, b]$, $x_2 \in [c, d]$. This operator combines the values of a function at the domain corners in the following way:

$$\Box \psi(x) = \psi(a,c) - (a, d) - \psi(b, c) + \psi(b, d). \qquad (75)$$

Figure 22:
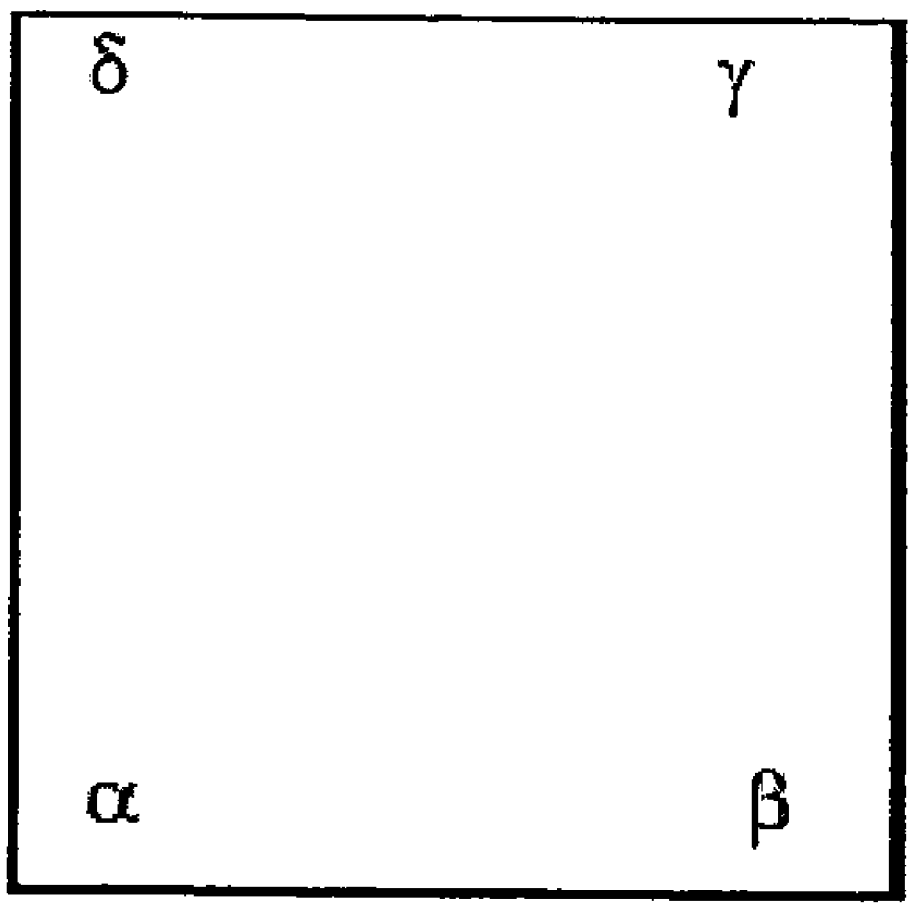

Having seen the box operator in an explicit form, we sill now generalize its formulation. Consider the rectangular domain show in FIG. 22. FIG. 22 shows the vertices of a lenslet. Here the vertex points are labeled with the Greek letters α through δ. Each of these letters is really an address pair. The indexing of the vertices is tied to the indexing for the lenslet. If this is lenslet (u, v), then α is vertex (u−1, v−1); β is u, v−1), γ is (u, v), and δ is (u−1, v). The vertices are labeled by α, β, γ, and δ where each vertex has an address $(x_1, x_2)$. These vertices can be arranged in a vertex vector V as:

$$V = \begin{bmatrix} \alpha \\ \beta \\ \gamma \\ \delta \end{bmatrix}. \tag{76}$$

When a function operates on this vector, it returns a vector of functions. Explicitly, $$\psi(V) = \begin{bmatrix} \psi(\alpha) \\ \psi(\beta) \\ \psi(\gamma) \\ \psi(\delta) \end{bmatrix}. \tag{77}$$

(To save space, subsequent vectors will be written in the transpose form.) This leads to a generalization of operators which act upon the vertices. Think of an interaction matrix Γ which describes the scalar interaction of the vertices. For the box operator:

$$\Gamma_B = \begin{bmatrix} -1 & 0 & 0 & 0 \\ 0 & 1 & 0 & 0 \\ 0 & 0 & 1 & 0 \\ 0 & 0 & 0 & 1 \end{bmatrix} \tag{78}$$

and we can now write $$\Box \psi(x) = \Gamma_B \psi(V). \tag{79}$$

With this box operator, the average of the μ slope $m_\mu$, over the lenslet at address $p_i$ is expressed as:

$$m_{\mu,pi} = A^{-1} \Box \Psi_v(V_{pi}) \tag{80}$$

In this case (equation) is the predicted value. But the actual measurement is of (equation). To find the wavefront which best describes the measurements, one simply needs to minimize the merit function:

$$\chi^2 = \sum_{\mu=1}^{2} \sum_{i=1}^{N} \frac{\left(\delta_{p_i}^\mu - \frac{f}{A} \Box \Psi_{v,p_i}\right)^2}{\sigma_i^2} \tag{81}$$

where $\sigma_i$ represents an error estimate. However, since these errors do not depend upon the amplitudes, they can be treated as weighting factors and are withheld from explicit evaluation.

All that remains now is to choose a set of basis functions. This set should be complete. Orthogonal sets are attractive, but often involve unneeded overhead. The set we choose here is the basis set for all rational functions: the Taylor monomials. These monomials are given by:

$$T^{i-j,j}(x_1, x_2) = x_1^{i-j} x_2^j \tag{82}$$

and the wavefront described as a dth order expansion would be written as:

$$\Psi(x_1, x_2) = \sum_{i=0}^{d} \sum_{j=0}^{i} a_{i-j,j} x_1^{i-j} x_2^j. \tag{83}$$

We specify this set because it contains all the information needed to construct the functions of all other rational basis sets, such as the polynomials of Zernike or Legendre. It is easiest to work in the Taylor basis and then use an affine transformation on the Taylor amplitudes to compute the amplitudes in the other bases. These transformation matrices are written in terms of integers, so there is no loss of precision.

Also, the Taylor basis is far easier to work with. Consider the case of the antiderivatives. They can be written to arbitrary order as:

$$T_1^{i-j,j}(x_1, x_2) = \frac{1}{i-j+1} x_1^{i-j} x_2^j, \tag{84}$$

and $$T_2^{i-j,j}(x_1, x_2) = \frac{1}{j+1} x_1^{i-j} x_2^{j+1} \tag{85}$$

By comparison, writing out the two antiderivatives for each of the 66 Zermike polynomials through $10^{th}$ order would fill several pages.

Anyway, the following analysis does not depend upon the basis set. The minimization of the merit function proceeds in the canonical way: the derivatives with respect to each amplitude are set to zero, $$\partial_{a_{i-j,j}} \chi^2 = 0. \tag{86}$$

This will generate a series of n=(d+1)(d+2)/2 linear equations to solve. Since this is a linear least squares fit, we expect to find a direct solution. All that remains are some linear algebra details unique to the basis set chosen. In the interest of brevity, we will focus to the issue of zonal reconstruction.

We now consider the problem of zonal reconstruction for the Shack-Hartmann sensor. Here too we start with equation 68 and derive the merit function Δ (which is $\chi^2$ without the $\sigma_i$ terms):

$$\Delta = \sum_{\mu=1}^{2} \sum_{i=1}^{N} \left(\delta_{p_i}^\mu - \frac{f}{A} \Box \Psi_{v,p_i}\right)^2 \tag{87}$$

There is a problem with the antiderivative terms. They are quite unwelcome for a zonal fit because it would require discrete differentiation to recover to wavefront values. It is better to recast Δ to explicitly compute the wavefront values. So we turn our attention to the task of eliminating the antiderivatives. We begin with a close examination of equation (66). Note that in one dimension, the average value of the derivative of a function g(x) over the linear domain $x1 \in [a, b]$ is trivial to compute:

$$\overline{\partial_1 g(x_1, x_2)}_{linear} = \frac{g(b, x_2) - g(a, x_2)}{b - a}. \tag{88}$$

The trouble arises when averaging in the orthogonal direction. This is what creates the troublesome antiderivaties. So in lieu of an exact average over an area, we use an approximation by computing the average of equation 88 evaluated at the endpoints of the domain $\chi_2 \in [c, d]$. This process is:

$$\overline{\partial_1 g(x_1, x_2)} \approx \tag{89}$$

$$\frac{1}{2(b-a)} \Big[ (g(b, x_2) - g(a, x_2))|_{x_2=c} + (g(b, x_2) - g(a, x_2))|_{x_2=d} \Big] =$$

$$\frac{1}{2(b-a)} (g(b, c) - g(a, c) + g(b, d) - g(a, d))$$

Defining the vertex interaction matrix $\Gamma_1$ as:

$$\Gamma_1 = \begin{bmatrix} -1 & 0 & 0 & 0 \\ 0 & 1 & 0 & 0 \\ 0 & 0 & 1 & 0 \\ 0 & 0 & 0 & -1 \end{bmatrix} \tag{90}$$

and the lenslet width vector h as:

$$h = \begin{bmatrix} b-a \\ d-c \end{bmatrix} \tag{91}$$

allows us to write the approximation as:

$$\overline{\partial_1 g(x_1, x_2)} \approx \frac{1}{2h_1} \Gamma_1 g(V) \tag{92}$$

where the vertex vector V is given by:

$$V^T = ((a,c),(b,c),(b,d),(a,d)). \tag{93}$$

Similar machinations yield the result:

$$\overline{\partial_2 g(x_1, x_2)} \approx \frac{1}{2h_2} \Gamma_2 g(V) \tag{94}$$

where the interaction matrix is:

$$\Gamma_1 = \begin{bmatrix} -1 & 0 & 0 & 0 \\ 0 & 1 & 0 & 0 \\ 0 & 0 & 1 & 0 \\ 0 & 0 & 0 & -1 \end{bmatrix}. \tag{95}$$

The approximations in equations 92 and 94 are now the surrogate values for the exact form of the averaged slopes. The appendix explores the validity of these approximations and shows that it many cases it is exact.

At last we can replace equation 87 and pose the new merit function as $$\Delta = \sum_{\mu=1}^{2} \sum_{i=1}^{N} \left( \delta_{p_1}^{\mu} - \frac{f}{2h_{\mu}} \Gamma_{\mu} \Psi(V_{pi}) \right)^2, \tag{96}$$

liberating us from the problems having to deal with antiderivatives. The minimization is routine. The quantities being varied are the wavefront values at each vertex. All the derivatives with respect to the wavefront values at the vertices are set equal to zero:

$$\partial_{\psi_{pi}} \Delta = 0. \tag{97}$$

The vector p now indexes the vertices, not the lenslets.

The net effect is a series of linear equations that look like this (after the simplification h1=h2=h):

$$4\psi_{u,v} - \psi_{u-1,v-1} - \psi_{u+1,v-1} - \psi_{u+1,v+1} - \psi_{u-1,v+1} = \tag{98}$$

$$\frac{h}{f} (s_1^T \delta_{(u,v)} + s_2^T \delta_{(u+1,v)} - s_2^T \delta_{(u,v+1)} - s_1^T \delta_{(u+1,v+1)})$$

where s is an alignment spinor given by:

$$s = \begin{bmatrix} \begin{bmatrix} 1 \\ 1 \end{bmatrix} \\ \begin{bmatrix} 1 \\ -1 \end{bmatrix} \end{bmatrix}. \tag{99}$$

The vertex interaction matrix for this is:

$$\Gamma_s = \begin{bmatrix} s_1 & 0 & 0 & 0 \\ 0 & s_2 & 0 & 0 \\ 0 & 0 & s_2 & 0 \\ 0 & 0 & 0 & s_1 \end{bmatrix} \tag{100}$$

were 0 has the correct dimension, i.e.:

$$0 = \begin{bmatrix} 0 \\ 0 \end{bmatrix} \tag{101}$$

Equation 98 is quite revealing in the way it relates the wavefront values ψ to the focal spot shifts δ. First, the vertex action is between next-to-nearest neighbors, not nearest neighbors. The nearest neighbor interactions cancelled out. Next, the focal spot shift content is quite rich, using the measurements of the four lenslets bound by the next-to-nearest neighbors. Finally, these equations are linear, so we expect a direct solution without iteration.

This formula describes the special case for a lenslet on the interior of the array. These lenslet all have next-to-nearest neighbors. But many lenslets are on the edge and some are at the corners. The question is how should special shapes be handled? The answer is simple and comes from considering the symmetry of the problem. When a photon hits a lenslet, the photon can't determine the pedigree of the lenslet. The photon is deflected and impacts the CCD array. The amount of the deflection is the same regardless of where the lenslet is located within the array. So we are guided to look for a solution which respects this symmetry.

The answer is to include an existence function $\epsilon_{u,v}$ which tells us whether or not a lenslet exists. This also allows the user to construct arbitrary apertures. If the lenslet (u, v) exists, then $\epsilon_{u,v}=1$, otherwise $\epsilon_{u,v}=0$. Now equation 98 can be generalized to solve for arbitrary masks and apertures as sculpted by the existence function:

$$(\epsilon_{u,v}+\epsilon_{u+1,v}+\epsilon_{u+1,v+1}+\epsilon_{v,v+1})\Psi_{u,v}-\epsilon_{u,v}\Psi_{u-1,v-1}- \quad (102)$$

$$\epsilon_{u+1,v}\Psi_{u+1,v-1}-\epsilon_{u+1,v+1}\Psi_{u+1,v+1}-\epsilon_{u,v+1}\Psi_{u-1,v+1}=$$

$$\frac{h}{f}(s_1^T\delta_{(u,v)}\epsilon_{(u,v)}+s_2^T\delta_{(u+1,v)}\epsilon_{(u+1,v)}-$$

$$s_2^T\delta_{(u,v+1)}\epsilon_{(u,v+1)}-s_1^T\delta_{(u+1,v+1)}\epsilon_{(u+1,v+1)})$$

This is a series of $(\xi+1)(\eta+1)$ linear equations which can be written in matrix form as:

$$A\cdot\psi=D. \quad (103)$$

Now A is the vertex interaction matrix which describes the active vertices, $\psi$ is the vector containing the wavefront values at every vertex, and D is a vector containing combinations of the measured focal spot shifts.

The matrix A is singular. A is singular if there is some nullspace x that maps A to zero. That is there exists some vector x such that $A\cdot x=0$. A look at equation 102 shows that each of the rows always sums to zero. Hence all constant vectors k are a nullspace for A. This means that we cannot find some inverse matrix $A^{-1}$ such that $$A^{-1}\cdot A=1. \quad (104)$$

But this does not mean that we cannot solve equation 103 with $\psi$. We are simply forced to compute a pseudoinverse $A^+$. For linear least squares fit problems, the method of choice to form the pseudoinverse is the singular value decomposition, SVD.

The process involves decomposing A into three matrices: a column orthogonal matrix U, an orthogonal matrix V and a diagonal matrix $\Sigma$. The diagonal elements of $\Sigma$ are the singular values of A. The process of SVD solves for these three matrices such that $$A=U\cdot\Sigma\cdot V^T. \quad (105)$$

The pseudoinverse is now given by $$A^+=V\cdot\Sigma^{-1}\cdot U^T. \quad (106)$$

The entire process of reconstruction distills down to the matrix multiplication.

$$\Psi=A^+\cdot\Theta. \quad (107)$$

This is a very powerful statement for it shows how most of the computation can be done in advance. For a fixed lenslet geometry, the matrix $A^+$ can be precomputed and stored. It does not need to be created during the measurement process.

There is some fine print however. First of all, $A^+$ is very large. For a 64×64 lenslet array, $A^+$ has $65^4$ elements which is about 136 MB of data. Next, the computation may take hours. So it behooves the user find ways to avoid recomputation when the aperture changes. Some strategies involve storing $A^+$ for many common apertures such as a series of circular masks. Another strategy is to pad the data. Consider $A^+$ for a full aperture. All lenslets are active. Then for some reason a cluster of three lenslets is excluded from the data. A good idea is to use the same $A^+$ matrix and just pad the data in the excluded regions with some form of average data from the neighbors and exclude these vertices in the final result.

So in closing, the zonal reconstruction starts with the antiderivatives and uses matrix multiplication to compute the wavefront values at each vertex in one step.

In his very influential paper published in 1980, W. Southwell set forth what has become the standard method for wavefront reconstruction solved using successive overrelaxation (SOR). While SOR is an extremely valuable method, the inventors believe that singular value decomposition (SVD) is usually the better choice.

We will compare the philosophical differences between the two reconstructors in the following section. Here we will compare the mathematics. If we define a neighbor spinor $\sigma$ as:

$$\sigma = \begin{bmatrix} \begin{bmatrix} 1 \\ 0 \end{bmatrix} \\ \begin{bmatrix} 0 \\ 1 \end{bmatrix} \end{bmatrix} \quad (108)$$

which is just a collection of the basis vectors, then the Southwell merit function takes the form:

$$\Delta = \sum_{\mu=1}^{2}\sum_{i=1}^{N}\left(\delta_{p_i}^{\mu}+\delta_{p_{i+\sigma_\mu}}^{\mu}-\frac{2f}{h_\mu}(\Psi_{p_{i+\sigma_\mu}}+\Psi_{p_i})\right)^2 \quad (109)$$

where we are now dealing only with lenslets, not vertices. In this implementation, Southwell places the computed wavefront value in the center of the lenslet, not in the lower left- or upper right-hand corner as expected.

The explanation for the placement of the wavefront value is based on the Southwell's treatment of the focal spot shift as relating to the wavefront slope—not the average slope.

In the continuum, derivatives are measured at a point and are defined through the limit $$\partial_1 g(x_1, x_2) = \lim_{h_1 \to 0} \frac{g(x_1+h_1, x_2)-g(x_1, x_2)}{h_1}. \quad (110)$$

In the discrete space of the lenslet h, never reaches zero. It is limited by the size of the lenslet. In this space, the derivative is using the difference of neighboring points. Extending the discrete derivative is trivial. For the lenslet with a size vector given by equation 91, the partial derivative with respect to both variables is written $$\partial_{1,2}g(x_1,x_2) \approx \frac{g(x_1,x_2)+g(x_1+h_1,x_2+h_2)-g(x_1+h_1,x_2)-g(x_1,x_2+h_2)}{h_1 h_2}. \quad (111)$$

In light of this equation 68 can be viewed as $$\partial_{1,2}\Psi_\mu(x_1,x_2) \approx \partial_\nu \Psi(x_1,x_2). \quad (112)$$

This seems to suggest that if the measurements are treated as slope measurements, and not averaged slope measurements, then the wavefront values should be placed in the lower left-hand corner of the lenslet or the upper right-hand corner depending on whether the limit is approaching zero from the right or the left.

Returning to the Southwell minimization problem, we proceed as before. The parameters being computed are the wavefront values at the center of the lenslet and we vary $\Delta$ with respect to these values and set the derivative equal to zero:

$$\partial_{\Psi_{pi}}\Delta = 0. \quad (113)$$

For a $\xi \times \eta$ lenslet array with $h_1 = h_2 = h$, this leads to $N = \xi\eta$ linear equations of the form $$4\Psi_{u,v} - \Psi_{u-1,v} - \Psi_{u+1,v} - \Psi_{u,v+1} - \Psi_{u,v-1} = \quad (114)$$
$$\frac{h}{2f}(\delta^1_{(u-1,v)} + \delta^1_{(u+1,v)} - \delta^2_{(u,v-1)} - \delta^2_{(u,v+1)}).$$

(The existence function has been eliminated to facilitate comparison). So the Southwell interaction involves nearest-neighbor lenslets and uses only four measured values.

As before we can write a matrix expression just like equation 107. The lenslet interaction matrix A here is singular and we again resort to SVD. This allows for a direct solution and in many cases, we may precompute $A^+$. Both methods will execute in equivalent times.

It is time to step away from the mathematical details and talk about the differences between the two reconstruction strategies. The new method strictly adheres to the assumptions of Shack-Hartmann operation. It treats the measurements as being extended quantities, not point measurements. This is why the wavefront value cannot be placed at a single point. In this model, we are only permitted to make statements about the values at the vertices. Subsequent mathematics are then dictated.

In Southwell's venerable model, he assumes that the difference between the wavefront values in adjacent lenslets is related to the average slope across those two lenslets. One thing that seemed unusual was the average of the two measurements was not placed on the boundary between the two lenslets. Regardless, the Southwell model looks at a lenslet, it averages the $\delta_1$ measurement with the lenslet in the 1 direction and averages the $\delta_2$ measurement with the lenslet in the 2 direction.

Southwell's model mixes information from lenslets immediately. The new model assumes that the measurement of a focal spot shift reveals information about the differences in wavefront values at the vertices. However, the neighboring lenslets each share two vertices. So the competing values for the shared vertices are adjudicated by the least squares fit. So clearly, the new model is also sharing information between lenslets, but not until the least squares fit.

Perhaps the most obvious shortcoming with an immediate averaging is that small features of the order of a lenslet will be diminished.

Figure 14:
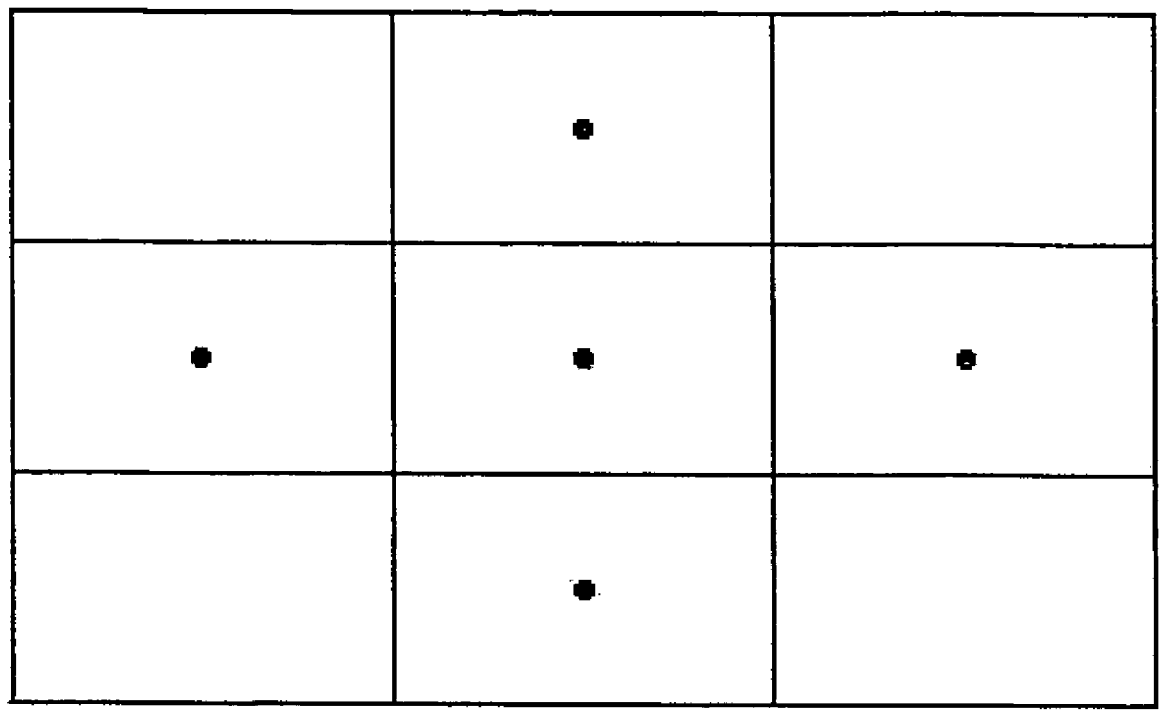
Figure 15:
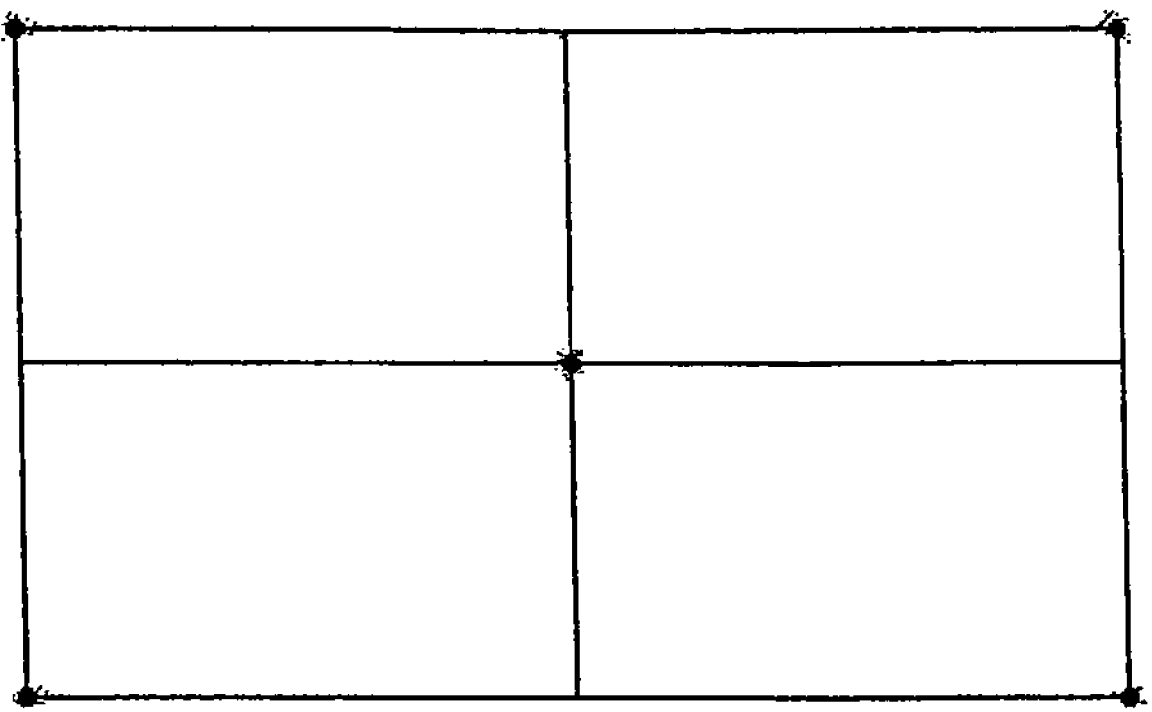

Another interesting difference between the two is in the wavefront value interaction. The Southwell equations balance the wavefront values with the four nearest neighbors. In the new method, the nearest neighbors interactions cancel out, and the surviving interaction between the next-to-nearest neighbor vertices. This is shown schematically in FIGS. 14-15. FIGS. 14-15 compare the interactions of the wavefront values in the least squares fit. In the Southwell model depicted in FIG. 14, the wavefront value is balanced between a central lenslet (marked in red) and the four nearest neighbors. This can be seen in equation 114. In the new model shown in FIG. 15, the wavefront value is balanced between a central vertex and the four next-to-nearest neighbors and the nearest neighbor interactions exactly cancel. The resultant interaction is specified in equation 98. So it is not that the nearest neighbor interaction is avoided, it is just that they exactly cancel out.

Finally we note that the measurement content of the $\Theta$ matrix is richer in the new model. Southwell blends together four measurements, and the new model blends eight.

In summary, both methods have a comparable run time and the memory requirements are virtually identical. They are both direct methods and both allow for arbitrary aperture shapes. The primary difference is an improvement in resolution of fine details.

This section evaluates some sample wavefront that we put into both models and give the reader a visual comparison of the two strategies.

Figure 16:
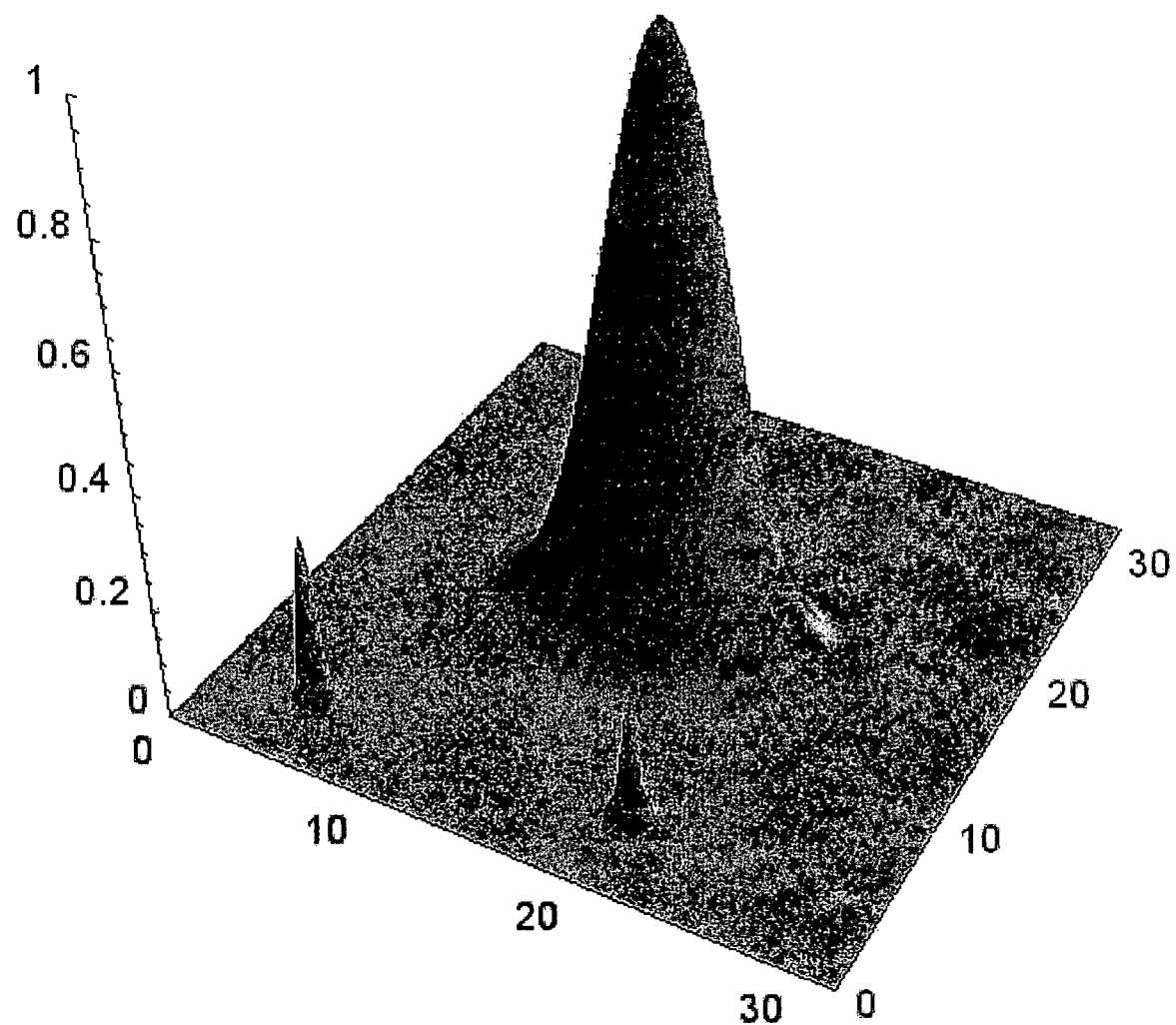

FIG. 16 shows a collection of three Gaussian bumps. In practice, reconstructors have trouble picking out small features against a background of big features. This set of bumps was designed to probe this problem. The second wavefront resembles an egg crate and it was created to challenge reconstruction and examine the behavior of the reconstructor as it fails.

Figure 17:
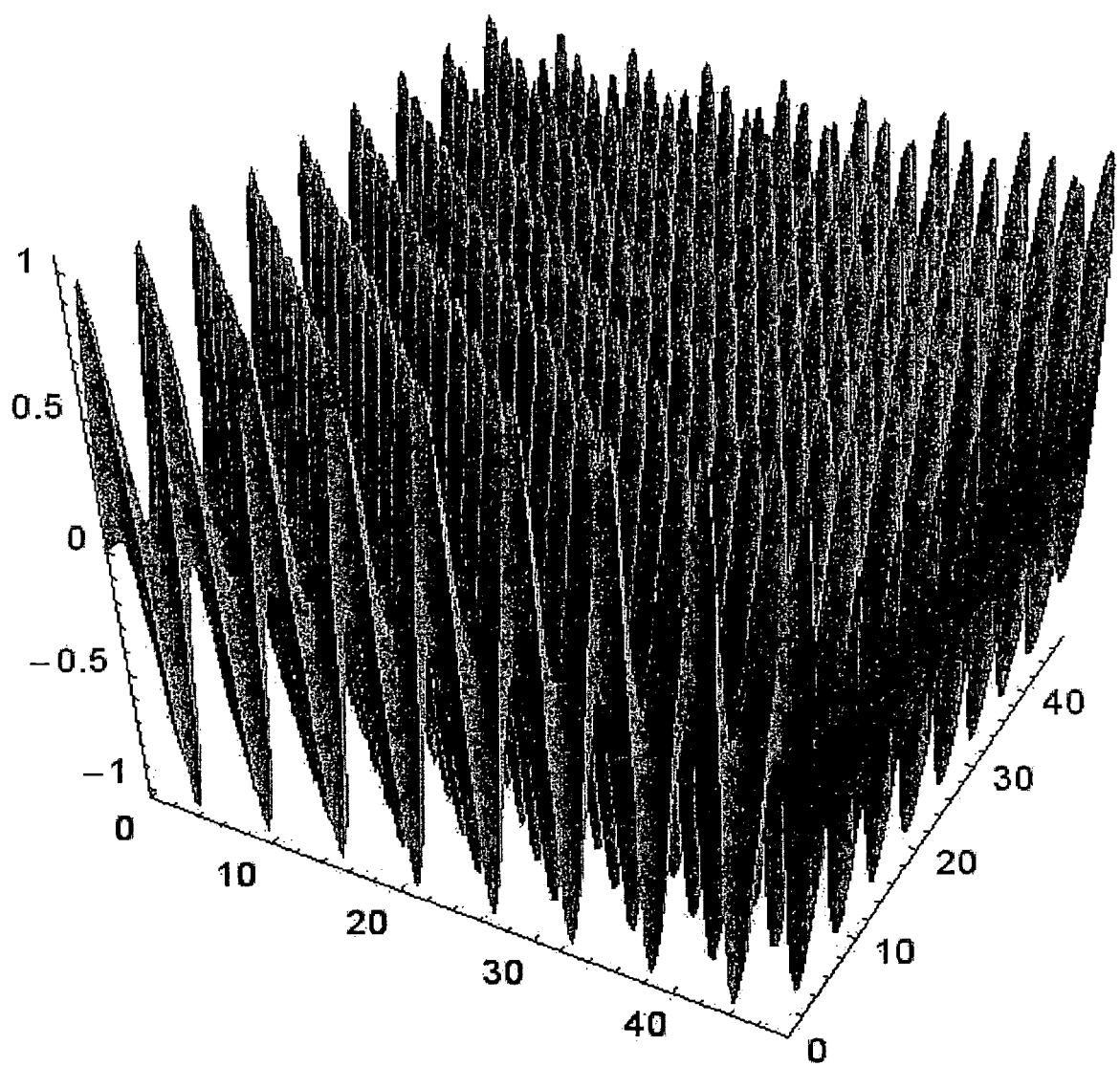
Figure 18A:
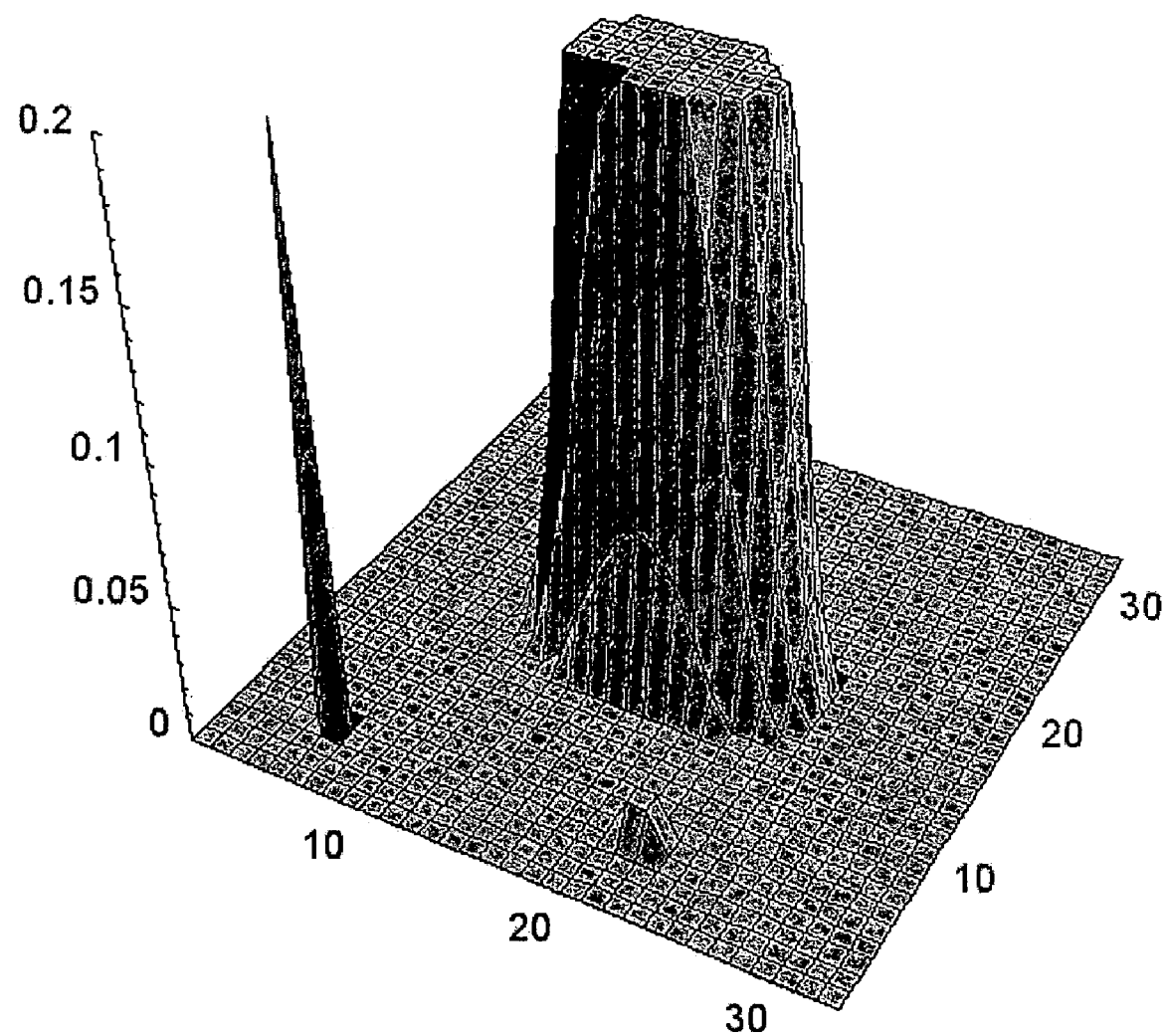
Figure 18B:
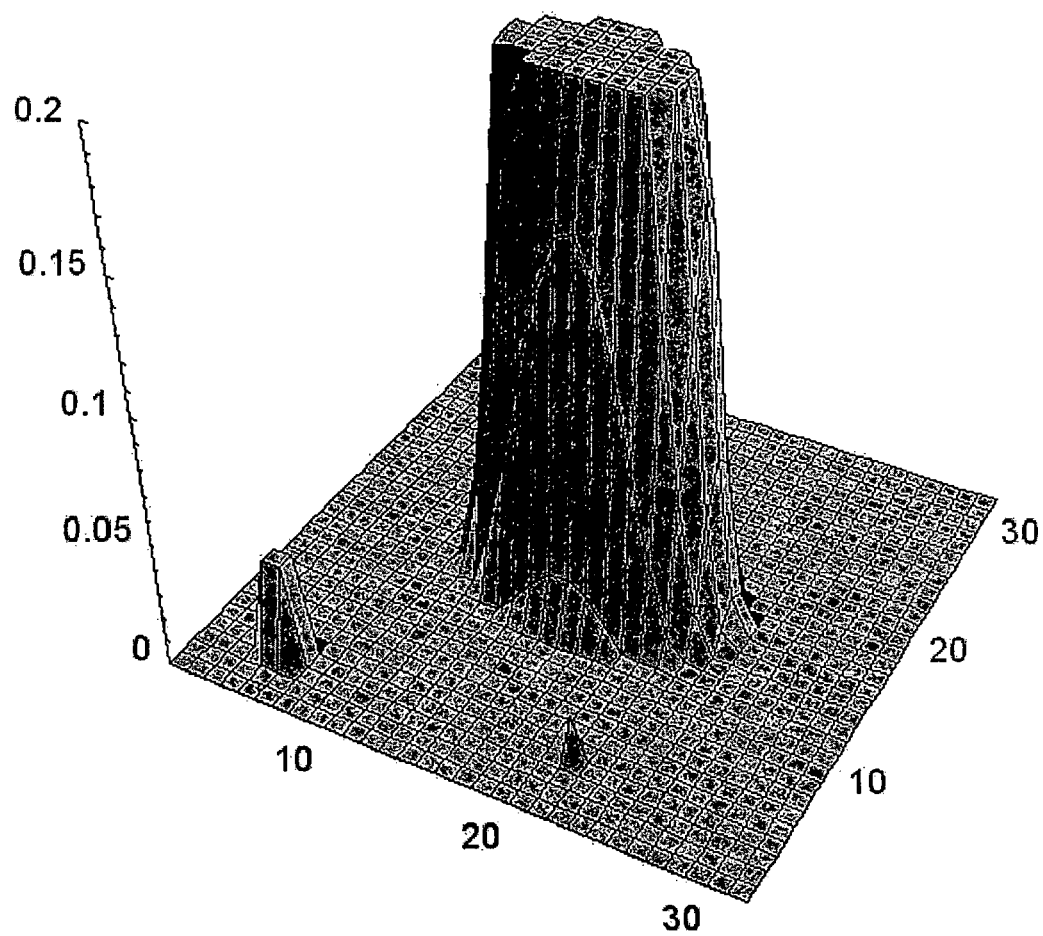
Figure 19:
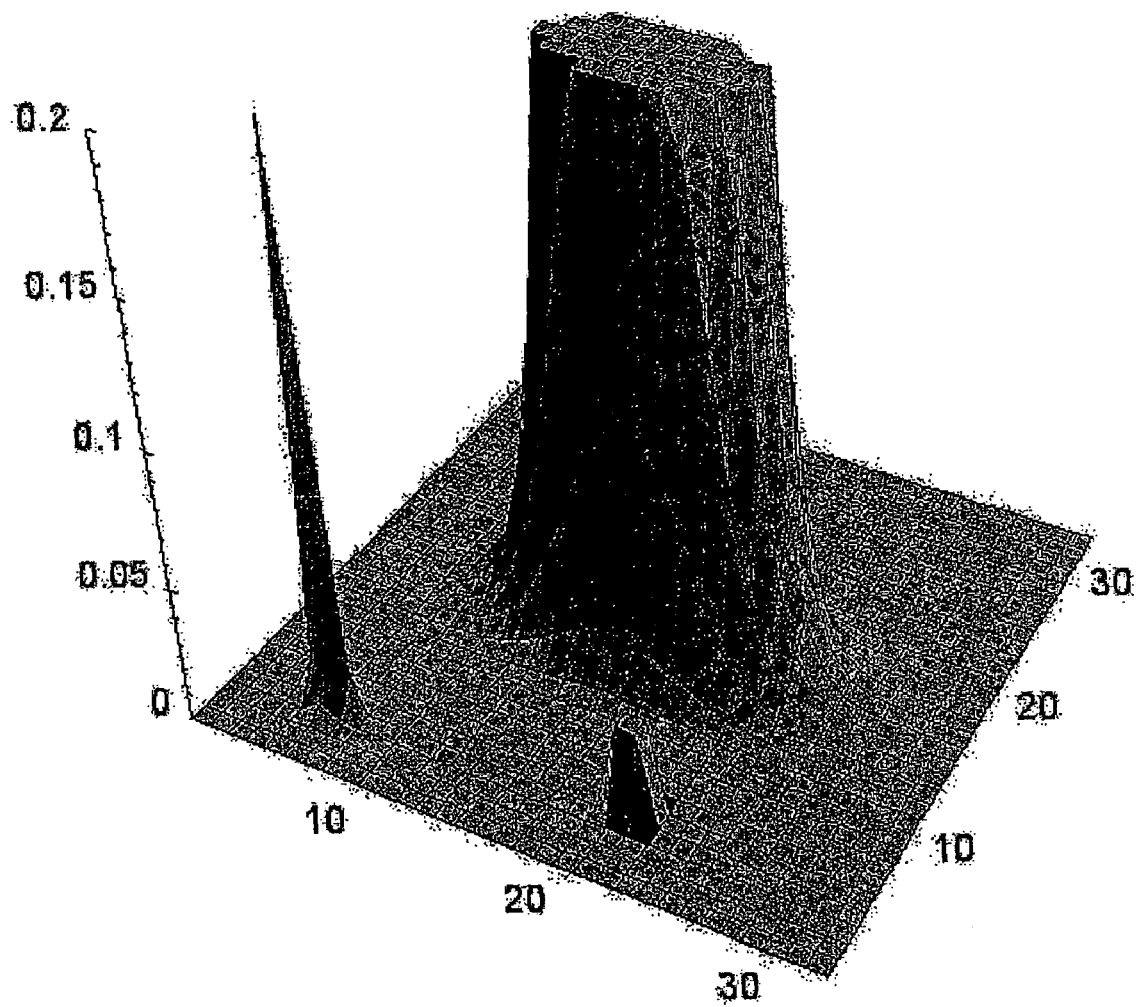
Figure 20:
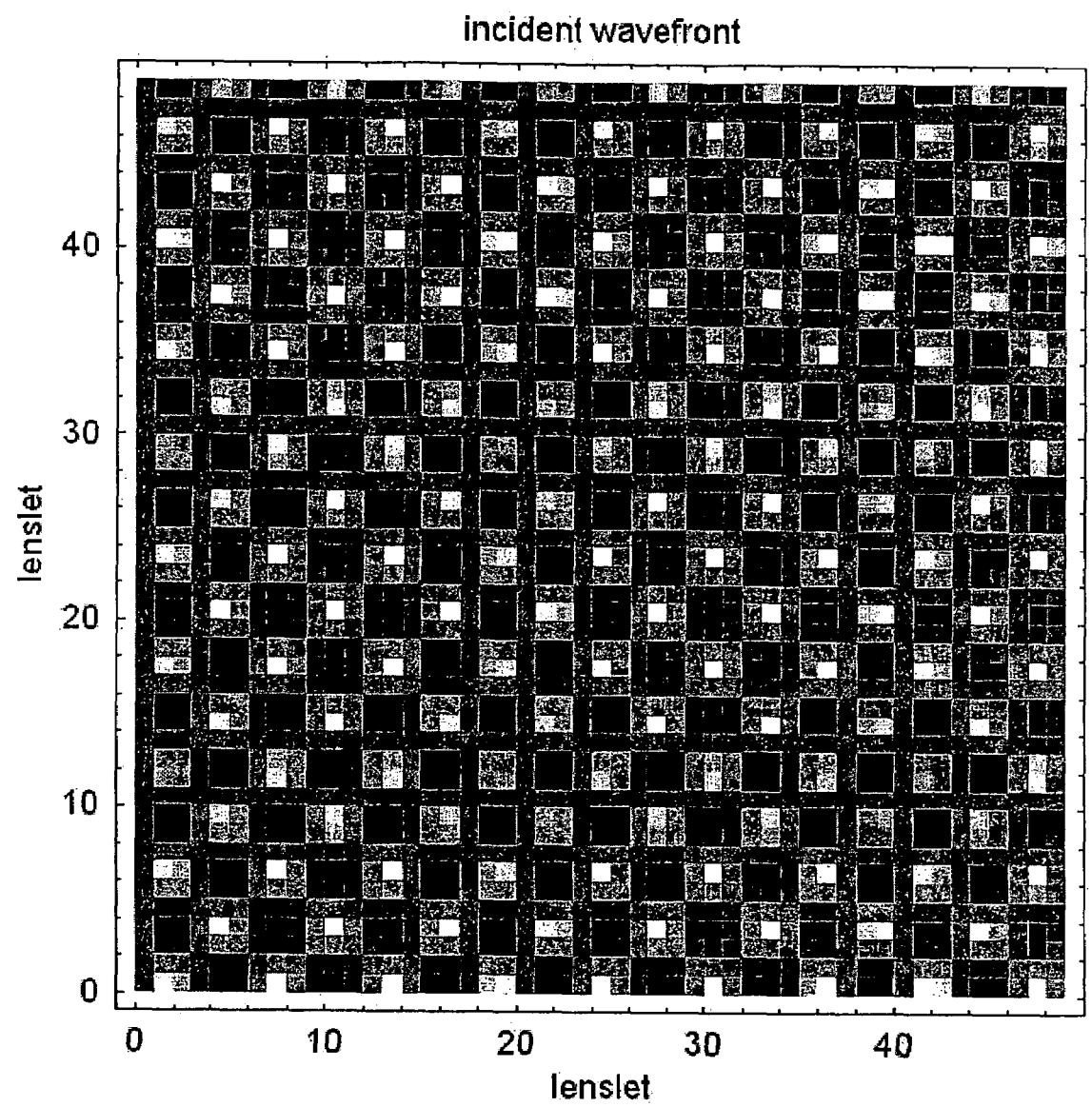

The optical styles for the wavefronts shown in FIGS. 16-17 were submitted to the two reconstructors. The results are shown in FIGS. 18A-19 and FIGS. 20-21B, comparing the new reconstructor to the Southwell reconstructor.

Since the smaller bumps are the features of interest, the plots have been scaled to their height. The input wavefront of FIG. 19 has been plotted at the same resolution as the lenslet array to facilitate comparison with the reconstructor outputs. As expected, the new reconstructor of FIG. 18B fared better at resolving the small bumps. The bump on the left is faithfully reproduced. The bump on the right is reproduced vaguely. All reconstructors have an amplitude ambiguity, so we quantified the problem by essentially doing at least squares fit to see what magnification it would take to get the reconstruction to most closely match the input. The new reconstructor overstated the amplitude by 0.4%; the Southwell reconstructor understates the amplitude by 2.7%. The $\chi^2$ values were 0.003 for the new method and 11.6 for the Southwell method.

Figure 21A:
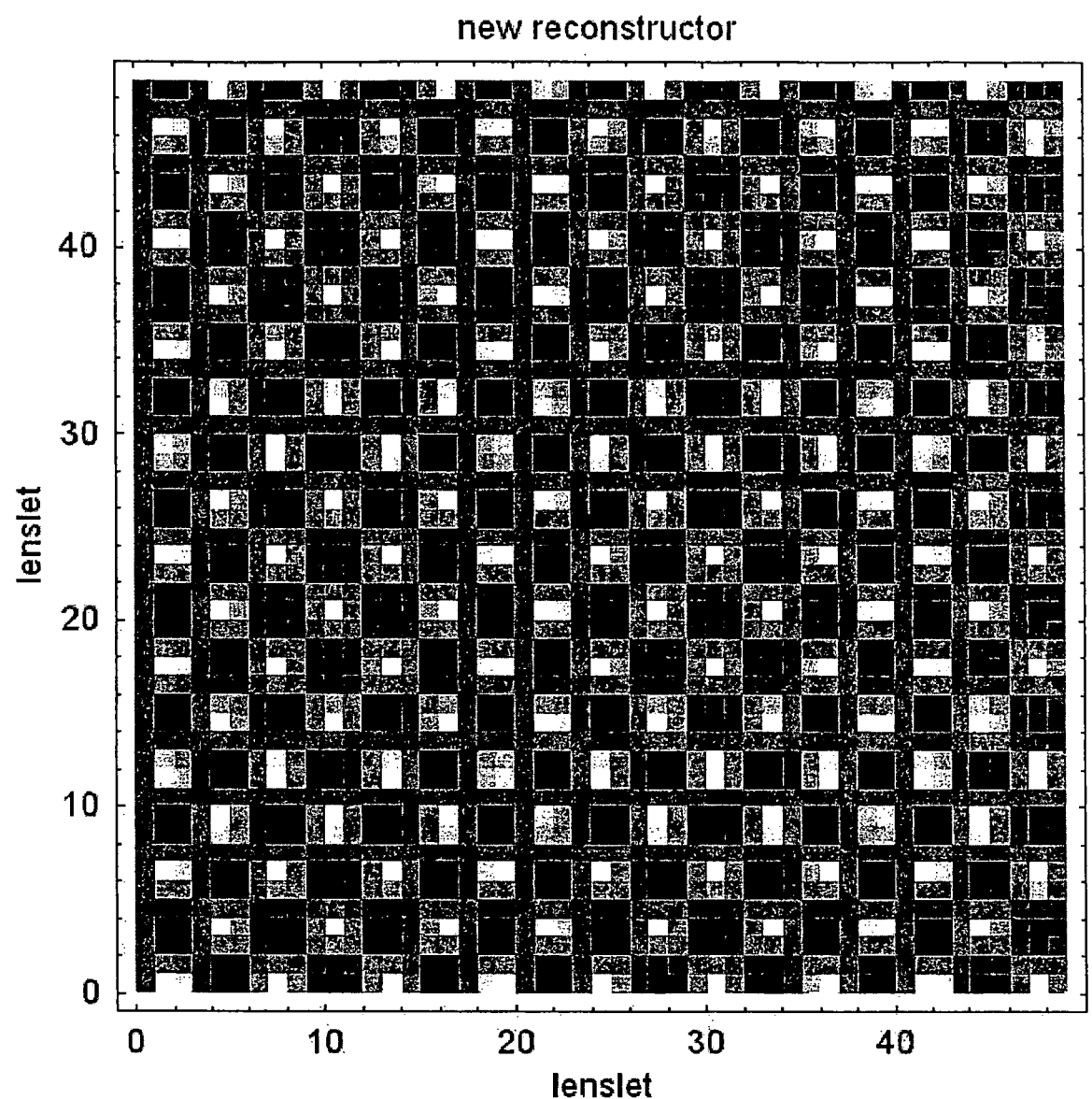
Figure 21B:
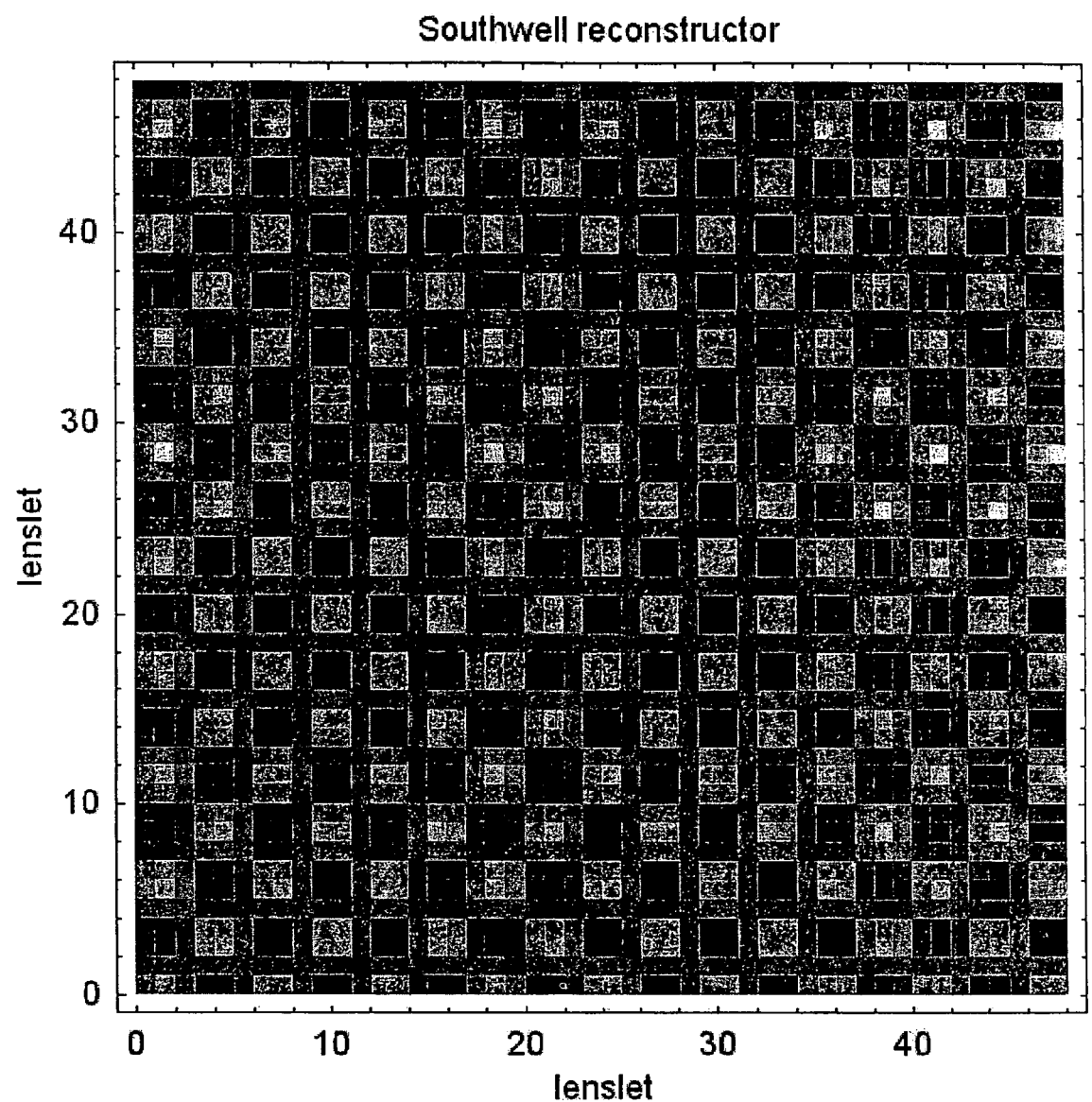

The results for the second wavefront are shown in FIGS. 21A-B. Both reconstructor method returned results that matched the input but the magnification computation shows that the new reconstructor overstates the amplitude by 11% and that the Southwell method understates the amplitude by 19%. The $\chi^2$ values were shocking. The new method has a $\chi^2$ of 2 $10^{-25}$; this represents the limit of double precision rational. In other words, the new method had a $\chi^2$ of zero. For the Southwell method the value is 11,800. The fact that the new reconstructor had essentially no fitting errors was astounding and led to a careful exploration of the approximations in equations 92 and 94. The results show that the approximation allows for a very rich wavefront structure across each lenslet. It probably allows for more structure that the focal spot location method can tolerate. That is, the focal spot will degrade and become ambiguous before the approximation used in the reconstructor breaks down.

This paper details new reconstruction strategies formally based upon the principles of the Shack-Hartmann sensor. This method was compared to a modernized implementation of the standard method developed by Southwell. The difference between the two different procedures is negligible or extreme depending upon the application. For common measurements of smoothly varying wavefronts, the difference between the two methods teeters on the edge of imperceptible. However, if the wavefront of interest is richly structured or finely detailed, then the new method is a substantial improvement.

To recap, the merit function (equation 87) for Shack-Hartmann sensors involves antiderivatives, which are unwelcome in a zonal reconstruction. An approximation was used to bypass the nettlesome antiderivatives and formulate a merit function based on the wavefront values. The approximation is contained in the two equations:

$$\frac{1}{2h_v}\Gamma_u \Psi(V) \approx \frac{1}{h_\mu h_v}\Gamma_B \Psi_v(V) \quad (115)$$

We start by forming the sum and the difference of the two equations represented above. Remembering that the domain is $x_1 \epsilon [a, b]$, $x_2 \epsilon [c, d]$ we find that:

$$\Psi(b, d) - \Psi(a, c) = \frac{1}{h_2}\Box\Psi_2(x_1, x_2) + \frac{1}{h_1}\Box\Psi_1(x_1, x_2), \quad (116)$$

and $$\Psi(b, c) - \Psi(a, d) = \frac{1}{h_2}\Box\Psi_2(x_1, x_2) + \frac{1}{h_1}\Box\Psi_1(x_1, x_2). \quad (117)$$

At this point we need to be more specific about $\psi(x_1,x_2)$. We can represent this function as a Taylor series. This is not because we champion the use of the Taylor monomials in modal reconstruction; it is because any piecewise continuous function can be described exactly by an infinite series of monomials. We now write $$\Psi(x_1, x_2) = \sum_{i=0}^{\infty}\sum_{j=0}^{i} \alpha_{i-j,j} x^{i-j} y^j. \quad (118)$$

When this expansion is substituted into equations 116 and 117, we see:

$$\sum_{i=0}^{d}\sum_{j=0}^{i} \alpha_{i-j,j} (b^{i-j}d^j - a^{i-j}c^j) = \frac{1}{h_2}\sum_{i=0}^{d}\sum_{j=0}^{i} \frac{\alpha_{i-j,j}}{j+1} \quad (119)$$
$$(b^{i-j} - a^{i-j})(d^{j+1} - c^{j+1}) +$$
$$\frac{1}{h_1}\sum_{i=0}^{d}\sum_{j=0}^{i} \frac{\alpha_{i-j,j}}{i-j+1}$$
$$(b^{i-j+1} - a^{i-j+1})(d^j - c^j),$$

and $$\sum_{i=0}^{d}\sum_{j=0}^{i} \alpha_{i-j,j} (b^{i-j}c^j - a^{i-j}d^j) = \frac{1}{h_2}\sum_{i=0}^{d}\sum_{j=0}^{i} \frac{\alpha_{i-j,j}}{j+1} \quad (120)$$
$$(b^{i-j} - a^{i-j})(d^{j+1} - c^{j+1}) +$$
$$\frac{1}{h_1}\sum_{i=0}^{d}\sum_{j=0}^{i} \frac{\alpha_{i-j,j}}{i-j}$$
$$(b^{i-j+1} - a^{i-j+1})(d^j - c^j).$$

Using the identity:

$$\frac{s^{k+1} - t^{k+1}}{s - t} = \sum_{i=0}^{k} s^{k-i}t^i \quad (121)$$

one can show that the approximations in equation 115 are exact whenever the wavefront over the lenslet has a structure like:

$$\Psi(x_1, x_2) = \alpha_{00} + \alpha_{11}x_1 x_2 + \sum_{i=1}^{\infty}\alpha_{i0}x_1^i + \sum_{i=1}^{\infty}\alpha_{i0}x_2^i. \quad (122)$$

This allows for an incredible amount of structure over the lenslet. For example, any separable function:

$$\Psi(x_1,x_2)=X(x_1)Y(x_2) \quad (123)$$

will be handled exactly; in other words, there is an exact solution and it is described by equation 107. Or any separable function with the lowest order torsion term, for example:

$$\Psi(x_1,x_2)=X(x_1)Y(x_2)+kx_1 x_2. \quad (124)$$

The egg crate wavefront in FIG. 17 is:

$$\Psi(x_1,x_2)=\sin(k_1 x_1)\cos(k_2 x_2) \quad (125)$$

which is exactly the form of equation 123.

Efficient Computation with Special Functions Like the Circle Polynomials of Zernike.

The circle polynomials of Zernike play a prominent role in optical analysis. While decompositions of wavefronts into Zernike polynomial series can yield valuable insight, computing with the polynomials themselves is quite inefficient. Here we outline how rational polynomials like those of Zernike, Legendre, Chebyshev and Laguerre can be handled as affine combinations of a Taylor monomial set. We demonstrate how calculations can be performed much more rapidly in the Taylor basis and how to use integer transformations to recover the exact amplitudes in the desired basis. We also explore C++ optimizations for storing the Zernike amplitudes and transforming between Zernike polynomials and Taylor monomials.

The circle polynomials of Nobel laureate Friz Zernike have proven to be an invaluable tool for investigating optical systems. Zernike's polynomials are orthogonal which facilitates associating individual terms with physical observables. Generations of optical scientists have used this representation to describe optical system performance, to quantify behavior of individual components and to provide a framework for consistent evaluation of optical phenomena. All the quantification is done in terms of the amplitudes for each term in a Zernike polynomial expansion. While Zernike's polynomials have proven to be an invaluable mechanism for describing the physical world. The formulation is quite cumbersome and actual computations in this basis set are needlessly complicated.

Because of the Gram-Schmidt orthogonalization process that Zernike used to construct his polynomials, the complexity of higher order terms grows very rapidly. Fortunately, the Taylor monomials form a minimal complexity representation that is exactly equivalent to the Zernike basis on an order-by-order basis. This paper formally establishes the equivalence of the two sets and then discusses how to compute in the Taylor basis and transform the results into the useful and familiar Zernike basis. In fact, this procedure is even more general: the Taylor monomials can be used to represent any rational polynomial set, such as those of Legendre, Laguerre and Chebyshev. With this realization, the Taylor basis becomes even more valuable for it is in essence all the other rational polynomial basis sets. So by computing in the Taylor basis, one is able to use affine transformations to recover the amplitudes of all other rational polynomial basis. This means, for example, that there needs to be only one reconstruction. With the Taylor amplitudes in hand, we are only one matrix multiplication away from the amplitudes of Zernike, Legendre, Chebyshev or Laguerre. And given the amplitudes in these other sets, a matrix multiplication converts them into Taylor amplitudes, and the another matrix multiplication can take us into the basis set of choice.

This application discuss some practical examples in wavefront sensing where the Zernike polynomials are cumbersome and tedious to use. We explain how to use the Taylor basis for computation and then how to recover the Zernike amplitudes. Besides laying out the fundamental mathematics, we go into to detail to show how this would be implemented in a modern computer language such as C++. Forethought in designing the architecture of the code results in an extremely facile and powerful tool for wavefront analysis.

The mathematics represent some level of abstraction, and the computer code shows a definite interpretation. Several issues in implementation, such as run time and memory usage, are explored. Finally testing and debugging a large volume of code requires stringent validation. We outline the five layers of validation we used to verify several million lines of computer code.

Equivalence of the Zernike and Taylor Amplitudes

When the complete set of Zernike[b] and Taylor functions through arbitrary order d are considered, the two sets are equivalent. Consider the explicit example of two sets for second order.

| Taylor Function | Zernike function |
|---|---|
| $T_{00}(x, y) = 1$ | $Z_{00}(x, y) = 1$ |
| $T_{10}(x, y) = x$ | $Z_{10}(x, y) = x$ |
| $T_{01}(x, y) = y$ | $Z_{11}(x, y) = y$ |
| $T_{20}(x, y) = x^2$ | $Z_{20}(x, y) = 2xy$ |
| $T_{11}(x, y) = xy$ | $Z_{21}(x, y) = 2x^2 + 2y^2 - 1$ |
| $T_{02}(x, y) = y^2$ | $Z_{22} = y^2 - x^2$ |

The equivalence is shown below. First, we express the Zernike functions in terms of Taylor functions:

$$Z_{00}(x,y) = T_{00}(x,y)$$

$$Z_{10}(x,y) = T_{10}(x,y)$$

$$Z_{11}(x,y) = T_{01}(x,y)$$

$$Z_{20}(x,y) = T_{11}(x,y)$$

$$Z_{21}(x,y) = 2T_{02}(x,y) - T_{00}(x,y)$$

$$Z_{22}(x,y) = T_{02}(x,y) - T_{20}(x,y)$$

Next we express the Taylor functions in terms of the Zernike functions:

$$T_{00}(x, y) = Z_{00}(x, y)$$

$$T_{10}(x, y) = Z_{10}(x, y)$$

$$T_{01}(x, y) = Z_{11}(x, y)$$

$$T_{20}(x, y) = \frac{1}{2}Z_{00}(x, y) + \frac{1}{4}Z_{21}(x, y) + \frac{1}{4}Z_{00}(x, y)$$

$$T_{11}(x, y) = \frac{1}{2}Z_{20}(x, y)$$

$$T_{02}(x, y) = \frac{1}{2}Z_{22}(x, y) + \frac{1}{4}Z_{21}(x, y) + \frac{1}{4}Z_{00}(x, y)$$

So for example the arbitrary wavefront $\psi(x,y)$, written as:

$$\Psi(x,y) = t_{00} + t_{10}x + t_{01}y + t_{20}x^2 + t_{11}xy + t_{02}y^2. \tag{126}$$

can be expressed in terms of the Zernike polynomials as $$\Psi(x, y) = \left(t_{00} + \frac{t_{02}}{4} + \frac{t_{02}}{4}\right)Z_{00}(x, y) + t_{10}Z_{10}(x, y) + \tag{127}$$
$$t_{01}Z_{11}(x, y) +$$
$$\frac{t_{11}}{2}Z_{20}x, y + \left(\frac{t_{02}}{4} + \frac{t_{02}}{4}\right)Z_{21}x, y +$$
$$\left(\frac{t_{02}}{2} - \frac{t_{20}}{2}\right)Z_{22}x, y$$

One already sees an inkling of the native simplicity of the Taylor basis. The relationship between the two bases can be cast in matrix form as $$\begin{bmatrix} Z_{00}(x, y) \\ Z_{10}(x, y) \\ Z_{11}(x, y) \\ Z_{20}(x, y) \\ Z_{21}(x, y) \\ Z_{22}(x, y) \end{bmatrix} = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 0 & 2 & 0 \\ -1 & 0 & 0 & 2 & 0 & 2 \\ 0 & 0 & 0 & -1 & 0 & 1 \end{bmatrix} \begin{bmatrix} T_{00}(x, y) \\ T_{10}(x, y) \\ T_{01}(x, y) \\ T_{20}(x, y) \\ T_{11}(x, y) \\ T_{02}(x, y) \end{bmatrix}, \tag{128}$$

-continued $$\begin{bmatrix} T_{00}(x,y) \\ T_{10}(x,y) \\ T_{01}(x,y) \\ T_{20}(x,y) \\ T_{11}(x,y) \\ T_{02}(x,y) \end{bmatrix} = \begin{bmatrix} 1 & 0 & 0 & 0 & 0 & 0 \\ 0 & 1 & 0 & 0 & 0 & 0 \\ 0 & 0 & 1 & 0 & 0 & 0 \\ \frac{1}{4} & 0 & 0 & 0 & \frac{1}{4} & -\frac{1}{2} \\ 0 & 0 & 0 & \frac{1}{2} & 0 & 0 \\ \frac{1}{4} & 0 & 0 & 0 & \frac{1}{4} & \frac{1}{2} \end{bmatrix} \begin{bmatrix} Z_{00}(x,y) \\ Z_{10}(x,y) \\ Z_{11}(x,y) \\ Z_{20}(x,y) \\ Z_{21}(x,y) \\ Z_{22}(x,y) \end{bmatrix}. \quad (129)$$

But even this notation is cumbersome and it is more convenient to write these relationships in the forms $$Z(x,y) = fz^T \cdot T(x,y), \quad (130)$$

or $$T(x,y) = tz^T \cdot Z(x,y). \quad (131)$$

The matrix tz transforms an amplitude vector from the Taylor basis to the Zernike basis and the matrix fz transforms an amplitude vector from the Zernike basis into the Taylor basis. Their usage in equations 128 and 129 may seem counter-intuitive, so a short demonstration follows.

The mappings in equations 128 and 129 show that the Zernike and Taylor basis are equivalent. This means that any wavefront ψ(x,y) can be resolved in either basis allowing us to write either:

$$\Psi(x,y) = t^T \cdot T(x,y) \quad (132)$$

or $$\Psi(x,y) = z^T \cdot Z(x,y) \quad (133)$$

where t and z are respectively, amplitudes in the Taylor and Zernike spaces. These amplitudes are the outputs from modal reconstruction. Notice that the results of the dot products are a scalar function, in fact, they are exactly the same scalar function as seen in equation 127. Since equations 132 and 133 are the same function, we can write:

$$z^T \cdot Z(x,y) = t^T \cdot T(x,y) \quad (134)$$

which in light of equation 130 can be recast as:

$$z^T \cdot (fz^T \cdot T(x,y)) = t^T \cdot T(x,y). \quad (135)$$

This immediately implies:

$$z^T \cdot fz^T = t^T \quad (136)$$

which is of course:

$$t = fz \cdot z. \quad (137)$$

A similar process yields the relationship:

$$z = tz \cdot t. \quad (138)$$

The naming scheme for the transformation matrices should be now be clear. The matrix tz takes amplitudes from the Taylor basis to the Zernike basis and fz takes amplitudes from the Zernike basis into the Taylor basis. As one might expect, these operations are the inverse of one and other. That is:

$$tz \cdot fz = fz \cdot tz = 1 \quad (139)$$

where 1 is the identity matrix of appropriate order.

This analysis can be extended arbitrarily order by order. The approximation theory of Weierstrass, p. 1929 shows that in the limit d→∞ either set of polynomials can be exactly represented any piece wise continuous wavefront.

The matrix fz is based upon the recursion relationship:

$$Z_{nm}(x,y) = \sum_{i=0}^{q} \sum_{j=0}^{m} \sum_{k=0}^{m-j} (-1)^{i+j} \binom{n-2\mu}{2i+p} \binom{\mu-j}{k} \quad (140)$$

$$\frac{(n-j)!}{j!(\mu-j)!(n-\mu-j)!} x^{2(i+k)+p} y^{n-2(i+j+k)-p}$$

where s=sgn(v), $$p = \frac{|s|}{2}(s+1), \quad q = \frac{s}{2}(v - s\,Mod_2 n), \text{ and } \mu = \frac{n}{2} - \left|m - \frac{n}{2}\right|.$$

For a given order n and index m, this formula can be used to generate a vector of coefficients for the fz matrix. When the fz matrix is fully assembled, the tz matrix is computed as $$tz = fz^{-1}. \quad (141)$$

Of course the transformations represented, ft and tz are not just a single matrix; they are a series of matrices, one pair for each order.

By comparison, the Taylor monomials are generated by a much simpler function:

$$T_{i-j,j}(x,y) = x^{i-j} y^j. \quad (142)$$

We are all familiar with the Taylor expansion and we know that any piecewise continuous function can be exactly reproduced by an infinite number of expansion terms. The Taylor monomials represent the simplest basis for an expansion. All other expansion sets, such as those of Laguerre or Legendre, are just combinations of the Taylor monomials. The natural question then is why are these other bases so popular? It is primarily due to the fact that the expansion polynomials are orthogonal. In general, two functions $f_i(x,y)$ and $f_j(x,y)$ are orthogonal over some domain D with respect to a weighting function $w(x,y)$ if they satisfy:

$$\int\int_D f_i(x,y) f_j(x,y) w(x,y) \, dx \, dy = a_{ij} \delta_{ij} \quad (143)$$

where $\alpha_{ij}$ is some constant and $\delta_{ij}$ is the Kronecker delta tensor.

We are all familiar with the concept of orthogonality since we live in a Euclidean world. Consider some point P on an x-y graph. We are able to measure x and y independently because the axes are orthogonal. As we vary in the x-direction at P, they values do not change. In general for a coordinate system we can formulate the geodesic between two points by integrating $ds^2$ using the metric g:

$$ds^2 = \sum_{ij} g_{ij} dq_1 dq_2 \quad (144)$$

For the Euclidean world that we live in, $dq_1=dx$, $dq_2=dy$, and the metric is:

$$g = \begin{bmatrix} 1 & 0 \\ 0 & 1 \end{bmatrix}. \tag{145}$$

In this special case, dx and dy may have finite size. In general, orthogonal coordinate systems have $g_{ij}=0$ when $i \neq j$:

$$g_{ij} = b_{ij}\delta_{ij}. \tag{146}$$

where the $b_{ij}$ are constants or functions. This states mathematically what our intuition tells us: we can be at a point P and vary our position in one coordinate without affecting the values in the other coordinates.

A comparison of equations 143 and 145 suggests the concept of orthogonality extends in a natural way to functions. The consequence is that measurements of the amplitudes are independent of each other. For example, consider the Zernike polynomials. It is possible to do a least squares fit to measure a single amplitude like $Z_{42}$. The measurements are independent and a computation of subsequent amplitudes will not affect the previously measured amplitudes. On the other hand, a non-orthogonal set of basis function like the Taylor monomials behaves differently. The amplitude form a term like $x^3 y^2$ depends upon which terms are being measured with it. This makes the matter of physical interpretation quite difficult. Consider the lowest order Zernike polynomial term, $Z_{00}$. It's amplitude is the mean value of the surface being analyzed. The corresponding Taylor amplitude—the constant term—will fluctuate depending upon how many terms are in the fit.

Figure 23:
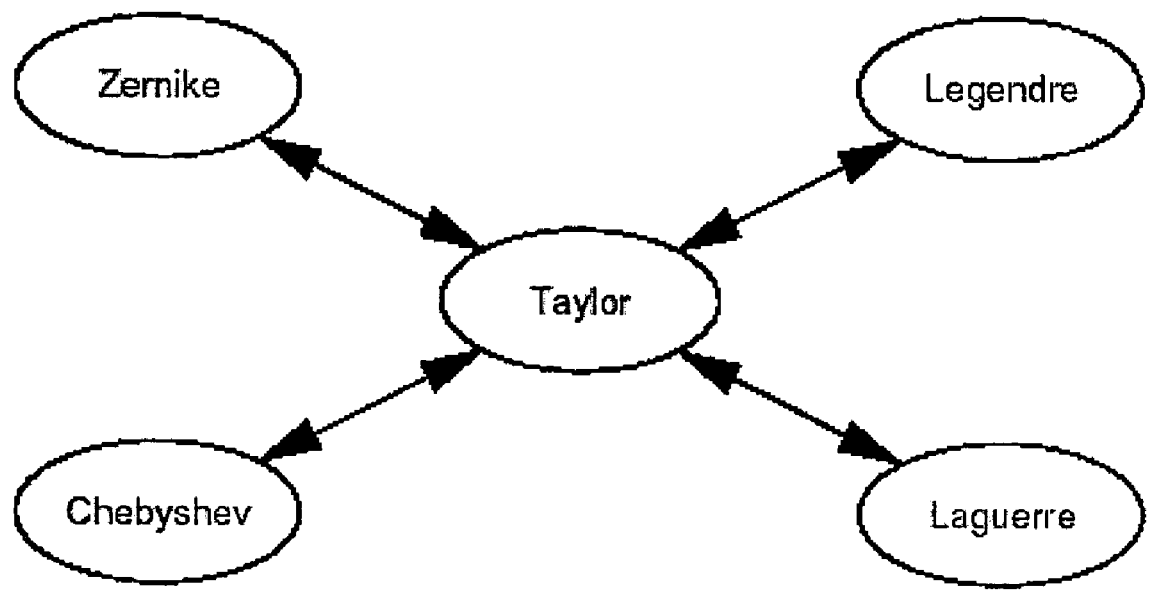

But as we will see, it is easier to do computations in the Taylor bases and then transform the amplitudes into an orthogonal set. The Taylor monomials are the simplets bases set to work with. FIG. 23 shows schematically how the functional bases are related. Think of the Taylor monomials as a hub connecting all the rational polynomials basis sets; four such sets are shown here. With software designed around the Taylor basis, the user assures the fastest possible execution and the least amount of computer code. An affine toolkit is used to transform the results of the Taylor-based calculations into the other basis sets. These affine transformations are integer based and virtually instantaneous. The Taylor basis is the hub and is the set of minimal complexity. After doing computations in the Taylor basis, rational transformations are used to compute quantities to any desired basis. This also allows for rapid conversion between any two bases such as Zernike as Chebyshev (with the usual caveat that the domains must match). For example, if fc and cz are the transformations that take amplitudes from and to the Chebyshev basis, then we could start with a vector of Zernike amplitudes, z, and compute the vector of Chebyshev amplitudes, c, via:

$$c = tc \cdot fz \cdot z. \tag{147}$$

For the case of n polynomial bases, there are 2n transformations. If we don't use the Taylor bases as the hub and have transformations directly connecting all the bases, then n(n−1)/2 transformations are needed. The Taylor hub will greatly simplify the affine transformations.

Figure 24A:
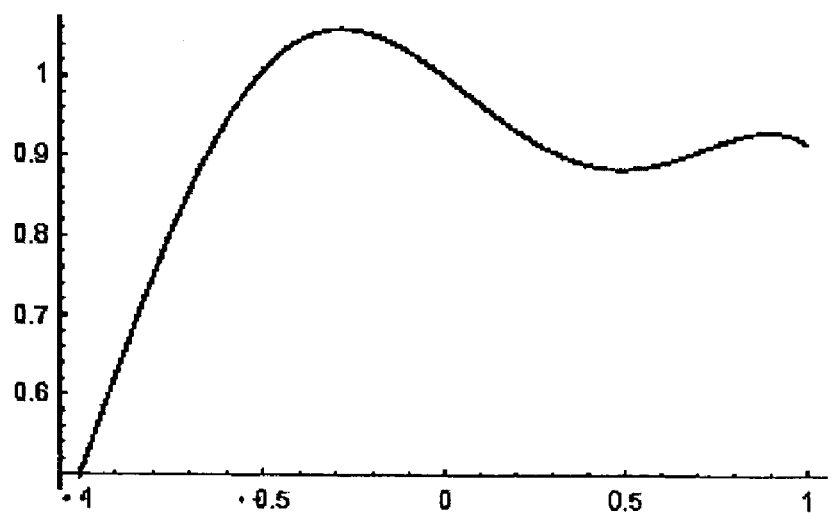
Figure 24B:
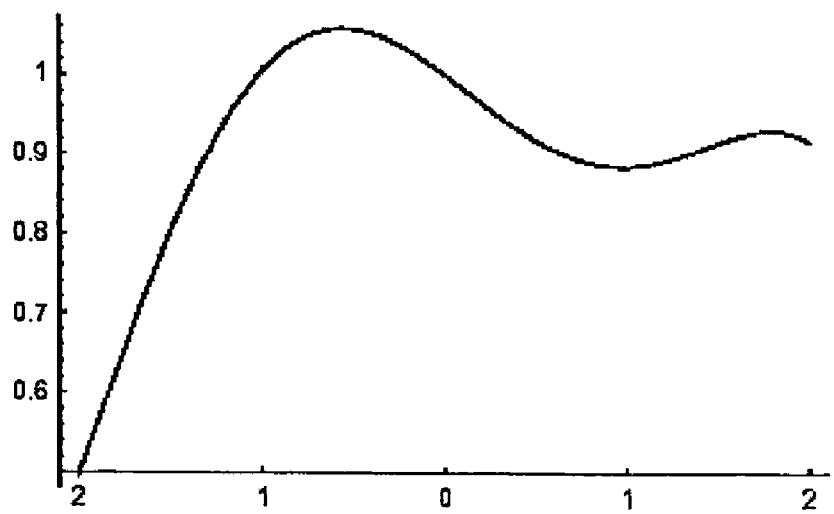
Figure 25:
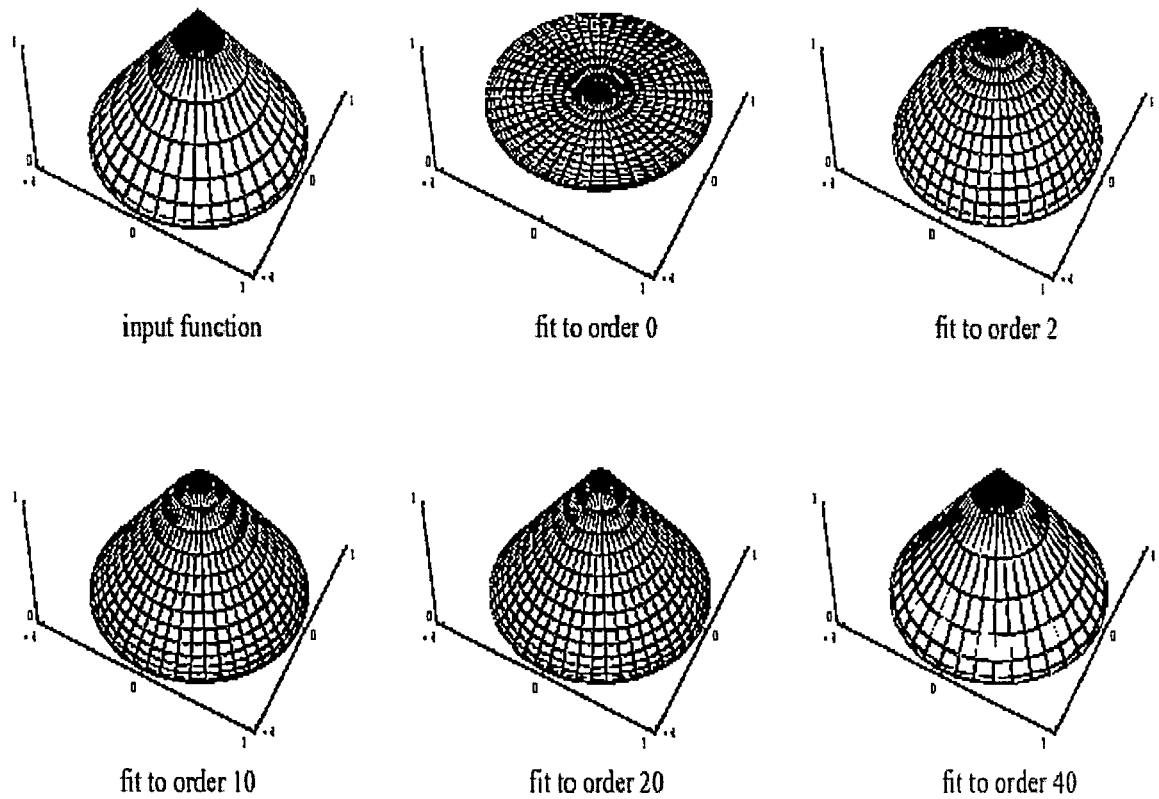

FIGS. 24A-B illustrates that aperture resizing is just rescaling the coordinate system. Consider an arbitrary function shown in FIG. 24A). We can shrink the x-coordinate by a factor of f=½, as shown in FIG. 24B. The curve does not change. We have effectively just relabeled the coordinate system.

$$g(x) = \lim_{d \to \infty} \sum_{i=0}^{d} \sum_{j=0}^{i} a_{i-j,j} x^{i-j}. \tag{147}$$

Of course practical applications truncate the expansion at some finite d. Now we apply the transformation in equation 146 to 147 and we see that the amplitudes of order d are multiplied by the factor $f^d$. For example the transformation matrix F that adjusts the amplitude vector for a second order expansion is $$F = \begin{bmatrix} f^0 & 0 & 0 & 0 & 0 & 0 \\ 0 & f^1 & 0 & 0 & 0 & 0 \\ 0 & 0 & f^1 & 0 & 0 & 0 \\ 0 & 0 & 0 & f^2 & 0 & 0 \\ 0 & 0 & 0 & 0 & f^2 & 0 \\ 0 & 0 & 0 & 0 & 0 & f^2 \end{bmatrix}. \tag{148}$$

Now if the user had Zernike amplitudes foisted upon him and wished to perform the resize operation, the affine toolkit will help. Given a Zernike amplitude vector z and a resize matrix F, the Zernike amplitudes z' would be given by $$z' = tz \cdot F \cdot fz \cdot z. \tag{149}$$

And were we given Zernike amplitudes and asked to reduce the aperture and calculate the Chebyshev amplitude vector c we would compute $$c = tc \cdot F \cdot fz \cdot z. \tag{150}$$

Yes, it may be possible of compute F in other bases, but it is trivial in the Taylor basis. And working in this basis allows the user to compute amplitudes in any other rational polynomial basis set.

While in general the Taylor polynomials are the most efficient computation basis, the rule is not absolute. There are instances when the evaluation is much faster in the Zernike basis. These cases involve wavefronts with rotational symmetry, such as spherical waves.

Applications involving measurements are typically numerical, and in those cases the Taylor basis is much faster and easier.

At this point, we hope to have established the background for and strongly motivated the use of the Taylor monomial basis set. The final component is to discuss the issues of putting these ideas into an efficient, rapid and robust computer code. Some forethought is required, but after starting with a good design, the code is very easy to use.

To support the aforementioned methodologies of computation, data structures and algorithms need to be optimized for this solution. Because of the flexibility and speed requirements of these computations this implementation is done in C++.

A three dimensional array can be used for the representation of the Zernike polynomials. By using a three dimensional array, it becomes simple to access any defined order, polynomial or coefficient. This first dimension of the array is the order and is addressed Z[o]. The second dimension of the array is the polynomial and is addressed Z[o][p]. Finally the third dimension of the array is a coefficient, which is addressed Z[o][p][c].

Using a three dimensional array can be very inefficient if not implemented correctly. As orders increase, so do the number of polynomials and coefficients. To maintain our addressing structure, a statically allocated array would be very wasteful. Consider building the Zernike array to third order. A statically allocated array would have to be declared INT64 Z[3][3][10]. This array statically allocates 3 polynomials and 10 coefficients for all orders even though orders 0,1, and 2 have fewer polynomials and coefficients. By using dynamically allocated memory we can prevent ourselves from using excess memory and still maintain our addressing structure. Building the Zernike structure up to but not including n-Order is actually very trivial. Listing 1 below shows a sample allocation.

```
typedef INT64 Coeff;                    // Coeffs 64-bit integers
typedef Coeff* Poly;                    // Polys array of Coeffs
typedef Poly* Order;                    // Orders array of Polys
typedef Order* zernikes;                // zernikes array of Orders
int n Poly;                             // Num poly
int nCoeffs;                            // Num coeffs
try{                                    // Try to allocate
    z = new Order [nOrder];             // Allocate orders
    for( int i=0; i<nOrder; i++) {      // For each order
        nPoly = i + 1;                  // Polynomial in order
        nCoeffs = ( (i+1) * (i+2) ) /2; // Coeffs in polynomial
        z[i] = new Poly[nPoly];         // Allocate polynomials
        for(int j=0; j<nPoly; j++) {    // For each polynomial
            z[i][j] = new Coeff[nCoeffs]; // Allocate coeffs
            memset(z[i][j], 0, size of(Coeff)*(i+1)); // Set coeffs to zero
        }                               // Matches inner for
    }                                   // Matches outer for
} catch ( std::bad alloc ) {            // Catch alloc error
    FreeZernikes (z)                    // Free memory
    Return;                             // Exit function
}                                       // Matches catch
```

Constructing the Zernike coefficient table in this fashion avoids unnecessary allocation of memory. After constructing this structure, the non-zero coefficients need to be set to the correct value. This can be done in one of two ways. First by calculating the non-zero coefficients for every polynomial in all orders. The following code segment generates these non-zero coefficients for any Zernike polynomial where n is the order and m is the offset of the Zernike in order n.

```
Int64 c, p, d, s;
Double M, q;
long mu, nu, kappa;                     // Index variables
d = n − 2*m;                            // Angular frequency
s = Sgn(d) ;                            // Side of periodic table
M = (n/2.0) − fabs(m −(n/2.0));         // Dist from center line
P = (abs(s)/2.0) * (s + 1);             // cos/sin term determinant
q = s * (d − s*(n%2) ) / 2.0;           // Loop variable
for(long i = 0; I <= q; i++) {
    for(long j = 0; j <= M; j++) {
        for(long k = 0; k <= M−j; k++) {
            mu = 2 * (i+k) + p;         // Update mu
            nu = n − 2 * (i + j + k) − p; // Update nu
            kappa = mu + nu;            // Update kappa
            c = pow(−1, i+j) * Binomial(n−2*M,
            (2*1)+p) *                  // Evaluate a coeff
                Binomial (M−j,k) *
                (nFact(n−j)/(nFact(j) *
                nFact(M−j) * nFact(n−M−j)));
            INT64 index = (kappa * (kappa+1))/2 + // Coeff position
            nu;
            Z[n] [m] [index] += c;      // Update the coeff
        }                               // Matches inner for
    }                                   // Matches middle for
}                                       // Matches outer for
```

It's obvious that this calculation is at least a $\Theta(n^3)$ operation due to the multiple embedded for loops. The second method is to load the non-zero amplitudes into the array manually, the previous section of code can be easily modified to generate the C++ code to make this a $\Theta(1)$ operation.

```
z[0][0][0] = (INT64)1;      // 0th order coeff
                            // n = 0, m = 0; constant
                            // 1st order coeffs
z[1][0][1] = (INT64)1;      // n = 1, m = 0; x
z[1][1][2] = (INT64)1;      // n = 1, m = 1; y
                            // 2nd order coeffs
z[2][0][4] = (INT64)2;      // n = 2, m = 0; xy
z[2][1][0] = −(INT64)1;     // n = 2, m = 1; constant
z[2][1][3] = (INT64)2;      // n = 2, m = 1; x²
z[2][1][5] = (INT64)2;      // n = 2, m = 1; y²
z[2][2][3] = −(INT64)1;     // n = 2, m = 2; x²
z[2][2][5] = (INT64)1;      // n = 2, m = 2; y²
                            // 3rd order coeffs
z[3][0][6] = −(INT64)1;     // n = 3, m = 0; x³
z[3][0][8] = (INT64)3;      // n = 3, m = 0; xy²
z[3][1][1] = −(INT64)2;     // n = 3, m = 1; x
z[3][1][6] = (INT64)3;      // n = 3, m = 1; x³
z[3][1][8] = (INT64)3;      // n = 3, m = 1; xy²
z[3][2][2] = −(INT64)2;     // n = 3, m = 2; y
z[3][2][7] = (INT64)3;      // n = 3, m = 2; x²y
z[3][2][9] = (INT64)3;      // n = 3, m = 2; y³
z[3][3][7] = −(INT64)3;     // n = 3, m = 3; x²y
z[3][3][9] = (INT64)1;      // n = 3, m = 3; y³
                            // 4th − nth order coeffs
```

Since this methodology uses only assignment operations, and lacks any mathematical computations or for loops, this segment executes in a constant time. The second method makes a larger data segment of an executable, DLL or a statically linked library. To illustrate the differences, a sample program that builds and frees the Zernike array 1000 times was created and the coefficients were populated using both methods. The results are summarized in table 1. The first method creates an executable that is 168 KB. The same sample program using the second method creates an executable that is 2 MB. When these two programs were ran on a machine with two 1.5 MHZ processors, the first method took on average 385 ms while the second method only took 14 ms on average. Clearly speed is achieved by using more disk space. When speed is an issue the second method should be used.

One other issue comes into play while deciding which method to implement. The coefficients that represent the Zernike polynomials through order 39 are small enough to be represented by a 64-bit integer. However, due to the use of factorials in the computation of these values, an arbitrary precision number type is necessary to compute them. In fact, using a naïve implementation without arbitrary precision, the maximum order of the coefficients that can be correctly computed is 20. To calculate the coefficients during the runtime, ref.[3] outlines functions necessary to write a C implementation that handles extremely large numbers and the algorithms they chose are highly efficient. Otherwise, a tool such as Mathematica will prove itself priceless for generation of the coefficients, since all of its calculations are done using arbitrarily precise numbers. It is also necessary to note that above order 40, the coefficients become large enough to overflow a 64-bit integer data type.

TABLE 2

Methods for Loading Amplitudes

| Method | Time to Load Amplitudes | Memory Used During Execution | Memory Used on Disk |
|---|---|---|---|
| Computing Amplitudes | 385 ms | 1388 KB | 168 KB |
| Pre Computed Amplitudes | 14 ms | 3312 KB | 2 MB |

Now that we have discussed the internal representation of the Zernikes, the computation transforming them into their Taylor representation needs to be considered. The matrix operations in equations 128 and 129 are an example of how the transformations are performed for order 2. Matrix multiplication quickly becomes very expensive. For example the transformation matrices at order 30 are 496×496. However, since the matrices are very sparse, it is extremely time and memory inefficient to create the transformation matrices and then perform a multiplication. Using a similar technique as the one used to create the Zernike vectors, we use equation 140 to create code to perform sparse matrix multiplication. For example, converting $4^{th}$ order Zernike polynomial to its Taylor equivalent can be performed as follows:

tay[0]=zer[0]+zer[3]/(INT64)4+zer[5]/(INT64)4;

tay[1]=zer[1]+zer[6]/(INT64)2+zer[8]/(INT64)6;

tay[2]=zer[2]+zer[7]/(INT64)2+zer[8]/(INT64)2;

tay[3]=zer[4]/(INT64)2; tay[4]=zer[3]/(INT64)4+zer[5]/(INT64)4;

tay[5]=-zer[3]/(INT64)2+zer[5]/(INT64)2;

tay[6]=-zer[6]/(INT64)4+zer[8]/(INT64)4;

tay[7]=zer[6]/(INT64)4+zer[8]/(INT64)12;

tay[8]=zer[7]/(INT64)12+zer[9]/(INT64)4;

tay[9]=-zer[7]/(INT64)4+zer[9]/(INT64)4;

where tay is the array holding the Taylor coefficients and zer is the array of Zernike coefficients. With this implementation, the transformation of the Zernike coefficients to the Taylor representations performs only 19 divisions, whereas the matrix form would do 225 divisions. To do the inverse all that is necessary is to perform these operations:

zer[0]=tay[0]-tay[4];

zer[1]=tay[1]-tay[7]*(INT64)2;

zer[2]=tay[2]-tay[8]*(INT64)2;

zer[3]=tay[4]*(INT64)2-tay[5];

zer[4]=tay[3]*(INT64)2;

zer[5]=tay[4]*(INT64)2+tay[5];

zer[6]=-tay[6]+tay[7]*(INT64)3;

zer[7]=tay[8]*(INT64)3-tay[9]*(INT64)3;

zer[8]=tay[6]*(INT64)3+tay[7]*(INT64)3;

zer[9]=tay[8]*(INT64)3+tay[9];

Once again, very few math operations are required compared to the matrix multiplication method. Thus, it becomes superfluous to use large amounts of memory to hold the transformation matrices. Also, since computation of the matrix values isn't performed at runtime, the transformations are extremely fast, $\Theta(1)$. There is one disadvantage, hard-coding the transformations an create extremely large executable files; approximately 60 MB for both transformations through order 40.

Plotting a wavefront using the Taylor monomials becomes trivial. First the user would define the Zernike polynomial in a vector format. Next the amplitudes would be transformed to Taylor amplitudes. Finally we can use the Taylor representation to plot the wavefront.

$$c = (0, 0, 0, 0, 1, 0) \quad (158)$$
$$a = fz * c$$

$$\psi(x, y) = \sum_{i=1}^{n} a_i x^{p_{i_1}} y^{p_{i_2}} \quad (159)$$

where p is the vector holding the exponents for x and y. By using a class object we can write C++ code that looks almost identical to the mathematics above. Since all transforms will support the same interface, many different transforms can be defined by using inheritance. If a class object is defined for transforms, we can then define what it means to multiply a transformation matrix by a vector of amplitudes by using operator overloading. The following C++ code does the same operation as the mathematics above

```
CTransform *fm = new CTFZ ( );           // Define transform
Wavefront W;                              // Define wavefront
Poly c = { 0, 0, 0, 0, 1, 0 }             // Define Z42
Poly a = fz*c                             // Transform to Taylor
for( int i=1; i<=n; i++ )                 // Sum
  W[x][y] = a[i] *pow(x, p[i][1]) *pow(y, p[i][2]);  // Taylor components
Delete fz;                                // Free transform
```

First the code creates the class that transforms to the Taylor basis from the Zernike basis. Next we define a wavefront. The polynomial c is created to represent the eigenstate $Z_{4,2}$ and then the Taylor amplitude vector a is created by multiplying c by the transform. Finally the wavefront is calculated in the Taylor representation.

Using the said methods for code generation can yield hundreds of thousands of lines of code, depending on the order desired. Debugging that many lines of code is quite difficult, therefore, the use of mathematical validation is unavoidable.

Several tests were done to show that the Zernike amplitudes were computed correctly without a single missed keystroke. For these tests, an independent programmer manually wrote C++ functions for the first five orders of the Zernike polynomials. So the production code and validation code were created by two different programmers. The first validation test was a point by point test. This test compares the functional definitions of the Zernike polynomials through fifth order with the results of from using the Zernike array structure. The point by point test samples $10^{14}$ points within the unit circle and compared the values returned for both methods. There are no differences between the functional or the array representations. The next test uses the property of orthogonality to determine if the Zernike amplitudes were created correctly. The orthogonality of the Zernike polynomials, stated in equation 155, shows that if the product of two Zernike polynomials is integrated over the unit disc, the answer will be zero unless both polynomials are the same. The orthogonality test was a comprised of three parts. The first part tested the orthogonality of the explicit Zernike functions which were manually entered. The orthogonality of the explicit Zernike functions and the Zernike array structure was tested next. Finally the orthogonality of the Zernike array structure to itself was tested. In all three the results were difficult to interpret. The integration is preformed using the qquas routine. Because this is a numerical integration we get more and more error as the order increases. Because the first part of the test gave similar errors as the second and third, the non-zero terms off of the diagonal may be a result of the integration. Better methods of integration will have to be used to validate these conclusions.

Proving that the transformation algorithms are correct can also be done in an automated manner. To determine accuracy of the algorithms we can create simple vectors for each Zernike eigenstate as well as the corresponding Taylor amplitude vector. A set of vectors through second order is shown in table 2. We transform the Zernike eigenstate into the Taylor basis and compare to the predicted value. To test the reverse transformation, the Taylor amplitudes are transformed to the Zernike basis and computed to the expected eigenvector. Since this is all based on integer arithmetic, the differences are exactly zero. If there is a non-zero difference then the transformation algorithm has been programmed incorrectly. Even more interestingly, by using this method we can determine exactly where the problem occurred depending on which transformation yielded the non-zero result.

TABLE 3

Simple Zernike Polynomials and the Equivalent Taylor Monomials

| n | m | Zernike Coefficients | Taylor Coefficients |
|---|---|---|---|
| 0 | 0 | (1) | (1) |
| 1 | 0 | (0, 1, 0) | (0, 1, 0) |
| 1 | 1 | (0, 0, 1) | (0, 0, 1) |
| 2 | 0 | (0, 0, 0, 1, 0, 0) | (0, 0, 0, 02, 0) |
| 2 | 1 | (0, 0, 0, 0, 1, 0) | (−1, 0, 0, 2, 0, 2) |
| 2 | 2 | (0, 0, 0, 0, 0, 1) | (0, 0, 0, −1, 0, 1) |

Testing the precision of these affine transformations can be done by performing two simple test repeatedly. These tests can give a good measure of how accurate these conversions are. To do these tests, create an array of type double to be transformed. The size of the array is $(d+1)(d+2)/2$ where d is the order. Once the array has been created with the correct size, fill each element with random number between −1 and 1.

for (int $ii$=0; $ii$<$n$Terms; $ii$++)

initarray[$ii$]=((rand( )/(double)RAND_MAX)−0.5)*2;

With this array, assume that it contains Zernike amplitudes and perform the transformation to its Taylor equivalent. The intermediate array of Taylor amplitudes should then be converted back into its Zernike representation.

intermediate=$fz$*initarray;

finalarray=$tz$*intermediate;

In theory, the finalarray should now contain the same values as our initarray. So, by doing this repeatedly for each other and with newly created random sequences each time, we can compare the sum of the squares of the differences between initarray and finalarray to determine the accuracy of our transformations. The second test is to repeat the above test doing the transformations in reverse. In other words, initarray should be initially assumed to be holding the Taylor coefficients.

intermediate=$tz$*initarray;

finalarray=$fz$*intermediate;

The use of circle polynomials of Zernike in optical analysis provides valuable insight. Despite their role in optical analysis, computation using the Zernike polynomials is quite inefficient. We outlined how rational polynomials like those of Zernike, Legendre, Chebyshev and Laguerre can be handled as affine combinations of a Taylor monomial set. We demonstrated how calculations can be performed much more rapidly in the Taylor basis and how to use integer transformations to recover the exact amplitudes in the desired basis. We also discussed some basics of a C++ implementation. Finally testing and debugging a large volume of code requires mathematical validation. To insure the correctness of the code, validation was used to ensure the Zernike amplitudes were generated correctly and the transformations to and from Taylor worked correctly. Even though Zernike polynomials can tell us a lot about an optical system they are not good for doing computation, therefore computation is done in Taylor space.

While preferred embodiments are disclosed herein, many variations are possible which remain within the concept and scope of the invention. Such variations would become clearly to one of ordinary skill in the art after inspection of the specification, drawings and claims herein. The invention therefore is not to be restricted except within the spirit and scope of the appended claims.

The invention claimed is:

1. A method of reconstructing a wavefront from gradient data, comprising:
    obtaining gradient data from a Shack-Hartmann wavefront sensor comprising a lenslet array and a plurality of pixels;
    mapping boundaries of each lenslet onto a grid of the pixels; and
    numerically calculating the wavefront at a plurality of vertices of said mapped boundaries.

2. The method of claim 1, wherein the wavefront is calculated by minimizing differences between adjacent lenslet vertices.

3. The method of claim 2, where the wavefront is calculated using a least squares fit method.

4. The method of claim 3, wherein performing the least squares fit method comprises:
    obtaining a design matrix that is only a function of the basis functions and coordinate space; and
    performing a matrix multiplication of the design matrix and an array composed of the gradient data.

5. The method of claim 4, where the design matrix is stored in a storage medium.

6. The method of claim 1 where the wavefront is calculated by one of: a successive over-relaxation method, a gradient search method, a singular value decomposition, and a neural net method.

7. The method of claim 1 where an existence function is used to determine valid measurement locations for obtaining the gradient data.

8. The method of claim 7 where the existence function is determined from a measured irradiance distribution.

* * * * *